(12) United States Patent
Björsell et al.

(10) Patent No.: US 9,143,608 B2
(45) Date of Patent: Sep. 22, 2015

(54) INTERCEPTING VOICE OVER IP COMMUNICATIONS AND OTHER DATA COMMUNICATIONS

(71) Applicant: Digifonica (International) Limited, Vancouver (CA)

(72) Inventors: Johan Emil Viktor Björsell, Vancouver (CA); Maksym Sobolyev, New Westminster (CA)

(73) Assignee: DIGIFONICA (INTERNATIONAL) LIMITED, Vancouver (CA)

( * ) Notice: Subject to any disclaimer, the term of this patent is extended or adjusted under 35 U.S.C. 154(b) by 0 days.

(21) Appl. No.: 13/863,306

(22) Filed: Apr. 15, 2013

(65) Prior Publication Data

US 2013/0229950 A1    Sep. 5, 2013

Related U.S. Application Data

(63) Continuation of application No. 12/517,026, filed as application No. PCT/CA2007/002150 on Nov. 29, 2007, now Pat. No. 8,422,507.

(60) Provisional application No. 60/861,431, filed on Nov. 29, 2006.

(51) Int. Cl.
*H04L 12/28* (2006.01)
*H04M 3/22* (2006.01)
(Continued)

(52) U.S. Cl.
CPC .............. *H04M 3/2281* (2013.01); *H04L 63/00* (2013.01); *H04L 63/30* (2013.01); *H04M 7/0078* (2013.01); *H04M 2203/15* (2013.01); *H04M 2203/2022* (2013.01)

(58) Field of Classification Search
None
See application file for complete search history.

(56) References Cited

U.S. PATENT DOCUMENTS

| | | | |
|---|---|---|---|
| 4,916,491 | A | 4/1990 | Katoh |
| 4,992,971 | A | 2/1991 | Hayashi |

(Continued)

FOREIGN PATENT DOCUMENTS

| | | |
|---|---|---|
| BR | PI 0718312-7 A2 | 11/2013 |
| BR | PI 0719682-2 A2 | 1/2014 |

(Continued)

OTHER PUBLICATIONS

Extended European Search Report dated Nov. 2, 2012 for European Application No. EP 07 855 436.7.

(Continued)

*Primary Examiner* — Otis L Thompson, Jr.
(74) *Attorney, Agent, or Firm* — Knobbe Martens Olson & Bear LLP

(57) ABSTRACT

Methods and apparatus for intercepting communications in an Internet Protocol (IP) network involve maintaining dialing profiles for respective subscribers to the IP network, each dialing profile including a username associated with the corresponding subscriber, and associating intercept information with the dialing profile of a subscriber whose communications are to be monitored. Intercept information will include determination information for determining whether to intercept a communication involving the subscriber, and destination information identifying a device to which intercepted communications involving the subscriber are to be sent. When the determination information meets intercept criteria communications are established with a media relay through which communications involving the subscriber will be conducted or are being conducted to cause the media relay to send a copy of the communications involving the subscriber to a mediation device specified by the destination information.

48 Claims, 29 Drawing Sheets

(51) Int. Cl.
*H04L 29/06* (2006.01)
*H04M 7/00* (2006.01)

(56) References Cited

U.S. PATENT DOCUMENTS

| | | |
|---|---|---|
| 5,146,491 A | 9/1992 | Silver et al. |
| 5,247,571 A | 9/1993 | Kay et al. |
| 5,303,297 A | 4/1994 | Hillis |
| 5,325,421 A | 6/1994 | Hou et al. |
| 5,359,642 A | 10/1994 | Castro |
| 5,425,085 A | 6/1995 | Weinberger et al. |
| 5,440,621 A | 8/1995 | Castro |
| 5,454,030 A | 9/1995 | de Oliveira et al. |
| 5,469,497 A | 11/1995 | Pierce et al. |
| 5,506,893 A | 4/1996 | Buscher et al. |
| 5,519,769 A | 5/1996 | Weinberger et al. |
| 5,559,871 A | 9/1996 | Smith |
| 5,590,133 A | 12/1996 | Billstrom et al. |
| 5,608,786 A | 3/1997 | Gordon |
| 5,621,787 A | 4/1997 | McKoy et al. |
| 5,633,913 A | 5/1997 | Talarmo |
| 5,661,790 A | 8/1997 | Hsu |
| 5,677,955 A | 10/1997 | Doggett et al. |
| 5,712,907 A | 1/1998 | Wegner et al. |
| 5,719,926 A | 2/1998 | Hill |
| 5,722,067 A | 2/1998 | Fougnies et al. |
| 5,724,355 A | 3/1998 | Bruno et al. |
| 5,726,984 A | 3/1998 | Kubler et al. |
| 5,737,414 A | 4/1998 | Walker et al. |
| 5,751,961 A | 5/1998 | Smyk |
| 5,793,762 A | 8/1998 | Penners et al. |
| 5,799,072 A | 8/1998 | Vulcan et al. |
| 5,802,502 A | 9/1998 | Gell et al. |
| 5,825,863 A | 10/1998 | Walker |
| 5,828,740 A | 10/1998 | Khuc et al. |
| 5,838,682 A | 11/1998 | Dekelbaum et al. |
| 5,845,267 A | 12/1998 | Ronen |
| 5,850,433 A | 12/1998 | Rondeau |
| 5,864,610 A | 1/1999 | Ronen |
| 5,867,495 A | 2/1999 | Elliott et al. |
| 5,883,810 A | 3/1999 | Franklin et al. |
| 5,883,891 A | 3/1999 | Williams et al. |
| 5,889,774 A | 3/1999 | Mirashrafi et al. |
| 5,905,736 A | 5/1999 | Ronen et al. |
| 5,907,547 A | 5/1999 | Foladare et al. |
| 5,910,946 A | 6/1999 | Csapo |
| 5,915,005 A | 6/1999 | He |
| 5,915,093 A | 6/1999 | Berlin et al. |
| 5,917,899 A | 6/1999 | Moss et al. |
| 5,923,659 A | 7/1999 | Curry et al. |
| 5,930,343 A | 7/1999 | Vasquez |
| 5,937,045 A | 8/1999 | Yaoya et al. |
| 5,940,598 A | 8/1999 | Strauss et al. |
| 5,953,504 A | 9/1999 | Sokal et al. |
| 5,956,391 A | 9/1999 | Melen et al. |
| 5,970,477 A | 10/1999 | Roden |
| 5,974,043 A | 10/1999 | Solomon |
| 5,991,291 A | 11/1999 | Asai et al. |
| 6,005,870 A | 12/1999 | Leung et al. |
| 6,005,926 A | 12/1999 | Mashinsky |
| 6,014,379 A | 1/2000 | White et al. |
| 6,021,126 A | 2/2000 | White et al. |
| 6,029,062 A | 2/2000 | Hanson |
| 6,052,445 A | 4/2000 | Bashoura et al. |
| 6,058,300 A | 5/2000 | Hanson |
| 6,069,890 A | 5/2000 | White et al. |
| 6,073,013 A | 6/2000 | Agre et al. |
| 6,078,647 A | 6/2000 | D'Eletto |
| 6,104,704 A | 8/2000 | Buhler et al. |
| 6,104,711 A | 8/2000 | Voit |
| 6,115,737 A | 9/2000 | Ely et al. |
| 6,128,304 A | 10/2000 | Gardell et al. |
| 6,137,869 A | 10/2000 | Voit et al. |
| 6,141,404 A | 10/2000 | Westerlage et al. |
| 6,151,385 A | 11/2000 | Reich et al. |
| 6,173,272 B1 | 1/2001 | Thomas et al. |
| 6,188,752 B1 | 2/2001 | Lesley |
| 6,243,689 B1 | 6/2001 | Norton |
| 6,249,573 B1 | 6/2001 | Hudson |
| 6,282,574 B1 | 8/2001 | Voit |
| 6,298,062 B1 | 10/2001 | Gardell et al. |
| 6,327,351 B1 | 12/2001 | Walker et al. |
| 6,351,464 B1 | 2/2002 | Galvin et al. |
| 6,359,880 B1 | 3/2002 | Curry et al. |
| 6,430,275 B1 | 8/2002 | Voit et al. |
| 6,445,694 B1 | 9/2002 | Swartz |
| 6,507,644 B1 | 1/2003 | Henderson et al. |
| 6,553,025 B1 | 4/2003 | Kung et al. |
| 6,560,224 B1 | 5/2003 | Kung et al. |
| 6,574,328 B1 | 6/2003 | Wood et al. |
| 6,597,686 B1 | 7/2003 | Smyk |
| 6,597,783 B1 | 7/2003 | Tada et al. |
| 6,636,833 B1 | 10/2003 | Flitcroft et al. |
| 6,650,641 B1 | 11/2003 | Albert et al. |
| 6,674,745 B1 | 1/2004 | Schuster et al. |
| 6,724,860 B2 | 4/2004 | Stumer et al. |
| 6,744,858 B1 | 6/2004 | Ryan et al. |
| 6,766,159 B2 | 7/2004 | Lindholm |
| 6,772,188 B1 | 8/2004 | Cloutier |
| 6,775,534 B2 | 8/2004 | Lindgren et al. |
| 6,785,266 B2 | 8/2004 | Swartz |
| 6,798,767 B1 | 9/2004 | Alexander et al. |
| 6,819,929 B2 | 11/2004 | Antonucci et al. |
| 6,873,599 B1 | 3/2005 | Han |
| 6,892,184 B1 | 5/2005 | Komem et al. |
| 6,934,279 B1 | 8/2005 | Sollee et al. |
| 6,937,713 B1 | 8/2005 | Kung et al. |
| 6,954,453 B1 | 10/2005 | Schindler |
| 6,963,557 B2 | 11/2005 | Knox |
| 6,963,739 B2 | 11/2005 | Dorenbosch et al. |
| 6,985,440 B1 | 1/2006 | Albert et al. |
| 6,993,015 B2 | 1/2006 | Kobayashi |
| 7,006,508 B2 | 2/2006 | Bondy et al. |
| 7,010,727 B1 | 3/2006 | Stucker |
| 7,027,564 B2 | 4/2006 | James |
| 7,046,658 B1 | 5/2006 | Kundaje |
| 7,051,072 B2 | 5/2006 | Stewart et al. |
| 7,055,174 B1 | 5/2006 | Cope et al. |
| 7,068,668 B2 | 6/2006 | Feuer |
| 7,068,772 B1 | 6/2006 | Widger et al. |
| 7,079,526 B1 | 7/2006 | Wipliez et al. |
| 7,120,682 B1 | 10/2006 | Salama |
| 7,151,772 B1 | 12/2006 | Kalmanek, Jr. et al. |
| 7,177,399 B2 | 2/2007 | Dawson et al. |
| 7,203,478 B2 | 4/2007 | Benco et al. |
| 7,212,522 B1 | 5/2007 | Shankar et al. |
| 7,277,528 B2 | 10/2007 | Rao et al. |
| 7,330,835 B2 | 2/2008 | Deggendorf |
| 7,400,881 B2 | 7/2008 | Kallio |
| 7,426,492 B1 | 9/2008 | Bishop et al. |
| 7,436,835 B2 | 10/2008 | Castleberry et al. |
| 7,437,665 B2 | 10/2008 | Perham |
| 7,440,442 B2 | 10/2008 | Grabelsky et al. |
| 7,447,707 B2 | 11/2008 | Gaurav et al. |
| 7,454,200 B2 | 11/2008 | Cai et al. |
| 7,454,510 B2 | 11/2008 | Kleyman et al. |
| 7,486,664 B2 | 2/2009 | Swartz |
| 7,486,667 B2 | 2/2009 | Feuer |
| 7,512,117 B2 | 3/2009 | Swartz |
| 7,565,131 B2 | 7/2009 | Rollender et al. |
| 7,573,982 B2 | 8/2009 | Breen et al. |
| 7,580,886 B1 | 8/2009 | Schulz |
| 7,587,036 B2 | 9/2009 | Wood et al. |
| 7,593,390 B2 | 9/2009 | Lebizay |
| 7,593,884 B2 | 9/2009 | Rothman et al. |
| 7,599,944 B2 | 10/2009 | Gaurav et al. |
| 7,639,792 B2 | 12/2009 | Qiu et al. |
| 7,644,037 B1 | 1/2010 | Ostrovsky |
| 7,647,500 B2 | 1/2010 | Machiraju et al. |
| 7,657,011 B1 * | 2/2010 | Zielinski et al. ............ 379/93.02 |
| 7,664,495 B1 | 2/2010 | Bonner et al. |
| 7,676,215 B2 | 3/2010 | Chin et al. |
| 7,676,431 B2 | 3/2010 | O'Leary et al. |
| 7,680,114 B2 | 3/2010 | Yazaki et al. |

(56) References Cited

U.S. PATENT DOCUMENTS

| | | | |
|---|---|---|---|
| 7,680,737 B2 | 3/2010 | Smith et al. |
| 7,702,308 B2 | 4/2010 | Rollender |
| 7,715,821 B2 | 5/2010 | Rollender |
| 7,734,544 B2 | 6/2010 | Schleicher |
| 7,738,384 B2 | 6/2010 | Pelletier |
| 7,764,777 B2 | 7/2010 | Wood et al. |
| 7,764,944 B2 | 7/2010 | Rollender |
| 7,765,261 B2 | 7/2010 | Kropivny |
| 7,765,266 B2 | 7/2010 | Kropivny |
| 7,797,459 B1 | 9/2010 | Roy et al. |
| 7,882,011 B2 | 2/2011 | Sandhu et al. |
| 7,894,441 B2 | 2/2011 | Yazaki et al. |
| 7,899,742 B2 | 3/2011 | Benkert et al. |
| 7,907,551 B2 | 3/2011 | Croy et al. |
| 7,929,955 B1 | 4/2011 | Bonner |
| 7,944,909 B2 | 5/2011 | James |
| 7,950,046 B2 | 5/2011 | Kropivny |
| 7,958,233 B2 | 6/2011 | Gutierrez |
| 7,965,645 B2 | 6/2011 | Pelletier |
| 7,979,529 B2 | 7/2011 | Kreusch et al. |
| 7,995,589 B2 | 8/2011 | Sollee et al. |
| 8,024,785 B2 | 9/2011 | Andress et al. |
| 8,027,333 B2 | 9/2011 | Grabelsky et al. |
| 8,041,022 B1 * | 10/2011 | Andreasen et al. ........ 379/221.1 |
| 8,050,273 B2 | 11/2011 | Gass |
| 8,060,887 B2 | 11/2011 | Kropivny |
| 8,078,164 B2 | 12/2011 | Ganesan |
| 8,111,690 B2 | 2/2012 | Hussain et al. |
| 8,116,307 B1 | 2/2012 | Thesayi et al. |
| 8,125,982 B2 | 2/2012 | Feuer |
| 8,127,005 B2 | 2/2012 | Gutierrez |
| 8,145,182 B2 | 3/2012 | Rudolf et al. |
| 8,161,078 B2 | 4/2012 | Gaurav et al. |
| 8,166,533 B2 | 4/2012 | Yuan |
| 8,166,547 B2 | 4/2012 | Bevan et al. |
| 8,189,568 B2 | 5/2012 | Qiu et al. |
| 8,190,739 B2 | 5/2012 | Gutierrez |
| 8,200,575 B2 | 6/2012 | Torres et al. |
| 8,204,044 B2 | 6/2012 | Lebizay |
| 8,219,115 B1 | 7/2012 | Nelissen |
| 8,223,927 B2 | 7/2012 | Di Serio et al. |
| 8,228,837 B2 | 7/2012 | Sheriff et al. |
| 8,228,897 B2 | 7/2012 | Mitchell |
| 8,243,730 B1 | 8/2012 | Wong et al. |
| 8,244,204 B1 | 8/2012 | Chen et al. |
| 8,275,404 B2 | 9/2012 | Berger et al. |
| 8,300,632 B2 | 10/2012 | Davis et al. |
| 8,306,063 B2 | 11/2012 | Erdal et al. |
| 8,315,521 B2 | 11/2012 | Leiden et al. |
| 8,363,647 B2 | 1/2013 | Fangman et al. |
| 8,364,172 B2 | 1/2013 | Guanfeng et al. |
| 8,396,445 B2 | 3/2013 | Crawford et al. |
| 8,410,907 B2 | 4/2013 | Twitchell, Jr. |
| 8,417,791 B1 | 4/2013 | Peretz et al. |
| 8,423,791 B1 | 4/2013 | Yu et al. |
| 8,427,981 B2 | 4/2013 | Wyss et al. |
| 8,437,340 B2 | 5/2013 | James |
| 8,462,915 B2 | 6/2013 | Breen et al. |
| 8,468,196 B1 | 6/2013 | Roskind et al. |
| 8,493,931 B1 | 7/2013 | Nix |
| 8,509,225 B2 | 8/2013 | Grabelsky et al. |
| 8,526,306 B2 | 9/2013 | Jungck et al. |
| 8,532,075 B2 | 9/2013 | Rassool et al. |
| 8,537,805 B2 | 9/2013 | Björsell et al. |
| 8,542,815 B2 | 9/2013 | Perreault et al. |
| 8,543,477 B2 | 9/2013 | Love et al. |
| 8,599,747 B1 | 12/2013 | Saleem et al. |
| 8,599,837 B2 | 12/2013 | Kyle |
| 8,605,714 B2 | 12/2013 | Lebizay |
| 8,605,869 B1 | 12/2013 | Mobarak et al. |
| 8,607,323 B2 | 12/2013 | Yuan |
| 8,611,354 B2 | 12/2013 | Keränen et al. |
| 8,625,578 B2 | 1/2014 | Roy et al. |
| 8,627,211 B2 | 1/2014 | Kropivny |
| 8,630,234 B2 | 1/2014 | Björsell et al. |
| 8,634,838 B2 | 1/2014 | Hellwig et al. |
| 8,675,566 B2 | 3/2014 | Huttunen et al. |
| 8,682,919 B1 | 3/2014 | Golliher |
| 8,702,505 B2 | 4/2014 | Kropivny |
| 8,713,098 B1 | 4/2014 | Adya et al. |
| 8,724,643 B2 | 5/2014 | Feuer |
| 8,749,610 B2 | 6/2014 | Gossweiler et al. |
| 8,750,290 B2 | 6/2014 | Vance et al. |
| 8,763,081 B2 | 6/2014 | Bogdanovic et al. |
| 8,767,717 B2 | 7/2014 | Siegel et al. |
| 8,768,951 B2 | 7/2014 | Crago |
| 8,774,171 B2 | 7/2014 | Mitchell |
| 8,774,378 B2 | 7/2014 | Björsell et al. |
| 8,774,721 B2 | 7/2014 | Hertel et al. |
| 8,780,703 B1 | 7/2014 | Eidelson et al. |
| 8,792,374 B1 | 7/2014 | Jain et al. |
| 8,792,905 B1 | 7/2014 | Li et al. |
| 8,804,705 B2 | 8/2014 | Fangman et al. |
| 8,805,345 B2 | 8/2014 | Ling et al. |
| 8,810,392 B1 | 8/2014 | Teller et al. |
| 8,819,566 B2 | 8/2014 | Mehin et al. |
| 8,837,360 B1 | 9/2014 | Mishra et al. |
| 8,838,539 B1 | 9/2014 | Ashcraft et al. |
| 8,848,887 B2 | 9/2014 | Willman et al. |
| 8,862,701 B2 | 10/2014 | Havriluk |
| 8,885,609 B2 | 11/2014 | Nix |
| 8,903,051 B2 | 12/2014 | Li et al. |
| 8,903,360 B2 | 12/2014 | Celi, Jr. et al. |
| 8,909,556 B2 | 12/2014 | Huxham |
| 8,938,209 B2 | 1/2015 | Crawford et al. |
| 8,938,534 B2 | 1/2015 | Le et al. |
| 8,948,061 B2 | 2/2015 | Sridhar |
| 8,972,612 B2 | 3/2015 | Le et al. |
| 8,982,719 B2 | 3/2015 | Seetharaman et al. |
| 8,995,428 B2 | 3/2015 | Haster |
| 9,003,306 B2 | 4/2015 | Mehin et al. |
| 2001/0027478 A1 | 10/2001 | Meier et al. |
| 2001/0052081 A1 | 12/2001 | McKibben et al. |
| 2002/0002041 A1 | 1/2002 | Lindgren et al. |
| 2002/0018445 A1 | 2/2002 | Kobayashi |
| 2002/0051518 A1 | 5/2002 | Bondy et al. |
| 2002/0116464 A1 | 8/2002 | Mak |
| 2002/0122391 A1 | 9/2002 | Shalit |
| 2002/0141352 A1 | 10/2002 | Fangman et al. |
| 2003/0012196 A1 | 1/2003 | Ramakrishnan |
| 2003/0095539 A1 | 5/2003 | Feuer |
| 2003/0179747 A1 | 9/2003 | Pyke et al. |
| 2003/0200311 A1 | 10/2003 | Baum |
| 2003/0219103 A1 | 11/2003 | Rao et al. |
| 2004/0022237 A1 | 2/2004 | Elliott et al. |
| 2004/0034793 A1 | 2/2004 | Yuan |
| 2004/0157629 A1 | 8/2004 | Kallio et al. |
| 2004/0165709 A1 | 8/2004 | Pence et al. |
| 2004/0181599 A1 | 9/2004 | Kreusch et al. |
| 2004/0202295 A1 | 10/2004 | Shen et al. |
| 2004/0203565 A1 | 10/2004 | Chin et al. |
| 2004/0203582 A1 | 10/2004 | Dorenbosch et al. |
| 2004/0240439 A1 | 12/2004 | Castleberry et al. |
| 2004/0255126 A1 | 12/2004 | Reith |
| 2005/0025043 A1 | 2/2005 | Mussman et al. |
| 2005/0063519 A1 | 3/2005 | James |
| 2005/0083911 A1 | 4/2005 | Grabelsky et al. |
| 2005/0094651 A1 | 5/2005 | Lutz et al. |
| 2005/0131813 A1 | 6/2005 | Gallagher et al. |
| 2005/0169248 A1 | 8/2005 | Truesdale et al. |
| 2005/0171898 A1 | 8/2005 | Bishop et al. |
| 2005/0174937 A1 | 8/2005 | Scoggins et al. |
| 2005/0177843 A1 | 8/2005 | Williams |
| 2005/0188081 A1 * | 8/2005 | Gibson et al. ................. 709/224 |
| 2005/0190892 A1 | 9/2005 | Dawson et al. |
| 2005/0192897 A1 | 9/2005 | Rogers et al. |
| 2005/0192901 A1 | 9/2005 | McCoy et al. |
| 2005/0198499 A1 | 9/2005 | Salapaka et al. |
| 2005/0202799 A1 | 9/2005 | Rollender |
| 2005/0222952 A1 | 10/2005 | Garrett et al. |
| 2005/0267842 A1 | 12/2005 | Weichert et al. |
| 2005/0287979 A1 | 12/2005 | Rollender |
| 2006/0006224 A1 | 1/2006 | Modi |
| 2006/0007940 A1 | 1/2006 | Sollee et al. |

(56) References Cited

U.S. PATENT DOCUMENTS

| | | |
|---|---|---|
| 2006/0013266 A1 | 1/2006 | Vega-Garcia et al. |
| 2006/0030290 A1 | 2/2006 | Rudolf et al. |
| 2006/0036522 A1 | 2/2006 | Perham |
| 2006/0072547 A1 | 4/2006 | Florkey et al. |
| 2006/0072550 A1 | 4/2006 | Davis et al. |
| 2006/0078094 A1 | 4/2006 | Breen et al. |
| 2006/0093135 A1 | 5/2006 | Fiatal et al. |
| 2006/0095320 A1 | 5/2006 | Jones |
| 2006/0111116 A1 | 5/2006 | Palmer et al. |
| 2006/0116892 A1 | 6/2006 | Grimes et al. |
| 2006/0142011 A1 | 6/2006 | Kallio |
| 2006/0146797 A1 | 7/2006 | Lebizay |
| 2006/0153342 A1 | 7/2006 | Sasaki |
| 2006/0160565 A1 | 7/2006 | Singh et al. |
| 2006/0177035 A1 | 8/2006 | Cope et al. |
| 2006/0189303 A1 | 8/2006 | Rollender |
| 2006/0195398 A1 | 8/2006 | Dheer et al. |
| 2006/0205383 A1 | 9/2006 | Rollender et al. |
| 2006/0209768 A1 | 9/2006 | Yan et al. |
| 2006/0248186 A1* | 11/2006 | Smith .................... 709/224 |
| 2006/0251056 A1 | 11/2006 | Feuer |
| 2006/0258328 A1 | 11/2006 | Godoy |
| 2006/0264200 A1 | 11/2006 | Laiho et al. |
| 2006/0268921 A1* | 11/2006 | Ekstrom et al. ............... 370/437 |
| 2006/0281437 A1 | 12/2006 | Cook |
| 2007/0016524 A1 | 1/2007 | Diveley et al. |
| 2007/0036143 A1 | 2/2007 | Alt et al. |
| 2007/0047548 A1 | 3/2007 | Yazaki et al. |
| 2007/0053382 A1 | 3/2007 | Bevan et al. |
| 2007/0092070 A1 | 4/2007 | Croy et al. |
| 2007/0112964 A1 | 5/2007 | Guedalia et al. |
| 2007/0115935 A1 | 5/2007 | Qiu et al. |
| 2007/0121593 A1 | 5/2007 | Vance et al. |
| 2007/0127676 A1 | 6/2007 | Khadri |
| 2007/0174469 A1 | 7/2007 | Andress et al. |
| 2007/0217354 A1 | 9/2007 | Buckley |
| 2007/0220038 A1 | 9/2007 | Crago |
| 2007/0253418 A1 | 11/2007 | Shiri et al. |
| 2007/0253429 A1 | 11/2007 | James |
| 2007/0263609 A1 | 11/2007 | Mitchell |
| 2007/0297376 A1 | 12/2007 | Gass |
| 2008/0013523 A1 | 1/2008 | Nambakkam |
| 2008/0037715 A1 | 2/2008 | Prozeniuk et al. |
| 2008/0056235 A1 | 3/2008 | Albina et al. |
| 2008/0056243 A1 | 3/2008 | Roy et al. |
| 2008/0056302 A1 | 3/2008 | Erdal et al. |
| 2008/0063153 A1 | 3/2008 | Krivorot et al. |
| 2008/0166999 A1 | 7/2008 | Guedalia et al. |
| 2008/0167019 A1 | 7/2008 | Guedalia et al. |
| 2008/0167020 A1 | 7/2008 | Guedalia et al. |
| 2008/0167039 A1 | 7/2008 | Guedalia et al. |
| 2008/0187122 A1 | 8/2008 | Baker |
| 2008/0188198 A1 | 8/2008 | Patel et al. |
| 2008/0188227 A1 | 8/2008 | Guedalia et al. |
| 2008/0205378 A1 | 8/2008 | Wyss et al. |
| 2008/0310599 A1 | 12/2008 | Purnadi et al. |
| 2009/0003535 A1 | 1/2009 | Grabelsky et al. |
| 2009/0028146 A1 | 1/2009 | Kleyman et al. |
| 2009/0129566 A1 | 5/2009 | Feuer |
| 2009/0135724 A1 | 5/2009 | Zhang et al. |
| 2009/0135735 A1 | 5/2009 | Zhang et al. |
| 2009/0141883 A1 | 6/2009 | Bastien |
| 2009/0213839 A1 | 8/2009 | Davis et al. |
| 2009/0214000 A1 | 8/2009 | Patel et al. |
| 2009/0268615 A1 | 10/2009 | Pelletier |
| 2009/0292539 A1 | 11/2009 | Jaroker |
| 2009/0296900 A1 | 12/2009 | Breen et al. |
| 2009/0325558 A1 | 12/2009 | Pridmore et al. |
| 2010/0008345 A1 | 1/2010 | Lebizay |
| 2010/0039946 A1* | 2/2010 | Imbimbo et al. ............... 370/252 |
| 2010/0083364 A1 | 4/2010 | Gutierrez |
| 2010/0086119 A1 | 4/2010 | De Luca et al. |
| 2010/0105379 A1 | 4/2010 | Bonner et al. |
| 2010/0114896 A1 | 5/2010 | Clark et al. |
| 2010/0115018 A1 | 5/2010 | Yoon et al. |
| 2010/0128729 A1 | 5/2010 | Yazaki et al. |
| 2010/0142382 A1 | 6/2010 | Jungck et al. |
| 2010/0150138 A1 | 6/2010 | Björsell et al. |
| 2010/0150328 A1 | 6/2010 | Perreault et al. |
| 2010/0172345 A1 | 7/2010 | Björsell et al. |
| 2010/0177671 A1 | 7/2010 | Qiu et al. |
| 2010/0220852 A1 | 9/2010 | Willman et al. |
| 2010/0233991 A1 | 9/2010 | Crawford et al. |
| 2010/0246589 A1 | 9/2010 | Pelletier |
| 2010/0272242 A1 | 10/2010 | Croy et al. |
| 2010/0278534 A1 | 11/2010 | Leiden et al. |
| 2010/0316195 A1 | 12/2010 | Di Serio et al. |
| 2011/0013541 A1 | 1/2011 | Croy et al. |
| 2011/0072095 A1 | 3/2011 | Havriluk |
| 2011/0122827 A1 | 5/2011 | Björsell et al. |
| 2011/0153809 A1 | 6/2011 | Ghanem et al. |
| 2011/0167164 A1 | 7/2011 | Gutierrez |
| 2011/0176541 A1 | 7/2011 | James |
| 2011/0201321 A1 | 8/2011 | Bonner |
| 2011/0208859 A1 | 8/2011 | Gutierrez |
| 2011/0235543 A1 | 9/2011 | Seetharaman et al. |
| 2011/0255553 A1 | 10/2011 | Bobba et al. |
| 2011/0261717 A1 | 10/2011 | Akuzuwa et al. |
| 2011/0267986 A1 | 11/2011 | Grabelsky et al. |
| 2011/0273526 A1 | 11/2011 | Mehin et al. |
| 2011/0276903 A1 | 11/2011 | Mehin et al. |
| 2011/0276904 A1 | 11/2011 | Mehin et al. |
| 2011/0292929 A1 | 12/2011 | Haster |
| 2012/0014383 A1 | 1/2012 | Geromel et al. |
| 2012/0089717 A1 | 4/2012 | Chen |
| 2012/0096145 A1 | 4/2012 | Le et al. |
| 2012/0099599 A1 | 4/2012 | Keränen et al. |
| 2012/0113981 A1 | 5/2012 | Feuer |
| 2012/0155333 A1 | 6/2012 | Yoon et al. |
| 2012/0170574 A1 | 7/2012 | Huttunen et al. |
| 2012/0195236 A1 | 8/2012 | Knight |
| 2012/0195415 A1 | 8/2012 | Wyss et al. |
| 2012/0227101 A1 | 9/2012 | Yuan |
| 2012/0250624 A1 | 10/2012 | Lebizay |
| 2012/0259975 A1 | 10/2012 | Le et al. |
| 2012/0270554 A1 | 10/2012 | Hellwig et al. |
| 2012/0282881 A1 | 11/2012 | Mitchell |
| 2012/0314699 A1 | 12/2012 | Qiu et al. |
| 2013/0039226 A1 | 2/2013 | Sridhar |
| 2013/0097308 A1 | 4/2013 | Le et al. |
| 2013/0114589 A1 | 5/2013 | Fangman et al. |
| 2013/0128879 A1 | 5/2013 | Kyle |
| 2013/0148549 A1 | 6/2013 | Crawford et al. |
| 2013/0173534 A1 | 7/2013 | Nelakonda et al. |
| 2013/0223276 A1 | 8/2013 | Padgett |
| 2013/0237198 A1 | 9/2013 | Vashi et al. |
| 2013/0254301 A1 | 9/2013 | Lin et al. |
| 2013/0272297 A1 | 10/2013 | Breen et al. |
| 2013/0281147 A1 | 10/2013 | Denman et al. |
| 2013/0287006 A1 | 10/2013 | Nix |
| 2013/0310002 A1 | 11/2013 | Celi, Jr. et al. |
| 2013/0318166 A1 | 11/2013 | Jungck et al. |
| 2013/0329722 A1 | 12/2013 | Perrault et al. |
| 2013/0329864 A1 | 12/2013 | Björsell et al. |
| 2014/0010119 A1 | 1/2014 | Björsell et al. |
| 2014/0016764 A1 | 1/2014 | Björsell et al. |
| 2014/0024367 A1 | 1/2014 | Björsell et al. |
| 2014/0101749 A1 | 4/2014 | Yuan |
| 2014/0141884 A1 | 5/2014 | Kropivny |
| 2014/0153477 A1 | 6/2014 | Huttunen et al. |
| 2014/0211789 A1 | 7/2014 | Feuer |
| 2014/0215642 A1 | 7/2014 | Huxham |
| 2014/0220944 A1 | 8/2014 | Balasubramanian |
| 2014/0244393 A1 | 8/2014 | Rimmer et al. |
| 2014/0247730 A1 | 9/2014 | Thota et al. |
| 2014/0269624 A1 | 9/2014 | Khay-Ibbat et al. |
| 2014/0307858 A1 | 10/2014 | Li et al. |
| 2014/0321333 A1 | 10/2014 | Björsell et al. |
| 2014/0324969 A1 | 10/2014 | Riddle |
| 2014/0337961 A1 | 11/2014 | Chien et al. |

(56) References Cited

U.S. PATENT DOCUMENTS

| | | | |
|---|---|---|---|
| 2014/0337962 | A1 | 11/2014 | Brandstatter |
| 2014/0349602 | A1 | 11/2014 | Majumdar et al. |

FOREIGN PATENT DOCUMENTS

| | | |
|---|---|---|
| CA | 2 218 218 A1 | 10/1997 |
| CA | 2249668 | 4/1999 |
| CA | 2 299 037 A1 | 8/2000 |
| CA | 2 437 275 A1 | 10/2002 |
| CA | 2598200 A1 | 2/2008 |
| CA | 2668025 A1 | 5/2008 |
| CA | 2670510 A1 | 6/2008 |
| CA | 2 681 984 A1 | 10/2008 |
| CA | 2 690 236 A1 | 12/2008 |
| CA | 2 659 007 A1 | 9/2009 |
| CA | 2732148 A1 | 2/2010 |
| CA | 2 778 905 A1 | 8/2010 |
| CA | 2812174 A1 | 3/2011 |
| CN | 1498029 A | 5/2004 |
| CN | 1498482 A | 5/2004 |
| CN | 1668137 A | 9/2005 |
| CN | 1274114 C | 9/2006 |
| CN | 101005503 A | 7/2007 |
| CN | 101069390 A | 11/2007 |
| CN | 101095329 A | 12/2007 |
| CN | 101584150 A | 11/2009 |
| CN | 101584166 A | 11/2009 |
| CN | 101605342 A | 12/2009 |
| CN | 1498029 B | 5/2010 |
| CN | 101772929 A | 7/2010 |
| CN | 101069390 B | 12/2010 |
| CN | 102137024 A | 7/2011 |
| CN | 102457494 A | 5/2012 |
| CN | 102484656 A | 5/2012 |
| CN | 102572123 A | 7/2012 |
| CN | 101095329 B | 10/2012 |
| CN | 101605342 B | 12/2012 |
| CN | 102833232 A | 12/2012 |
| CN | 101005503 B | 1/2013 |
| CN | 101772929 B | 7/2014 |
| CN | 102457494 B | 10/2014 |
| DE | 602 01 827 T2 | 11/2005 |
| DE | 11 2005 003 306 T5 | 1/2008 |
| DE | 601 33 316 T2 | 7/2008 |
| DE | 603 17 751 T2 | 11/2008 |
| EP | 0 841 832 A2 | 5/1998 |
| EP | 0 841 832 A3 | 5/1999 |
| EP | 1 032 224 A2 | 8/2000 |
| EP | 1 032 224 A3 | 8/2000 |
| EP | 1 244 250 A1 | 9/2002 |
| EP | 1 266 516 A2 | 12/2002 |
| EP | 1 362 456 A2 | 11/2003 |
| EP | 1 371 173 A1 | 12/2003 |
| EP | 1 389 862 A1 | 2/2004 |
| EP | 1 411 743 A1 | 4/2004 |
| EP | 1 389 862 B1 | 11/2004 |
| EP | 1 526 697 A2 | 4/2005 |
| EP | 1 362 456 A4 | 5/2005 |
| EP | 1 575 327 A1 | 9/2005 |
| EP | 1 610 583 A1 | 12/2005 |
| EP | 1 526 697 A3 | 3/2006 |
| EP | 1 721 446 A1 | 11/2006 |
| EP | 1 829 300 A1 | 9/2007 |
| EP | 1 371 173 B1 | 11/2007 |
| EP | 1 411 743 B1 | 11/2007 |
| EP | 1 362 456 B1 | 3/2008 |
| EP | 1 974 304 A2 | 10/2008 |
| EP | 1 974 304 A4 | 10/2008 |
| EP | 1 610 583 B1 | 8/2009 |
| EP | 2 084 868 | 8/2009 |
| EP | 2 090 024 | 8/2009 |
| EP | 2 127 232 A1 | 12/2009 |
| EP | 2 165 489 A1 | 3/2010 |
| EP | 2 215 755 A1 | 8/2010 |
| EP | 2 227 048 A1 | 9/2010 |
| EP | 2 127 232 A4 | 3/2011 |
| EP | 2 165 489 A4 | 3/2011 |
| EP | 2 311 292 | 4/2011 |
| EP | 1 829 300 A4 | 5/2012 |
| EP | 2 449 749 A1 | 5/2012 |
| EP | 2 478 678 | 7/2012 |
| EP | 2 215 755 A4 | 10/2012 |
| EP | 1 829 300 B1 | 11/2012 |
| EP | 2 449 749 B1 | 3/2014 |
| EP | 1 266 516 B1 | 5/2014 |
| ID | W00200902627 | 9/2009 |
| IN | 24/2009 | 6/2009 |
| IN | 1047/MUMNP/2009 A | 6/2009 |
| IN | 29/2009 | 7/2009 |
| IN | 1227/MUMNP/2009 A | 7/2009 |
| JP | 2011-199384 (A) | 10/2011 |
| KR | 10-2009-0086428 (A) | 8/2009 |
| KR | 10-2009-0095621 (A) | 9/2009 |
| MX | 2009004811 A | 8/2009 |
| MX | 2009005751 A | 8/2009 |
| SG | 151991 A1 | 6/2009 |
| SG | 152752 A1 | 6/2009 |
| SG | 155474 | 10/2009 |
| WO | WO 01/50693 A1 | 7/2001 |
| WO | WO 01/69899 A2 | 9/2001 |
| WO | WO 01/69899 A3 | 9/2001 |
| WO | WO 01/80587 A1 | 10/2001 |
| WO | WO 02/082728 A1 | 10/2002 |
| WO | WO 02/082782 A2 | 10/2002 |
| WO | WO 02/082782 A3 | 10/2002 |
| WO | WO 03/027801 A2 | 4/2003 |
| WO | WO 2005/084002 A1 | 9/2005 |
| WO | WO 2006/067269 A1 | 6/2006 |
| WO | WO 2006/072099 A1 | 7/2006 |
| WO | WO 2006/078175 A2 | 7/2006 |
| WO | WO 2006/078175 A3 | 7/2006 |
| WO | WO 2007/044454 A2 | 4/2007 |
| WO | WO 2007/056158 A2 | 5/2007 |
| WO | WO 2007/087077 A2 | 8/2007 |
| WO | WO 2007/087077 A3 | 8/2007 |
| WO | WO 2008/027065 A1 | 3/2008 |
| WO | WO 2008/052340 A1 | 5/2008 |
| WO | WO 2008/064481 A1 | 6/2008 |
| WO | WO 2008/085614 A2 | 7/2008 |
| WO | WO 2008/085614 A3 | 7/2008 |
| WO | WO 2008/086350 A2 | 7/2008 |
| WO | WO 2008/086350 A3 | 7/2008 |
| WO | WO 2008/103652 A1 | 8/2008 |
| WO | WO 2008/116296 A1 | 10/2008 |
| WO | WO 2008/085614 A8 | 12/2008 |
| WO | WO 2008/151406 A1 | 12/2008 |
| WO | WO 2008/151406 A8 | 12/2008 |
| WO | WO 2009/070202 A1 | 6/2009 |
| WO | WO 2009/070278 A1 | 6/2009 |
| WO | WO 2010/012090 A2 | 2/2010 |
| WO | WO 2011/000405 A1 | 1/2011 |
| WO | WO 2011/032256 A1 | 3/2011 |
| WO | WO 01/89145 A2 | 11/2011 |
| WO | WO 2013/013189 A2 | 1/2013 |
| WO | WO 2013/120069 A1 | 8/2013 |
| WO | WO 2014/066155 A2 | 5/2014 |
| WO | WO 2014/117599 A1 | 8/2014 |
| WO | WO 2014-166258 A1 | 10/2014 |

OTHER PUBLICATIONS

Extended European Search Report dated Dec. 20, 2013 for European Application No. EP 09 849 358.8.
F. Baker et al. "RFC 3924—Cisco Architecture for Lawful Intercept in IP Networks." Oct. 2004.
Cisco. "*Lawful Intercept Requirements Summary.*" http://www.faqs.org/rfcs/rfc3924.html. Nov. 8, 2006.
Sippy Sip B2BUA. "*About Sippy RTPproxy.*" http://www.rtpproxy.org. Jul. 15, 2009.

(56) References Cited

OTHER PUBLICATIONS

ETSI Technical Specification. "Lawful Interception (LI); Handover Interface and Service-Specific Details (SSD) for IP delivery; Part 5: Service-specific details for IP Multimedia Services." Apr. 2008, 25 pgs, v.2.3.1, France.
M. Handley et al. "RFC 2543—SIP: Session Initiation Protocol." Mar. 1999.
International Search Report and Written Opinion of the International Searching Authority completed Jun. 6, 2008 for related PCT/CA2008/000545.
International Search Report and Written Opinion of the International Searching Authority completed Feb. 6, 2008 for corresponding PCT/CA2007/001956.
International Preliminary Report on Patentability mailed May 14, 2009 for corresponding PCT/CA2007/001956.
International Search Report and Written Opinion of the International Searching Authority completed Mar. 3, 2008 for related PCT/CA2007/002150.
International Preliminary Report on Patentability mailed Feb. 13, 2009 for related PCT/CA2007/002150.
International Preliminary Report on Patentability and Written Opinion of the International Searching Authority mailed Feb. 10, 2011 for related PCT Application No. PCT/CA2009/001062, Feb. 1, 2011.
Written Opinion and International Search Report completed on Jun. 18, 2010 for related PCT Application No. PCT/CA2009/001317.
International Search Report and Written Opinion mailed on Mar. 12, 2010 for corresponding PCT Application No. PCT/CA2009/001062.
International Preliminary Report on Patentability issued on Sep. 29, 2009 for PCT/CA2008/000545.
International Preliminary Report on Patentability issued on Mar. 20, 2012 for PCT/CA2009/001317.
Townsley, et al.; "RFC 2661—Layer Two Tunneling Protocol 'L2TP' ", Aug. 1999.
IP2Location, http://www.ip2location.com/; printed Jun. 20, 2012.
DOTS IP Address Validation, "Overview", http://www.serviceobjects.com/products/dots_ipgeo.asp; printed Jun. 21, 2012.
List of North American Numbering Plan area codes, http://en.wikipedia.org/wiki/List_of_NANP_area_codes; printed Jun. 20, 2012.
DOTS Phone Exchange, "Overview", http://www.serviceobjects.com/demos/PhoneExchangeDemo.asp (URL no longer valid, current URL is http://vvww.serviceobjects.com/products/phone/phone-exchange); printed Jun. 21, 2012.
Rosenberg, et al.; "RFC 3261—SIP: Session Initiation Protocol", Jun. 2002.
Lind AT&T S: "ENUM Call Flows for VoIP Interworking; draft-lind-enum-callflows-03.txt", No. 3, Feb. 1, 2002, pp. 1-17, XP015004214, ISSN: 0000-0004.
IETF ENUM WG R STASTNY OEFEG Informational Numbering for VOIP and Other IP Communications: "Numbering for ViOP and other IP Communications, draft-stastny-enum-numbering-voip-00.txt", Oct. 1, 2003, pp. 1-43, XP015035676, ISSN: 0000-0004.
Supplementary European Search Report for European Application No. 07816106, dated Jun. 18, 2012.
Supplementary European Search Report for European Application No. 07816106, dated Nov. 2, 2012.
Wikipedia, "International mobile subscriber identity (IMSI)," http://en.wikipedia.org/wiki/IMSI, Jul. 16, 2013.
Wikipedia, "Roaming," http://en.wikipedia.org/wiki/Roaming, Jul. 16, 2013.
Extended European Search Report dated Apr. 16, 2014 for European Patent Application No. EP 09 802 316.1 which shares priority of U.S. Appl. No. 61/129,898, filed Jul. 28, 2008 with U.S. Appl. No. 13/056,277, filed Jan. 27, 2011, which is related to captioned U.S. Appl. No. 13/863,306, and cites above-identified reference Nos. 1 and 2.
Baker et al., "Cisco Support for Lawful Intercept In IP Networks," Internet Draft—working document of the Internet Engineering Task Force (IETF), accessible at http://www.ietf.org/ietf/lid-abstracts.txt, Apr. 2003, expires Sep. 30, 2003, pp. 1-15.

Bhushan et al., "Federated Accounting: Service Charging and Billing in a Business-to-Business Environment," 0-7803-6719-7/01, © 2001 IEEE, pp. 107-121.
Jajszczyk et al., "Emergency Calls in Flow-Aware Networks," *IEEE Communications Letters*, vol. 11, No. 9, Sep. 2007, pp. 753-755.
Kim et al., "An Enhanced VoIP Emergency Services Prototype," *Proceedings of the 3rd International ISCRAM Conference (B. Van de Walle and M. Turoff, eds.)*, Newark, NJ (USA), May 2006, pp. 1-8.
Kornfeld et al., "DVB-H and IP Datacast—Broadcast to Handheld Devices," *IEEE Transactions On Broadcasting*, vol. 53, No. 1, Mar. 2007, pp. 161-170.
Kortebi et al., "SINR-Based Routing in Multi-Hop Wireless Networks to Improve VoIP Applications Support," 1-4244-0667-6/07, © 2007 IEEE, pp. 491-496.
Lee et al., "VoIP Interoperation with KT-NGN," in *The 6th International Conference on Advanced Communication Technology*, Technical Proceedings, 2004, pp. 126-128, accompanied by Title and Contents—4 pages.
Lin et al., "Effective VoIP Call Routing in WLAN and Cellular Integration," *IEEE Communications Letters*, vol. 9, No. 10, Oct. 2005, pp. 874-876.
Ma et al., "Realizing MPEG4 Video Transmission Based on Mobile Station over GPRS," 0-7803-9335-X/05, © 2005 IEEE, pp. 1241-1244.
Mintz-Habib et al., "A VoIP Emergency Services Architecture and Prototype," {mm2571,asr,hgs,xiaotaow}@cs.columbia.edu, 0-7803-9428-3/05, © 2005 IEEE, pp. 523-528.
Munir, Muhammad Farukh, "Study of an Adaptive Scheme for Voice Transmission on IP in a Wireless Networking Environment 802.11e," *Dept. of Networks and Distributed Computing, Ecole Supérieure En Sciences Informatiques (ESSI), Université De Nice*, Jun. 2005, (pp. 1-35), Best Available Copy—pp. 1-11.
Sripanidkulchai et al., "Call Routing Management in Enterprise VoIP Networks," *Copyright 2007 ACM 978-1-59593-788-9/07/0008*, 6 pages.
Thernelius, Fredrik, "SIP, NAT, and Firewalls," Master's Thesis, *Ericsson, Department of Teleinformatics*, May 2000, pp. 1-69.
Trad et al., "Adaptive VoIP Transmission over Heterogeneous Wired/Wireless Networks," *V. Roca and F. Rousseau (Eds.): MIPS 2004*, LNCS 3311, pp. 25-36, 2004, © Springer-Verlag Berlin Heidelberg 2004.
Yu et al., "Service-Oriented Issues: Mobility, Security, Charging and Billing Management in Mobile Next Generation Networks," *IEEE BcN2006*, 1-4244-0146-1/06, © 2006 IEEE, pp. 1-10.
ETSI TS 122 173 V12.7.0 (Oct. 2014) Digital cellular telecommunications system (Phase 2+); Technical Specification 8.2.2.3—Interoperability with PSTN/ISDN and mobile CS Networks, Contents and Forward, pp. 1-9; Sec. 8, pp. 14-17.
Huitema et al., "Architecture for Internet Telephony Service for Residential Customers," Academic Paper for *Bellcore*, Mar. 2, 1999, pp. 1-14.
Stallings, William, "The Session Initiation Protocol," *The Internet Protocol Journal*, vol. 6, No. 1, Mar. 2003, pp. 20-30.
Chinese Office Action dated Mar. 24, 2011 for Chinese Patent Application No. CN 200780049791.5.
Chinese Office Action dated Jun. 23, 2011 for Chinese Patent Application No. CN 200780049136.X.
Canadian Office Action dated Jan. 27, 2015 for Canadian Patent Application No. CA 2,681,984.
Indonesian Examination Report dated Jul. 5, 2012 for Indonesian Patent Application No. W-00200901414.
Indonesian Examination Report dated Feb. 8, 2013 for Indonesian Patent Application No. W-00200901165.
Mexican Exam Report dated Jul. 11, 2011 for Mexican Patent Application No. MX/a/2009/004811.
Mexican Notice of Allowance dated Sep. 2, 2011 for Mexican Patent Application No. MX/a/2009/005751.
Ketchpel et al. "U-PAI: A universal payment application interface" *Second USENIX Workshop on Electronic Commerce Proceedings*, 1996-8, pp. 1-17.

(56) References Cited

OTHER PUBLICATIONS

Moberg & Drummond, "MIME-Based Secure Peer-to-Peer Business Data Interchange Using HTTP, Applicability Statement 2 (AS2)," *Network Working Group*, Request for Comments: 4130, Category: Standards Track, Copyright © The Internet Society Jul. 2005, pp. 1-47.

Abrazhevich, Dennis, "Electronic Payment Systems: a User-Centered Perspective and Interaction Design," *Thesis under the auspices of the J.F. Schouten School for User-System Interaction Research*, Technische Universiteit Eindhoven, Netherlands, 2004, pages Cover p.-p. 189.

* cited by examiner

SIP Invite Message

60 — Caller  2001 1050 8667
62 — Callee  2001 1050 2222
64 — Digest Parameters  XXXXXXX
65 — Call ID  FF10@ 192.168.0.20
67 — Caller IP Address  192.168.0.20
69 — Caller UDP port  12345

Dialing Profile for a User ← 256

| | | |
|---|---|---|
| 258— | Username | Assigned on Subscription |
| 260— | Domain | Domain Associated with User |
| 262— | NDD | National Dialing Digit Code |
| 264— | IDD | International Dialing Digit Code |
| 266— | Country Code | Country Dependant Code |
| 267— | Local Area Codes | Numeric |
| 268— | Caller Minimum Local Length | Numeric |
| 270— | Caller Maximum Local Length | Numeric |
| 273— | Reseller | Retailer |
| 1150— | Media Relay 1 | Optional Media relay IDentifier #1 |
| 1150— | Media Relay n | Optional Media relay IDentifier #2 |
| 702— | LI flag | on or off |
| 704— | MD1 Address | Address of First Mediation Device |
| 706— | Warrant ID | From Law Enforcement Agency |
| 708— | LI-Start Date/Time | When to Begin Monitoring Period |
| 710— | LI-Stop Date/Time | When to End Monitoring Period |

FIG. 9

Dialing Profile for Vancouver Subscriber ← 276

| | | |
|---|---|---|
| 258— | Username | 2001 1050 8667 |
| 260— | Domain | sp.yvr.digifonica.com ← 282 |
| 262— | NDD | 1 |
| 264— | IDD | 011 |
| 266— | Country Code | 1 |
| 267— | Local Area Codes | 604;778 (Vancouver) |
| 268— | Caller Minimum Local Length | 10 |
| 270— | Caller Maximum Local Length | 10 |
| 273— | Reseller | Klondike |
| | MR 1 | 192.168.1.10 |
| | ⋮ | |
| | MR N | 192.168.2.59 |

Dialing Profile for Calgary Subscriber

| | |
|---:|:---|
| Username | 2001 1050 2222 |
| Domain | sp.yvr.digifonica.com |
| NDD | 1 |
| IDD | 011 |
| Country Code | 1 |
| Local Area Codes | 403 (Calgary) |
| Caller Minimum Local Length | 7 |
| Caller Maximum Local Length | 10 |
| Reseller | ABC |
| MR1 | 192.168.3.60 |
| ⋮ | |
| MRn | 192.168.4.69 |

FIG. 11

Dialing Profile for London Subscriber

| | |
|---:|:---|
| Username | 4401 1062 4444 |
| Domain | sp.lhr.digifonica.com |
| NDD | 0 |
| IDD | 00 |
| Country Code | 44 |
| Local Area Codes | 20 (London) |
| Caller Minimum Local Length | 10 |
| Caller Maximum Local Length | 11 |
| Reseller | DEF |
| MR1 | 192.168.5.70 |
| ⋮ | |
| MRn | 192.168.6.79 |

FIG. 12

DID Bank Table Record Format ⟵ 268

281 ⟶ Username    System subscriber
    272 ⟶ User Domain  Host name of supernode
    274 ⟶ DID        E164#

FIG. 13

DID Bank Table Record for London Subscriber ⟵ 291

281 ⟶ Username    4401 1062 4444
    272 ⟶ User Domain  sp.lhr.digifonica.com
    274 ⟶ DID        44  020  7487  7900
                                   283  285  287  289

FIG. 14

Routing Message Format — 352

- 354 — Supplier Prefix (optional) — Code identifying supplier traffic
- 356 — Delimiter — Symbol separating fields
- 358 — Callee — PSTN compatible number or Digifonica number
- 360 — Route — Domain name and IP address
- 362 — Time to Live(TTL) — In seconds
- 364 — Other — TBD

FIG. 15

Routing Message – Different Node — 366

440110624444@sp.lhr.digifonica.com;ttl=9999

- 358 | 360 | 362
- 1152 — Media Relays (optional)

FIG. 16

Routing Message – Different Node with lawful intercept fields

440110624444@sp.lhr.digifonica.com;ttl=999;LIflag=on;MDaddress=192.168.1.10;
WarrantID=20060515142;
LIstart=2006 05 16 00:00:00
LIstop=2006 12 31 23:59:59;
1152 — Media Relays (optional)

FIG. 16A

Prefix to Supernode Table Record Format — 370

- 372 — Prefix — First n digits of callee identifier
- 374 — Supernode Address — IP address or fully qualified domain name

FIG. 17

Prefix to Supernode Table Record for London Subscriber

Prefix 4
Supernode Address sp.lhr.digifonica.com

FIG. 18

Master List Record Format

| | | |
|---|---|---|
| 500 — | ml_ID | 1019 |
| 502 — | Dialing code | 1604 |
| 504 — | Country code | The country code is the national prefix to be used when dialing TO a particular country FROM another country. |
| 506 — | Nat Sign #(Area Code) | Numeric |
| 508 — | Min Length | Numeric |
| 510 — | Max Length | Numeric |
| 512 — | NDD | The NDD prefix is the access code used to make a call WITHIN that country from on city to another (when calling another city in the same vicinity, this may not be necessary). |
| 514 — | IDD | The IDD prefix is the international prefix needed to dial a call FROM the country listed TO another country. |
| 516 — | Buffer rate | Safe charge rate above the highest rate charged by suppliers |

FIG. 19

Example: Master List Record with Populated Fields

| | |
|---|---|
| Route_ID | 1019 |
| Dialing code | 1604 |
| Country code | 1 |
| Nat Sign #(Area Code) | 604 |
| Min Length | 7 |
| Max Length | 7 |
| NDD | 1 |
| IDD | 011 |
| Buffer rate | $0.009/min |

FIG. 20

Suppliers List Record Format

| | | |
|---|---|---|
| 540 — | Sup_ID | Name code |
| 542 — | Route_ID | Numeric code |
| 544 — | Prefix (optional) | String identifying supplier's traffic # |
| 546 — | Route | IP address |
| 548 — | NDD/IDD rewrite | |
| 550 — | Rate | Cost per second to Digifonica to use this route |

FIG. 21

Telus Supplier Record

| | | |
|---|---|---|
| | Sup_ID | 2010 (Telus) |
| | Route_ID | 1019 |
| | Prefix (optional) | 4973# |
| 546 — | Route | 72.64.39.58 |
| | NDD/IDD rewrite | 011 |
| 550 — | Rate | $0.02/min |

FIG. 22

Shaw Supplier Record

| | | |
|---|---|---|
| | Sup_ID | 2011 (Shaw) |
| | Route_ID | 1019 |
| | Prefix (optional) | 4974# |
| | Route | 73.65.40.59 |
| | NDD/IDD rewrite | 011 |
| 550 — | Rate | $0.025/min |

FIG. 23

Sprint Supplier Record

| | | |
|---|---|---|
| | Sup_ID | 2012 (Sprint) |
| | Route_ID | 1019 |
| | Prefix (optional) | 4975# |
| | Route | 74.66.41.60 |
| | NDD/IDD rewrite | 011 |
| 550 — | Rate | $0.03/min |

FIG. 24

Routing Message Buffer for Gateway Call

4973#0116048675309@72.64.39.58;ttl=3600 —— 570
4974#0116048675309@73.65.40.59;ttl=3600 —— 572
4975#0116048675309@74.66.41.60;ttl=3600 —— 574
Media Relays (optional) —— 1152

FIG. 25

Routing Message Buffer for Gateway Call with Lawful Intercept Fields

4973#0116048675309@72.64.39.58;ttl=3600
4974#0116048675309@73.65.40.59;ttl=3600
4975#0116048675309@74.66.41.60;ttl=3600
LIflag=on;MDaddress=192.168.1.10;WarrantID=20060515142;
LIstart=2006051600:00:00;LIstop=2006123123:59:59
Media Relays (optional) —— 1152

FIG. 25A

Call Block Record Format

| | | |
|---|---|---|
| 604 —— | Username | Digifonica # |
| 606 —— | Block Pattern | PSTN compatible or Digifonica # |

FIG. 26

Call Block Record for Calgary Callee

| | | |
|---|---|---|
| 604 —— | Username of Callee | 2001 1050 2222 |
| 606 —— | Block Pattern | 2001 1050 8664 |

FIG. 27

Call Forwarding Record Format for Callee

| | | |
|---|---|---|
| 614 —— | Username of Callee | Digifonica # |
| 616 —— | Destination Number | Digifonica # |
| 618 —— | Sequence Number | Integer indicating order to try this |

FIG. 28

Call Forwarding Table Record for Calgary Callee

614 — Username of Callee   2001 1050 2222
616 — Destination Number   2001 1055 2223
618 — Sequence Number   1

FIG. 29

Voicemail Table Record Format

624 — Username of Callee   Digifonica #
626 — Vm Server   domain name
628 — Seconds to Voicemail   time to wait before engaging voicemail
630 — Enabled   yes/no

FIG. 30

Voicemail Table Record for Calgary Callee

624 — Username of Callee   2001 1050 2222
626 — Vm Server   vm.yvr.digifonica.com
628 — Seconds to Voicemail   20
630 — Enabled   1

FIG. 31

Routing Message Buffer for CF/VM Routing Message

650 — 200110502222@sp.yvr.digifonica.com;ttl=3600
652 — 200110552223@sp.yvr.digifonica.com;ttl=3600
654 — vm.yvr.digifonica.com;20;ttl=60
656 — sp.yvr.digifonica.com
1152 — Media Relays (optional)

FIG. 32

Routing Message Buffer for CF/VM Routing Message with Caller Lawful Intercept Fields

200110502222@sp.yvr.digifonica.com;ttl=3600
200110552223@sp.yvr.digifonica.com;ttl=3600
vm.yvr.digifonica.com;20;ttl=60
sp.yvr.digifonica.com
LIflag=on;MDaddress=192.168.1.10;WarrantID=20060615142;
LIstart=2006061500:00:00;LIstop=2006123123:59:59
Media Relays (optional) — 1152

FIG. 32A

Routing Message Buffer for CF/VM Routing Message with Caller and Callee Lawful Intercept Fields

200110502222@sp.yvr.digifonica.com;ttl=3600
200110552223@sp.yvr.digifonica.com;ttl=3600
vm.yvr.digifonica.com;20;ttl=60
sp.yvr.digifonica.com
LI1flag=on;Mdaddress=192.168.1.10;WarrantID=20060515142;
LI1start=2006051600:00:00;LI1stop=2006123123:59:59
LI2flag=0;MD2address=192.168.1.20;WarrantID=20060615142;
LI2start=2006061500:00:00;LI2stop=2006123123:59:59
Media Relays (optional) — 1152

FIG. 32B

Call Controller Active Call Record

| | | |
|---|---|---|
| 1300 | Call ID | FF10@192.168.0.20 |
| 1302 | Caller IP Address | 192.168.0.20 |
| 1304 | Caller Port | 12345 |
| 1306 | Callee IP Address | 192.168.3.10 |
| 1308 | Callee Port | 33123 |
| 1310 | Media Relay ID | 42 |
| 1312 | Media Relay Caller Port | 22125 |
| 1314 | Media Relay Callee Port | 22123 |

FIG. 35

Routing Controller Active Call Record

| | | |
|---|---|---|
| 1316 | Call ID | FF10@192.168.0.20 |
| 1318 | Caller | 2001 1050 8667 |
| 1320 | Callee | 2001 1050 2222 |
| 1322 | Call Controller ID | 61 |

FIG. 36

Message from Call Controller to Mediation Device – SIP Invite

| | | |
|---:|---|---|
| 1020 — | Caller | 2001 1050 8667 |
| 1022 — | Callee | 2001 1050 2222 |
| 1024 — | Call ID | FF10@192.168.0.20 |
| 1026 — | Warrant ID | 12345678 |
| 1028 — | Intercept Related Info | XXXXXXXX |

FIG. 37

Reply Message from Mediation Device – SIP Ok

| | | |
|---:|---|---|
| 1040 — | Caller | 2001 1050 8667 |
| 1042 — | Callee | 2001 1050 2222 |
| 1044 — | Call ID | FF10@192.168.0.20 |
| 1046 — | Mediation Device IP Address | 192.138.2.10 |
| 1048 — | Mediation Device UDP Port # Caller | 13678 |
| 1050 — | Mediation Device UDP Port # Callee | 13679 |

FIG. 38

SIP Bye Message

| | | |
|---|---|---|
| 902 ~ | Caller | Username |
| 904 ~ | Callee | PSTN compatible # or Username |
| 906 ~ | Call ID | unique call identifier (hexadecimal string@IP) |

FIG. 39

SIP Bye Message

| | | |
|---|---|---|
| 902 ~ | Caller | 2001 1050 8667 |
| 904 ~ | Callee | 2001 1050 2222 |
| 906 ~ | Call ID | FA10@192.168.0.20 |

FIG. 40

RC Call Stop Message /1000

| | | |
|---|---|---|
| 1002 — | Caller | Username |
| 1004 — | Callee | PSTN compatible # or Username |
| 1006 — | Call ID | unique call identifier (hexadecimal string@IP) |
| 1008 — | Acct Start Time | start time of call |
| 1010 — | Acct Stop Time | time the call ended |
| 1012 — | Acct Session Time | start time-stop time (in seconds) |
| 1014 — | Route | IP address for gateway, where a gateway is used |

FIG. 42

RC Call Stop Message for Calgary Callee /1021

| | | |
|---|---|---|
| 1002 — | Caller | 2001 1050 8667 |
| 1004 — | Callee | 2001 1050 2222 |
| 1006 — | Call ID | FA10@192.168.0.20 |
| 1008 — | Acct Start Time | 2006-12-30 12:12:12 |
| 1010 — | Acct Stop Time | 2006-12-30 12:12:14 |
| 1012 — | Acct Session Time | 2 |
| 1014 — | Route | (72.64.39.58 if Telus gateway is used) |

FIG. 43

INTERCEPTING VOICE OVER IP COMMUNICATIONS AND OTHER DATA COMMUNICATIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. patent application Ser. No. 12/517,026, filed Mar. 5, 2010, which is a national phase entry of PCT/CA2007/002150, filed Nov. 29, 2007, which claims the benefit of U.S. Provisional Application No. 60/861,431 filed on Nov. 29, 2006.

BACKGROUND

1. Field

This development relates to data communications and methods and apparatus for intercepting data communications, particularly voice over IP data communications, in an IP network.

2. Description of the Related Art

The term "lawful intercept" is used to describe a procedure which allows law enforcement agencies to perform electronic surveillance of telecommunications. Lawful intercept of telecommunications, particularly phone calls, is premised on a notion that a law enforcement agency has identified a person of interest, obtained a legal authorization for the surveillance (for example, a judicial or administrative warrant), and then contacted the person's telecommunications service provider that will be required to provide the law enforcement agency with a real-time copy of the person's communications. This real-time copy can then be used by the law enforcement agency to monitor or record the person's communications. Within the framework of traditional telecommunications networks, such as, for example, the Public Switched Telephone Network (PSTN) or cellular networks, lawful intercept generally presents a purely economic problem for the service providers that have to ensure that sufficient interception equipment and dedicated links to the law enforcement agencies have been deployed to satisfy lawful intercept requirements mandated by law. However, in the context of Voice over Internet Protocol (VoIP) communications, in addition to the economic problems mentioned above, lawful intercept presents significant technological challenges which often makes compliance with legally mandated lawful intercept requirements exceedingly difficult.

The problem lies in the very nature of the VoIP technology and the Internet Protocol (IP) networks (for example, the Internet) that underlie it.

Traditional telecommunications networks are "connection-oriented" or "circuit-switched". Communications over such networks occur via dedicated "circuits". Although the networks typically comprise a plurality of available parallel paths, when a circuit is established, only a single one of the available paths is picked. In situations where a circuit has failure protection, a redundant path, also determined at the time of the circuit establishment, can also be reserved. Once the circuit is established, all communications traverse from end to end. Interception of such communications is easy as the service provider can "tap" the circuit at any point in the network that is under its lawful control.

In contrast to circuit-switched networks, IP-based networks are "connectionless" by design. A connectionless IP network essentially comprises a plurality of interconnected network devices (routers) which establish a plurality of paths from any point on the network to any other point. Information that needs to traverse an IP network is divided into small "packets", each one comprising an IP header containing source and destination addressing information, and service flags; and user payload. The specific path that each packet in a communication between parties takes across an IP network is not determined in advance such as in a circuit-switched network. The path is defined on a hop-by-hop basis (router-by-router), each router at which the packet arrives examines the source and destination addresses contained in the IP header and applies a number of service variables such as hop-count (number of routers between the current router and the destination), latency and bandwidth of available links, and administrative considerations such as inter-provider agreements, to determine the next hop to which the packet will be forwarded. Because the service variables change dynamically, for example in response to a failure of a link in the network, the available paths may change significantly and it is impossible to reliably predict the path or paths that the packets that comprise a specific a specific communication will traverse. Furthermore, it is not even possible to predict the order in which the packets will arrive at their destination as the different paths taken may have different latency. While the plurality of available paths and out-of-order arrivals present no problems to IP-based applications that usually keep track of the packet sequence to reassemble the communication, the same factors present formidable problems for the lawful intercept of communication over IP networks, particularly lawful intercept of VoIP calls.

The problem of lawful intercept in VoIP systems is further exacerbated by the distributed technologies often utilized in such systems. While a VoIP caller typically communicates with a VoIP call controller to facilitate the connection to the VoIP callee, the actual communication between the parties typically occurs by establishing a direct IP connection between them using the User Datagram Protocol (UDP) to encapsulate audio information into IP packets. These packets may take any available path across the IP network as described above. Even if a service provider could place an interception device at every point in the network through which a subscriber's packet could traverse, in order to provide a useful copy of the communication to a law enforcement agency, the service provider would have to reassemble all of the intercepted packets at a single device and only then pass the result to the law enforcement agency. In essence, the service provider would have to mirror the functions of the callee VoIP telephone, except the packets that comprise the communication would have to be collected from multiple points in the network. The technological challenges and economic costs associated with this proposition have thus far resulted in lack of meaningful lawful intercept capabilities in VoIP systems.

SUMMARY

In accordance with one aspect, there is provided a method for intercepting communications in an Internet Protocol (IP) network. The method involves maintaining dialing profiles for respective subscribers to the IP network, each dialing profile including a username associated with the corresponding subscriber. The method also involves associating intercept information with the dialing profile of a subscriber whose communications are to be monitored, the intercept information including determination information for determining whether to intercept a communication involving the subscriber, and destination information identifying a device to which intercepted communications involving the subscriber are to be sent. The method further involves, when the determination information meets intercept criteria, communicating with a media relay through which the communications involving the subscriber will be conducted or are being conducted to cause the media relay to send a copy of the communications to a mediation device specified by the destination information.

Associating intercept information may involve associating the intercept information with the dialing profile when communications involving the subscriber are not in progress.

Associating intercept information may involve associating the intercept information when communications involving the subscriber are in progress.

Associating the intercept information may involve populating intercept information fields in the dialing profile of the subscriber whose communications are to be monitored.

The method may involve producing a routing message for routing communications involving the subscriber through components of the IP network and determining whether the determination information meets the intercept criteria prior to producing the routing message and including at least some of the intercept information in the routing message when the determination information meets the intercept criteria.

Determining whether the determination information meets the intercept criteria may involve determining whether a current date and time is within a range specified by the determination information.

The method may involve identifying a media relay through which communications involving the subscriber will be conducted in response to the routing message.

The method may involve pre-associating at least one media relay with the dialing profile of the subscriber whose communications are to be monitored and identifying the media relay may involve identifying the media relay pre-associated with the subscriber whose communications are to be monitored.

Pre-associating may involve populating media relay fields in the dialing profile with an identification of at least one media relay.

The intercept information may be associated with the dialing profile of the subscriber whose communications are to be monitored, in response to receipt of an intercept request message, and the intercept request message may include the intercept information.

The method may involve invoking an intercept request message handler to find a dialing profile associated with the subscriber whose communications are to be monitored, and to perform the step of associating the intercept information with the dialing profile, and to determine whether the intercept criteria are met, and identify a media relay through which the communications are being conducted.

The method may involve maintaining active call records for communications in progress, and the active call records may include a username identifier and a media relay identifier identifying the media relay through which the communications are being conducted and identifying a media relay through which the communications are being conducted may involve locating an active call record associated with communications of the subscriber whose communication are to be monitored to find the media relay associated with the communications.

The method may involve maintaining direct-inward-dialing (DID) records associating PST telephone numbers with usernames of users subscribing to the IP network, and finding a dialing profile associated with the subscriber whose communications are to be monitored may involve finding a username in a DID record bearing a PSTN number associated with the subscriber whose communications are to be monitored. The username may be used to locate a dialing profile associated with the username.

In accordance with another aspect, there is provided an apparatus for intercepting communications in an Internet Protocol (IP) network. The apparatus includes provisions for maintaining dialing profiles for respective subscribers to the IP network, each dialing profile including a username associated with the corresponding subscriber. The apparatus also includes provisions for associating intercept information with the dialing profile of a subscriber whose communications are to be monitored, the intercept information including determination information for determining whether to intercept a communication involving the subscriber, and destination information identifying a device to which intercepted communications involving the subscriber are to be sent. The apparatus further includes provisions for communicating with a media relay through which the communications involving the subscriber will be conducted or are being conducted to cause the media relay to send a copy of the communications to a mediation device specified by the destination information, when the determination information meets intercept criteria.

The provisions for associating intercept information may be operably configured to associate the intercept information with the dialing profile when communications involving the subscriber are not in progress.

The provisions for associating intercept information may be operably configured to associate the intercept information when communications involving the subscriber are in progress.

The provisions for associating the intercept information may be operably configured to populate intercept information fields in the dialing profile of the subscriber whose communications are to be monitored.

The apparatus may further include provisions for producing a routing message for routing communications involving the subscriber through components of the IP network and provisions for determining whether the determination information meets the intercept criteria prior to producing the routing message and the provisions for producing the routing message may be operably configured to include at least some of the intercept information in the routing message when the determination information meets the intercept criteria.

The provisions for determining whether the determination information meets the intercept criteria may be operably configured to determine whether a current date and time is within a range specified by the determination information.

The apparatus may further include provisions for identifying a media relay through which communications involving the subscriber will be conducted in response to the routing message.

The apparatus may further include provisions for pre-associating at least one media relay with the dialing profile of the subscriber whose communications are to be monitored and the routing provisions may be operably configured to identify from the dialing profile the media relay pre-associated with the subscriber whose communications are to be monitored.

The provisions for pre-associating may be operably configured to populate media relay fields in the dialing profile with an identification of at least one media relay.

Provisions for associating the intercept information may be operably configured to associate the intercept information associated with the dialing profile of the subscriber whose communications are to be monitored, in response to receipt of an intercept request message, wherein the intercept request message may comprise the intercept information.

The apparatus may further include provisions for handling an intercept request message. The provisions for handling an intercept request message may include provisions for finding a dialing profile associated with the subscriber whose communications are to be monitored. The provisions for finding a dialing profile may cooperate with the provisions for associating the intercept information with the dialing profile to cause the intercept information to be associated with the dialing profile. The provisions for handling an intercept request message may include provisions for determining whether the intercept criteria are met and provisions for identifying a media relay through which the communications are being conducted.

The apparatus may further include provisions for maintaining active call records for communications in progress, the active call records including a username identifier and a media relay identifier identifying the media relay through which the communications are being conducted and the provisions for identifying a media relay through which the communications are being conducted may be operably configured to locate an active call record associated with communications of the subscriber whose communication are to be monitored to find the media relay associated with the communications.

The apparatus may further include provisions for maintaining direct-inward-dialing (DID) records associating PST telephone numbers with usernames of users subscribing to the IP network, and the provisions for finding a dialing profile associated with the subscriber whose communications are to be monitored may be operably configured to find a username in a DID record bearing a PSTN number associated with the subscriber whose communications are to be monitored and use the username to locate a dialing profile associated with the username.

By employing a media replay, all VoIP communications traverse a point in the VoIP system that is under a provider's control and at which the communications can be copied in real-time to a mediation device that passes the intercepted communication to a law enforcement agency.

By maintaining dialing profiles for respective subscribers and associating intercept information of the type described, with the dialing profiles of subscribers whose communications are to be monitored, the dialing profile can serve as the source of determination information for determining whether or not communications involving the subscriber will be monitored and for providing destination information for specifying where the copy of the communications is to be sent. Use of the dialing profile in this manner easily facilitates the dialing profile to be considered a respository for intercept information for a given subscriber and this respository can be addressed whether a call is being initiated or in progress, thereby simplifying control algorithms because they can cooperate with a common source and format of data in the dialing profile.

In another embodiment, there is a method for causing Internet Protocol (IP) communications to be intercepted in an IP network system in which IP communications between a subscriber of the system and another party occur through a media relay to which the subscriber and the another party address their IP communications destined for each other and which relays the IP communications between the subscriber and the another party, the method comprising causing a call controller to receive a request from the subscriber seeking to initiate communications between the subscriber and the another party and to produce a request to establish an IP communications channel between the subscriber and the another party; and causing a call routing controller to receive from the call controller said request to establish said IP communications channel; access a database in response to receiving said request from said call controller, to locate a dialing profile associated with the subscriber, said dialing profile comprising intercept determination information and destination information, said intercept determination information indicating whether an IP communication from the subscriber should be monitored and said destination information indicating where to send monitored communications; and produce a routing message for receipt by the call controller and separate from any IP communication sent between the subscriber and the another party, for providing routing information for routing the IP communications through the media relay to enable the call controller to establish said IP communications channel through the media relay in response to the routing message; and when said determination information meets intercept criteria, cause said routing message to include at least some of said intercept determination information and said destination information.

The IP communications may include at least one of audio data, pure data, video data, multimedia data, text messaging data and instant messaging data. The method may further comprise causing said call controller to communicate with the media relay to cause the media relay to establish a communication path for relaying IP communications between the subscriber and the another party; and when said intercept determination information and said destination information are included in said routing message, produce a copy of said IP communications between the subscriber and the another party, while the media relay relays communications between the subscriber and the another party; and send said copy to a mediation device identified by said destination information in said routing message.

The method may further comprise associating said determination information and said destination information with said dialing profile when communications involving said subscriber are not in progress. The method may further comprise associating said determination information and said destination information with said dialing profile when communications involving said subscriber are in progress. Associating said determination information and said destination information may comprise populating intercept information fields in said dialing profile of a subscriber whose communications are to be monitored. Associating said determination information and said destination information may comprise populating intercept information fields in said dialing profile of a subscriber whose communications are to be monitored. Determining whether said determination information, meets said intercept criteria may comprise determining whether a current date and time is within a range specified by said determination information. Producing said routing message may comprise identifying a media relay through which communications involving said subscriber will be conducted and including an identification of said media relay in said routing message. The method may further comprise pre-associating at least one media relay with said dialing profile associated with the subscriber whose communications are to be monitored and wherein identifying said media relay may comprise identifying said at least one media relay pre-associated with said subscriber whose communications are to be monitored. Pre-associating may comprise populating media relay fields in said dialing profile with an identification of said at least one media relay.

Associating said determination information and said destination information may comprise associating said determination information and said destination information with said dialing profile of the subscriber whose communications are to be monitored, in response to receipt of an intercept request message, wherein said intercept request message may comprise said determination information and said destination information. The method may further comprise invoking an intercept request message handler to a) find a dialing profile associated with the subscriber whose communications are to be monitored; b) associate said determination information and said destination information with said dialing profile; and c) identify a media relay through which said communications are being conducted. The dialing profile may include a username identifier and may further comprise maintaining active call records for communications in progress, said active call records may comprise a username identifier and a media relay identifier identifying the media relay through which said communications are being conducted and wherein identifying a media relay through which said communications are being conducted may comprise locating an active call record associated with a channel used by the subscriber whose communications are to be monitored to identify the media relay associated with said channel. The method may further comprise maintaining direct-inward-dial (DID) records associating Public Switched Telephone Network (PSTN) telephone numbers with usernames of users subscribing to said IP network, and wherein finding a dialing profile associated with the subscriber whose communications are to be monitored may comprise finding a username in a DID record bearing a PSTN number associated with the subscriber whose communications are to be monitored and using said username to locate a dialing profile associated with said username. The method may further comprise causing the call controller to receive communications from the mediation device to cause the call controller to interact with the call routing controller to access a dialing profile of a subscriber whose communications are to be monitored and to enter said intercept determination information and destination information into said dialing profile.

In another embodiment, there is a system for causing Internet Protocol (IP) communications to be intercepted in an IP network in which IP communications between a subscriber of said system and another party occur through a media relay to which the subscriber and the another party address their IP communications destined for each other and which relays said IP communications between the subscriber and the another party, the system comprising a call controller and a call routing controller in communication with the call controller; said call controller being operably configured to receive a request from the subscriber seeking to initiate communications between the subscriber and the another party and to produce a request to establish an IP communications channel between the subscriber and the another party and for establishing said IP communications channel through the media relay in response to a routing message produced by said call routing controller; said call routing controller operably configured to receive from the call controller said request to establish said IP communications channel between the subscriber and the another party, access a database in response to receiving said request from said call controller to locate a dialing profile associated with the subscriber, said dialing profile comprising intercept determination information and destination information, said intercept determination information indicating whether an IP communication from the subscriber should be monitored and said destination information indicating where to send monitored communications; and produce a routing message for receipt by the call controller and separate from any IP communication sent between the subscriber and the another party, for providing routing information for routing the IP communications through the media relay; and when said determination information meets intercept criteria, cause said routing message to include at least some of said intercept determination information and said destination information.

The IP communications may include at least one of audio data, pure data, video data, multimedia data, text messaging data and instant messaging data. The call routing controller may be operably configured to respond to said routing message by communicating with the media relay to cause the media relay to establish a communication path to relay said IP communications between the subscriber and the another party; and when said intercept determination information and said destination information are included in said routing message, produce a copy of said IP communications between the subscriber and the another party, while said media relay relays communications between the subscriber and the another party; and send said copy to a mediation device identified by said destination information in said routing message. At least one of said call controller and said call routing controller may be operably configured to associate said intercept information with said dialing profile when communications involving said subscriber are not in progress. At least one of said call controller and said call routing controller may be operably configured to associate said intercept determination information with said dialing profile when communications involving said subscriber are in progress. At least one of said call controller and said call routing controller may be operably configured to populate intercept information fields in said dialing profile of the subscriber whose communications are to be monitored. At least one of said call controller and said call routing controller may be operably configured to populate intercept information fields in said dialing profile of the subscriber whose communications are to be monitored. At least one of said call controller and said call routing controller may be operably configured to determine whether a current date and time is within a range specified by said determination information. At least one of said call controller and said call routing controller may be operably configured to identify a media relay through which communications involving said subscriber will be conducted and to include an identification of said media relay in said routing message. At least one of said call controller and said call routing controller may be operably configured to pre-associate at least one media relay with said dialing profile of the subscriber whose communications are to be monitored and wherein at least one of said call controller and said call routing controller may be operably configured to identify from said dialing profile said at least one media relay pre-associated with said subscriber whose communications are to be monitored. At least one of said call controller and said call routing controller may be operably configured to populate media relay fields in said dialing profile with an identification of at said least one media relay.

At least one of said call controller and said call routing controller may be operably configured to associate said intercept information associated with said dialing profile of the subscriber whose communications are to be monitored, in response to receipt of an intercept request message, wherein said intercept request message may comprise said intercept information. At least one of said call controller and said call routing controller may be operably configured to a) find a dialing profile associated with the subscriber whose communications are to be monitored, b) cause said intercept information to be associated with said dialing profile; and c) identify a media relay through which said communications are being conducted. The dialing profile may include a username identifier and wherein at least one of said call controller and said call routing controller may be operably configured to maintain active call records for communications in progress, said active call records may comprise a username identifier and a media relay identifier identifying a media relay through which said communications are being conducted and wherein said means for identifying a media relay may be operably configured to locate an active call record associated with a channel used by the subscriber whose communications are to be monitored to identify the media relay associated with said channel. At least one of said call controller and said call routing controller may be operably configured to access direct-inward-dial (DID) records associating Public Switched Telephone Network (PSTN) telephone numbers with usernames of users subscribing to said IP network, and wherein at least one of said call controller and said call routing controller may be operably configured to find a username in a DID record bearing a PSTN number associated with the subscriber whose communications are to be monitored and use said username to locate a dialing profile associated with said username. The call controller may be operably configured to receive communications from the mediation device to cause the call controller to interact with the call routing controller to access a dialing profile of a subscriber whose communications are to be monitored and to enter said intercept determination information and destination information into said dialing profile.

In yet another embodiment, there is a method for causing Internet Protocol (IP) communications to be intercepted in an IP network system in which IP communications between a subscriber of said system and another party occur through a media relay to which the subscriber and the another party address their IP communications destined for each other and which relays said IP communications between the subscriber and the another party, the method comprising in response to a request to establish an IP communications channel between the subscriber and the another party locating a dialing profile associated with the subscriber, said dialing profile comprising intercept determination information and destination information, said intercept determination information indicating whether an IP communication from the subscriber should be monitored and said destination information indicating where to send monitored communications; producing a routing message for receipt by a call controller and separate from any IP communication sent between the subscriber and the another party, for routing the IP communications through the media relay and when said determination information meets intercept criteria, causing said routing message to include at least some of said intercept determination information and said destination information.

The IP communications may include at least one of audio data, pure data, video data, multimedia data, text messaging data and instant messaging data. The method may further comprise responding to said routing message by communicating with the media relay to cause the media relay to establish a communication path for relaying IP communications between the subscriber and the another party; and when said intercept determination information and said destination information are included in said routing message, produce a copy of said IP communications between the subscriber and the another party, while the media relay relays communications between the subscriber and the another party; and send said copy to a mediation device identified by said destination information in said routing message. The method may further comprise associating said determination information and said destination information with said dialing profile when communications involving said subscriber are not in progress. The method may further comprise associating said determination information and said destination information with said subscriber dialing profile when communications involving said subscriber are in progress. Associating said determination information and said destination information may comprise populating intercept information fields in said dialing profile of a subscriber whose communications are to be monitored. Associating said determination information and said destination information may comprise populating intercept information fields in said dialing profile of a subscriber whose communications are to be monitored. Determining whether said determination information meets said intercept criteria may comprise determining whether a current date and time is within a range specified by said determination information. Producing said routing message may comprise identifying a media relay through which communications involving said subscriber will be conducted and including an identification of said media relay in said routing message. The method may further comprise pre-associating at least one media relay with said dialing profile associated with the subscriber whose communications are to be monitored and wherein identifying said media relay may comprise identifying said at least one media relay pre-associated with said subscriber whose communications are to be monitored. Pre-associating may comprise populating media relay fields in said dialing profile with an identification of said at least one media relay.

Associating said determination information and said destination information may comprise associating said determination information and said destination information with said dialing profile of the subscriber whose communications are to be monitored, in response to receipt of an intercept request message, wherein said intercept request message may comprise said determination information and said destination information. The method may further comprise invoking an intercept request message handler to a) find a dialing profile associated with the subscriber whose communications are to be monitored; b) associate said determination information and said destination information with said dialing profile; and c) identify a media relay through which said communications are being conducted. The dialing profile may include a username identifier and may further comprise maintaining active call records for communications in progress, said active call records may comprise a username identifier and a media relay identifier identifying the media relay through which said communications are being conducted and wherein identifying a media relay through which said communications are being conducted may comprise locating an active call record associated with a channel used by the subscriber whose communications are to be monitored to identify the media relay associated with said channel. The method may further comprise maintaining direct-inward-dial (DID) records associating Public Switched Telephone Network (PSTN) telephone numbers with usernames of users subscribing to said IP network, and wherein finding a dialing profile associated with the subscriber whose communications are to be monitored may comprise finding a username in a DID record bearing a PSTN number associated with the subscriber whose communications are to be monitored and using said username to locate a dialing profile associated with said username. The method may further comprise causing the call controller to receive communications from the mediation device to cause the dialing profile of a subscriber whose communications are to be monitored and to receive said intercept determination information and destination information.

Other aspects and features will become apparent to those ordinarily skilled in the art upon review of the following description of specific embodiments of the development in conjunction with the accompanying figures.

BRIEF DESCRIPTION OF THE DRAWINGS

In drawings which illustrate embodiments of the development,

FIG. 9 is a tabular representation of a dialing profile stored in a database accessible by the RC shown in FIG. 1;

FIG. 10 is a tabular representation of a dialing profile for a Vancouver subscriber;

FIG. 11 is a tabular representation of a dialing profile for a Calgary subscriber;

FIG. 12 is a tabular representation of a dialing profile for a London subscriber;

FIG. 13 is a tabular representation of a direct-inward-dialing (DID) bank table record stored in the database shown in FIG. 1;

FIG. 14 is a tabular representation of an exemplary DID bank table record for the London subscriber referenced in FIG. 12;

FIG. 15 is a tabular representation of a routing message transmitted from the routing controller to the call controller shown in FIG. 1;

FIG. 16 is a tabular representation of a routing message buffer holding a routing message for routing a call to the London callee referenced in FIG. 12;

FIG. 16A is a tabular representation of a routing message buffer holding a message for routing a call to the London callee and to a law enforcement agency for the purpose of lawful intercept;

FIG. 17 is a tabular representation of a prefix to supernode table record stored in the database shown in FIG. 1;

FIG. 18 is a tabular representation of a prefix to supernode table record that would be used for the Calgary callee referenced in FIG. 11;

FIG. 19 is a tabular representation of a master list record stored in a master list table in the database shown in FIG. 1;

FIG. 20 is a tabular representation of an exemplary populated master list record;

FIG. 21 is a tabular representation of a suppliers list record stored in the database shown in FIG. 1;

FIG. 22 is a tabular representation of a specific supplier list record for a first supplier;

FIG. 23 is a tabular representation of a specific supplier list record for a second supplier;

FIG. 24 is a tabular representation of a specific supplier list record for a third supplier;

FIG. 25 is a tabular representation of a routing message, held in a routing message buffer, identifying to the routing controller a plurality of possible suppliers that may carry the call;

FIG. 25A is a tabular representation of a routing message held in a routing message buffer, with lawful intercept fields appended;

FIG. 26 is a tabular representation of a call block table record;

FIG. 27 is a tabular representation of a call block table record for the Calgary callee;

FIG. 28 is a tabular representation of a call forwarding table record;

FIG. 29 is a tabular representation of am exemplary call forwarding table record specific for the Calgary callee;

FIG. 30 is a tabular representation of a voicemail table record specifying voicemail parameters to enable the caller to leave a voicemail message for the callee;

FIG. 31 is a tabular representation of an exemplary voicemail table record for the Calgary callee;

FIG. 32 is a tabular representation of an exemplary routing message, held in a routing message buffer, indicating call forwarding numbers and a voicemail server identifier;

FIG. 32A is a tabular representation of an exemplary routing message, held in a routing message buffer, indicating call forwarding numbers and a voicemail server identifier with caller lawful intercept fields appended;

FIG. 32B is a tabular representation of an exemplary routing message, held in a routing message buffer, indicating call forwarding numbers and a voicemail server identifier with caller and callee lawful intercept fields appended;

FIG. 35 is a tabular representation of an active call record maintained by the call controller of FIG. 1;

FIG. 36 is a tabular representation of an active call record maintained by the routing controller of FIG. 1;

FIG. 37 is a tabular representation of a SIP Invite message transmitted from the call controller to the mediation device;

FIG. 38 is a tabular representation of a SIP OK message transmitted from the mediation device to the call controller;

FIG. 39 is a tabular representation of a SIP Bye message transmitted from either of the telephones shown in FIG. 1 to the call controller;

FIG. 40 is a tabular representation of a SIP Bye message sent to the call controller from the Calgary callee;

FIG. 42 is a tabular representation of an exemplary RC Call Stop message;

FIG. 43 is a tabular representation of an exemplary RC Call Stop message for the Calgary callee;

DETAILED DESCRIPTION OF CERTAIN EMBODIMENTS

Figure 1:
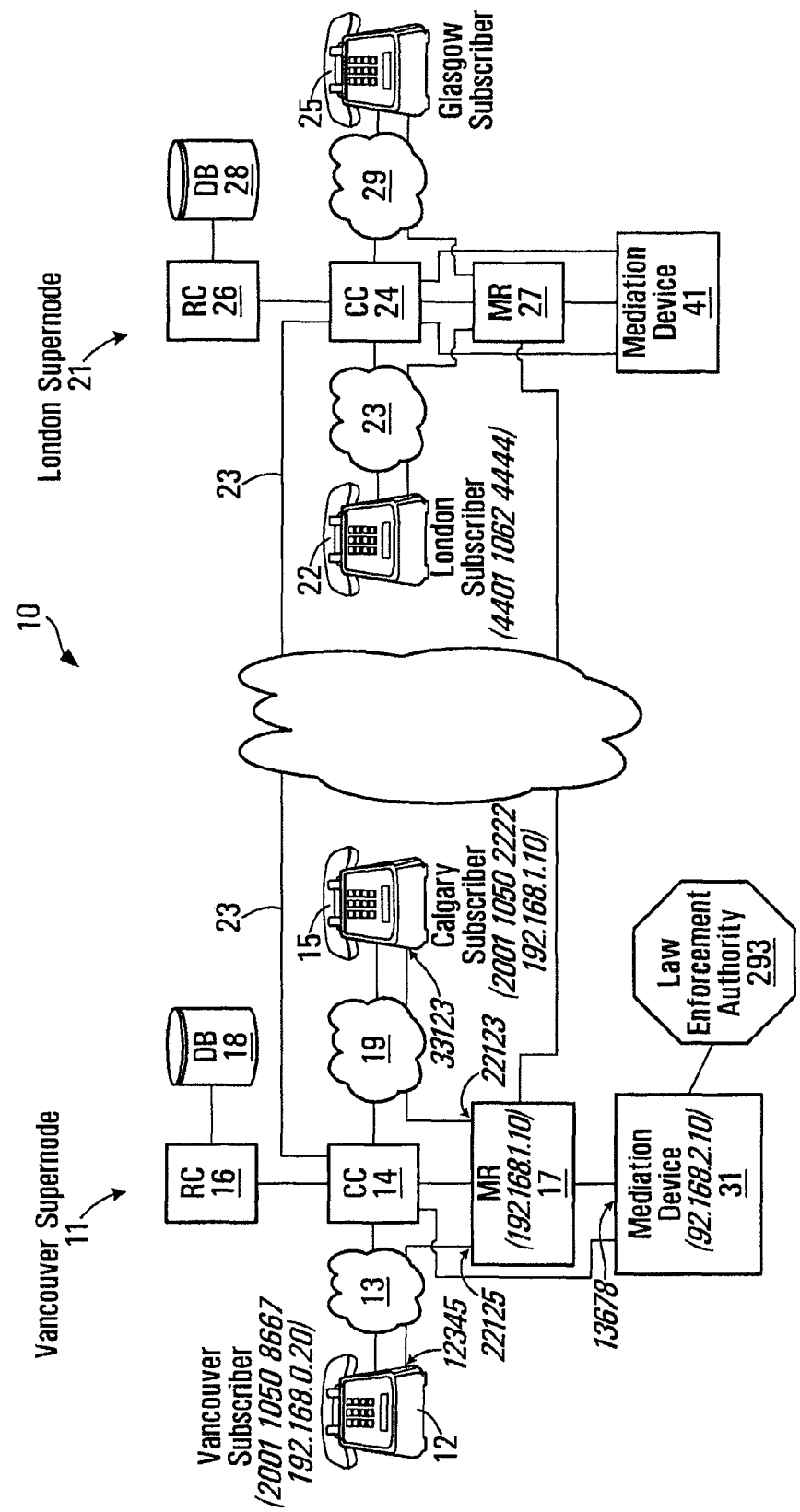
FIG. 1 is a block diagram of a system according to a first embodiment.

Referring to FIG. 1, a system for making voice over IP telephone calls is shown generally at 10. The system includes a first supernode shown generally at 11 and a second supernode shown generally at 21. The first supernode 11 is located in a geographical area, such as Vancouver B.C., for example and the second supernode 21 is located in London England, for example. Different supernodes may be located in different geographical regions throughout the world to provide telephone service to subscribers in respective regions. These supernodes may be in communication with each other through high speed/high data throughput links including optical fiber, satellite and/or cable links, for example, forming a system backbone. These supernodes may alternatively or in addition be in communication with each other through conventional Internet services. In the embodiment shown, data communication media for providing for data communications between the first and second supernodes 11 and 21 are shown generally at 23 and may include very high speed data links, for example.

In the embodiment shown, the Vancouver supernode 11 provides telephone service to a geographical region comprising Western Canadian customers from Vancouver Island to Ontario and includes a Vancouver subscriber and a Calgary subscriber. Another supernode (not shown) may be located in Eastern Canada to provide services to subscribers in that area.

Other, smaller supernodes similar to the type shown may also be employed within the geographical area serviced by a supernode, to provide for call load sharing, for example within a region of the geographical area serviced by the supernode. However, in general, all supernodes are similar and have the properties described below in connection with the Vancouver supernode 11.

In this embodiment, the Vancouver supernode includes a call controller (CC) 14, a routing controller (RC) 16, a database 18, a media relay 17 and one or more mediation devices (MD), only one of which is shown at 31. Subscribers such as the Vancouver subscriber and the Calgary subscriber communicate with the Vancouver supernode 11 using their own Internet Service Providers (ISPs) 13 and 19 which route Internet traffic from these subscribers over the Internet. To these subscribers the Vancouver supernode 11 is accessible at a pre-determined IP address or a fully qualified domain name (FQDN) so that it can be accessed in the usual way through a subscriber's ISP. The subscriber in the city of Vancouver uses a telephone 12 that is capable of communicating with the Vancouver supernode 11 using Session Initiation Protocol (SIP) messages and the Calgary subscriber uses a similar telephone 15, to communicate with the Vancouver supernode from Calgary, AB.

It should be noted that throughout the description of the embodiments of this development, the IP/UDP addresses of all elements such as the caller and callee telephones, call controller, media relay, and any others, will be assumed to be valid IP/UDP addresses directly accessible via the Internet or a private IP network, for example, depending on the specific implementation of the system. As such, it will be assumed, for example, that the caller and callee telephones will have IP/UDP addresses directly accessible by the call controllers and the media relays on their respective supernodes, and that will not be obscured by Network Address Translation (NAT) or similar mechanisms. In other words, the IP/UDP information contained in SIP messages (for example the SIP Invite message or the RC Request message which will be described below) will match the IP/UDP addresses of the IP packets carrying these SIP messages.

It will be appreciated that in many situations, the IP addresses assigned to various elements of the system may be in a private IP address space, and thus not directly accessible from other elements. Furthermore, it will also be appreciated that NAT is commonly used to share a "public" IP address between multiple devices, for example between home PCs and IP telephones sharing a single Internet connection. For example, a home PC may be assigned an IP address such as 192.168.0.101 and a Voice over IP telephone may be assigned an IP address of 192.168.0.103. These addresses are located in so called "non-routable" address space and cannot be accessed directly from the Internet. In order for these devices to communicate with other computers located on the Internet, these IP addresses have to be converted into a "public" IP address, for example 24.10.10.123 assigned to the subscriber by the Internet Service Provider, by a device performing NAT, typically a home router. In addition to translating the IP addresses, the NAT typically also translates UDP port numbers, for example an audio path originating at an IP telephone and using a UDP port 12378 at its private IP address may have been translated to a UDP port 23465 associated with the public IP address of the NAT device. In other words, when a packet originating from the above IP telephone arrives at an Internet-based supernode, the source IP/UDP address contained in the IP packet header will be 24.10.10.1:23465, whereas the source IP/UDP address information contained in the SIP message inside this IP packet will be 192.168.0.103: 12378. The mismatch in the IP/UDP addresses may cause a problem for SIP-based systems because, for example, a supernode will attempt to send messages to a private address of a telephone—the messages will never get there.

It will be appreciated that a number of methods are available to overcome this problem. For example, the SIP NATHelper open source software module may run on the supernode to correlate public IP/UDP address contained in the headers of the IP packets arriving from SIP devices with private IP/UDP addresses in the SIP messages contained in these packets. Therefore, the embodiments of the development described below will function whether or not any of the elements of the system are located behind NAT devices that obscure their real IP/UDP addresses.

Referring to FIG. 1, in an attempt to make a call by the Vancouver telephone 12 to the Calgary telephone 15, for example, the Vancouver telephone sends a SIP Invite message to the Vancouver supernode 11 and in response, the call controller 14 sends an RC Request message to the routing controller 16 which makes various enquiries of the database 18 to produce a routing message which is sent to the call controller 14. The call controller 14 then causes a communications link including audio paths to be established through the media relay 17 which may include the same Vancouver supernode 11, a different supernode or a communications supplier gateway, for example, to carry voice traffic to and from the call recipient or callee. Subject to certain conditions being satisfied, as will be described below, when lawful intercept of data is to occur, data on the audio paths is copied to the mediation device 31 which may provide for real time listening of the audio data or recording of same.

Subscriber Telephone

Figure 2:
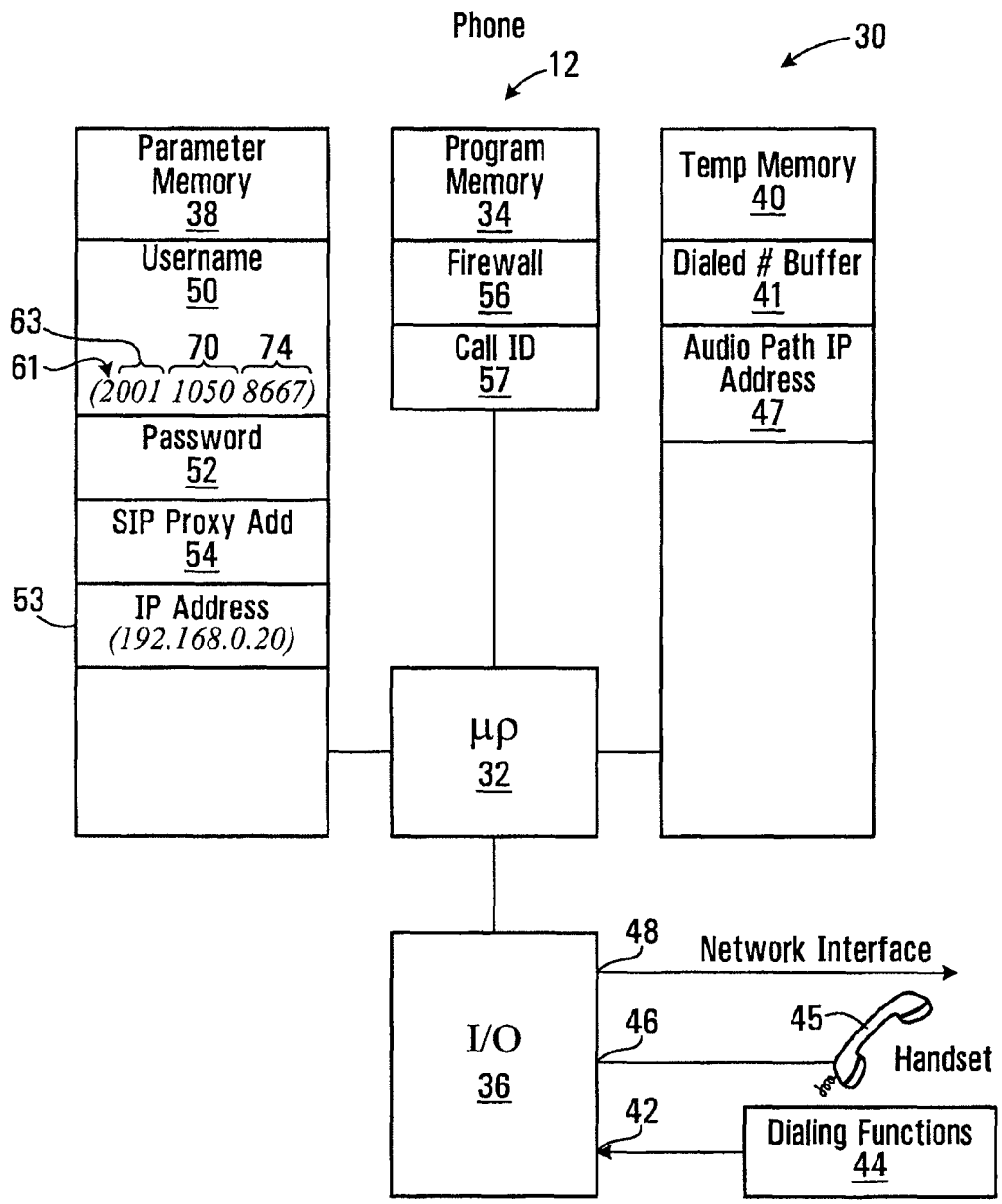
FIG. 2 is a block diagram of a caller VoIP telephone according to the first embodiment.

Referring to FIG. 2, in this embodiment, the telephones 12, 15, 22 and 25 each includes a processor circuit shown generally at 30 comprising a microprocessor 32, program memory 34, an input/output (I/O) interface 36, parameter memory 38 and temporary memory 40. The program memory 34, I/O interface 36, parameter memory 38 and temporary memory 40 are all in communication with the microprocessor 32. The I/O interface 36 has a dial input 42 for receiving a dialed telephone number from a keypad, for example, or from a voice recognition unit or from pre-stored telephone numbers stored in the parameter memory 38, for example. For simplicity, a box labelled dialing functions 44 represents any device capable of informing the microprocessor 32 of a callee identifier, e.g., a callee telephone number.

The microprocessor 32 stores the callee identifier in a dialed number buffer 41. In the case of the Vancouver subscriber for example, the dialed number may be 2001 1050 2222, identifying the Calgary subscriber or the dialed number may be a PSTN number, for example. The I/O interface 36 also has a handset interface 46 for receiving and producing signals from and to a handset 45 that the user may place to his ear. The handset interface 46 may include a BLUETOOTH™ wireless interface, a wired interface or speakerphone, for example. The handset 45 acts as a termination point for an audio path (not shown) which will be appreciated later.

The I/O interface 36 also has a network interface 48 to an IP network which may provide a high speed Internet connection, for example, and is operable to connect the telephone to an ISP. The network interface 48 also acts as a part of the audio path, as will be appreciated later.

The parameter memory 38 has a username field 50, a password field 52 an IP address field 53 and a SIP proxy address field 54. The username field 50 is operable to hold a username, which, for the Vancouver subscriber, is 2001 1050 8667. The username is assigned upon subscription or registration into the system and, in this embodiment includes a twelve digit number having a continent code 61, a country code 63, a dealer code 70 and a unique number code 74. The continent code 61 is comprised of the first or left-most digit of the username in this embodiment. The country code 63 is comprised of the next three digits. The dealer code 70 is comprised of the next four digits and the unique number code 74 is comprised of the last four digits. The password field 52 holds a password of up to 512 characters, in this example. The IP address field 53 stores an IP address and UDP port number of the telephone 12, which, for this explanation, is 192.168.0.20:12345. The SIP proxy address field 54 stores an IP address of a SIP proxy which may be provided to the telephone 12 through the network interface 48 as part of a registration procedure.

The program memory 34 stores blocks of codes for directing the microprocessor 32 to carry out the functions of the telephone, one of which includes a firewall block 56 which provides firewall functions to the telephone, to prevent unauthorized access through the network connection to the microprocessor 32 and memories 34, 38 and 40. The program memory 34 also stores call ID codes 57 for establishing a call ID. The call ID codes 57 direct the microprocessor 32 to produce call identifiers having the format of a hexadecimal string and an IP address of the telephone stored in the IP address field 53. Thus, an exemplary call identifier for a call might be FF10@192.168.0.20.

Figures 3, 4:
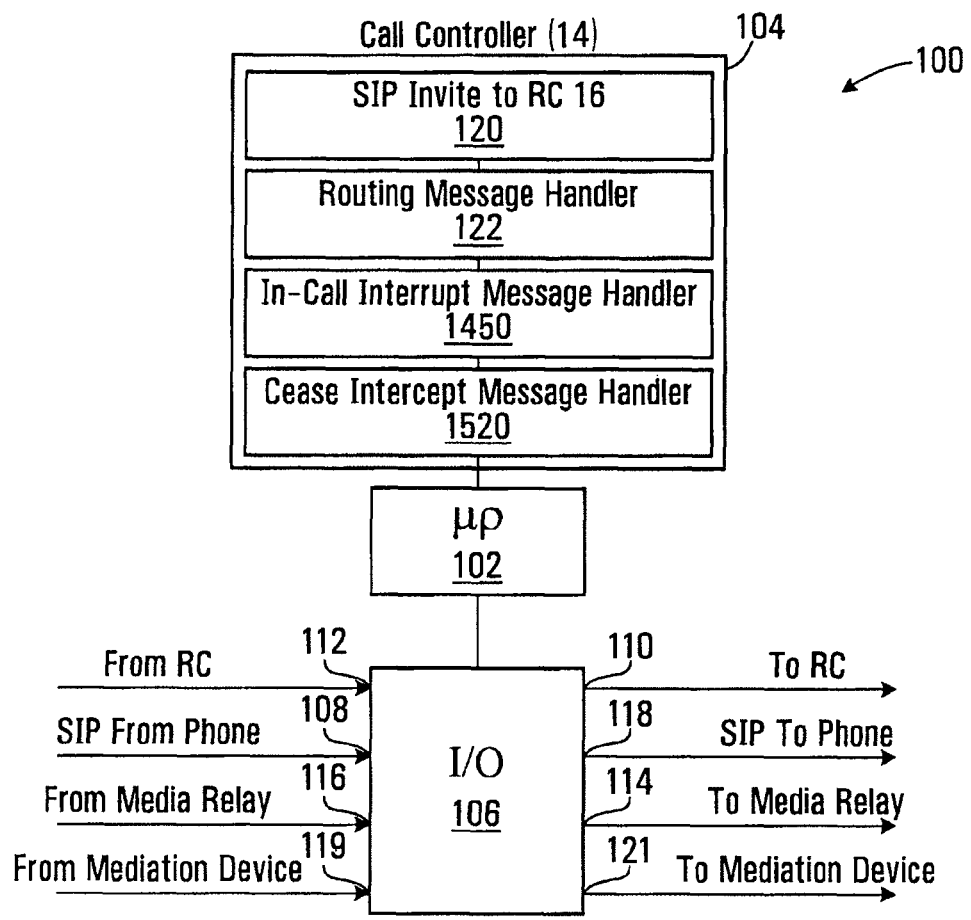
FIG. 3 is a schematic representation of a SIP Invite message transmitted between the caller telephone and a call controller (CC) shown in FIG. 1.
FIG. 4 is a block diagram of the call controller shown in FIG. 1.

Generally, in response to activating the handset 45 and using the dialing function 44, the microprocessor 32 produces and sends a SIP Invite message as shown in FIG. 3, to the call controller 14 shown in FIG. 1.

Referring to FIG. 3, the SIP Invite message includes a caller identifier field 60, a callee identifier field 62, a digest parameters field 64, a call identifier field 65, a caller IP address field 67 and a caller UDP port field 69. In this embodiment, the caller identifier field 60 includes the username 2001 1050 8667, which is the username stored in the username field 50 of the parameter memory 38 in the Vancouver telephone 12 shown in FIG. 2. In addition, as an example, referring back to FIG. 3, the callee identifier field 62 includes the username 2001 1050 2222 which is the dialed number of the Calgary subscriber stored in the dialed number buffer 41 shown in FIG. 2. The digest parameters field 64 includes digest parameters and the call identifier field 65 includes a code comprising a generated prefix code (FF10) and a suffix which is the IP address of the telephone 12 stored in the IP address field 53. The caller IP address field 67 holds the IP address assigned to the telephone, in this embodiment 192.168.0.20, and the caller UDP port field 69 includes a UDP port identifier identifying a UDP port to which audio data is to be sent for reception by the caller's telephone.

Call Controller

Referring to FIG. 4, a call controller circuit of the call controller 14 (FIG. 1) is shown in greater detail at 100. The call controller circuit 100 includes a microprocessor 102, program memory 104 and an I/O interface 106. The call controller circuit 100 may include a plurality of microprocessors, a plurality of program memories and a plurality of I/O interfaces to be able to handle a large volume of calls. However, for simplicity, the call controller circuit 100 will be described as having only one microprocessor, program memory and I/O interface, it being understood that there may be more.

Generally, the I/O interface 106 includes an input 108 for receiving messages, such as the SIP Invite message shown in FIG. 3, from the telephone shown in FIG. 2. The I/O interface 106 also has an RC Request message output 110 for transmitting an RC Request message to the routing controller 16 of FIG. 1, an RC message input 112 for receiving routing messages from the routing controller 16 (FIG. 1), a media relay (MR) output 114 for transmitting messages to the media relay (FIG. 1) to advise the media relay to establish an audio path, and a MR input 116 for receiving messages from the media relay to which a message has been sent to attempt to establish the audio path. The I/O interface 106 further includes a SIP output 118 for transmitting SIP messages to the telephone 12 (FIG. 1) to advise the telephone of the IP address of the media relay 17 (FIG. 1) which will establish the audio path. The I/O interface 106 further includes mediation device input 119 and output 121 for communicating with the mediation device 31 (FIG. 1).

While certain inputs and outputs have been shown as separate, it will be appreciated that some may be associated with a single IP address and TCP or UDP port. For example, the messages sent and received from the routing controller 16 may be transmitted and received at the same single IP address and TCP or UDP port.

The program memory 104 of the call controller circuit 100 includes blocks of code for directing the microprocessor 102 to carry out various functions of the call controller 14. For example, these blocks of code include a first block 120 for causing the call controller circuit 100 to execute a SIP Invite-to-RC request process to produce an RC Request message in response to a received SIP Invite message. In addition, there is a Routing Message Handler block 122 which causes the call controller circuit 100 to engage the mediation device and/or execute a call handling routine to establish audio paths through a media relay to establish the call. The program memory 104 further includes an in-call intercept message handler 1450 for intercepting a call in progress and a cease intercept message handler 1520 for ceasing the interception of a call in progress.

Figure 5:
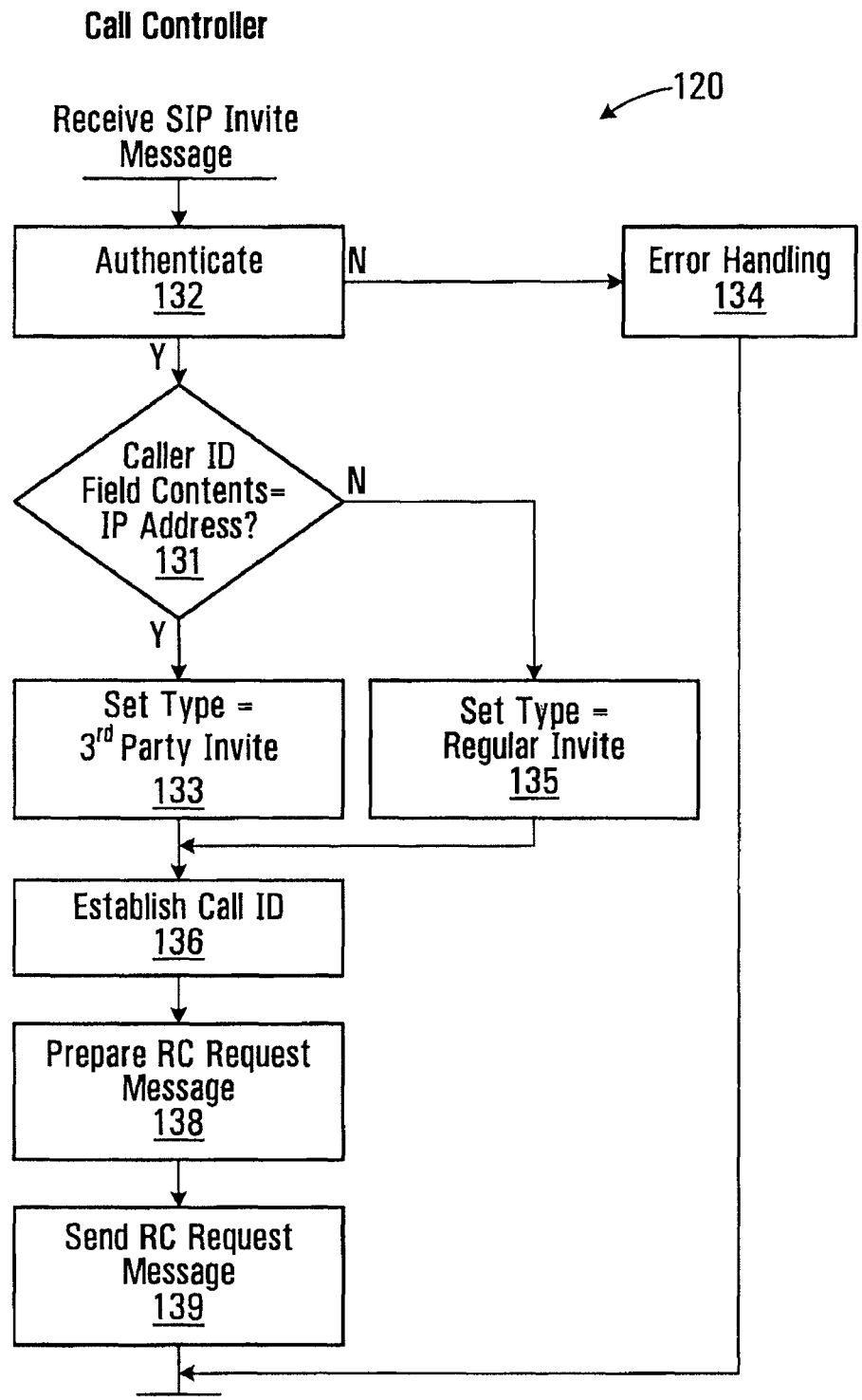
FIG. 5 is a flowchart of a process executed by the call controller shown in FIG. 1.

Referring to FIG. 5, the SIP Invite-to-RC Request process is shown in more detail at 120. On receipt of a SIP Invite message of the type shown in FIG. 3, block 132 of FIG. 5 directs the call controller circuit 100 of FIG. 4 to authenticate the user operating the telephone from which the SIP Invite message originated. This may be done, for example, by prompting the user for a password, by sending a message back to the telephone 12 which is interpreted at the telephone as a request for password entry or the password may automatically be sent to the call controller 14 from the telephone, in response to the message. The call controller 14 may then make enquiries of databases to which it has access, to determine whether or not the user's password matches a password stored in the database. Various functions may be used to pass encryption keys or hash codes back and forth to ensure the secure transmission of passwords.

Should the authentication process fail, the call controller circuit 100 is directed to an error handling block 134 which causes messages to be displayed at the telephone 12 to indicate that there was an authentication error. If the authentication process is successful, block 131 directs the call controller circuit 100 to determine whether or not the contents of the caller identifier field 60 of the SIP Invite message is a validly formatted IP address. If it is a valid IP address, then block 133 directs the call controller circuit 100 to associate a type code with the call to indicate that the call type is a third party invite.

If at block 131 the caller identifier field 60 contents do not identify an IP address, then block 135 directs the call controller circuit 100 to associate a type code with the call to indicate the call type is a regular SIP Invite message. Then, block 136 directs the call controller circuit 100 to establish a call ID by assigning the call ID provided in the call identifier field 65 of the SIP Invite message from the telephone 12, and at block 138 the call controller circuit is directed to produce an RC Request message of the type shown in FIG. 6 that includes that call ID. Referring back to FIG. 5, block 139 then directs the call controller circuit 100 to send the RC Request message to the routing controller 16.

Figures 6, 7:
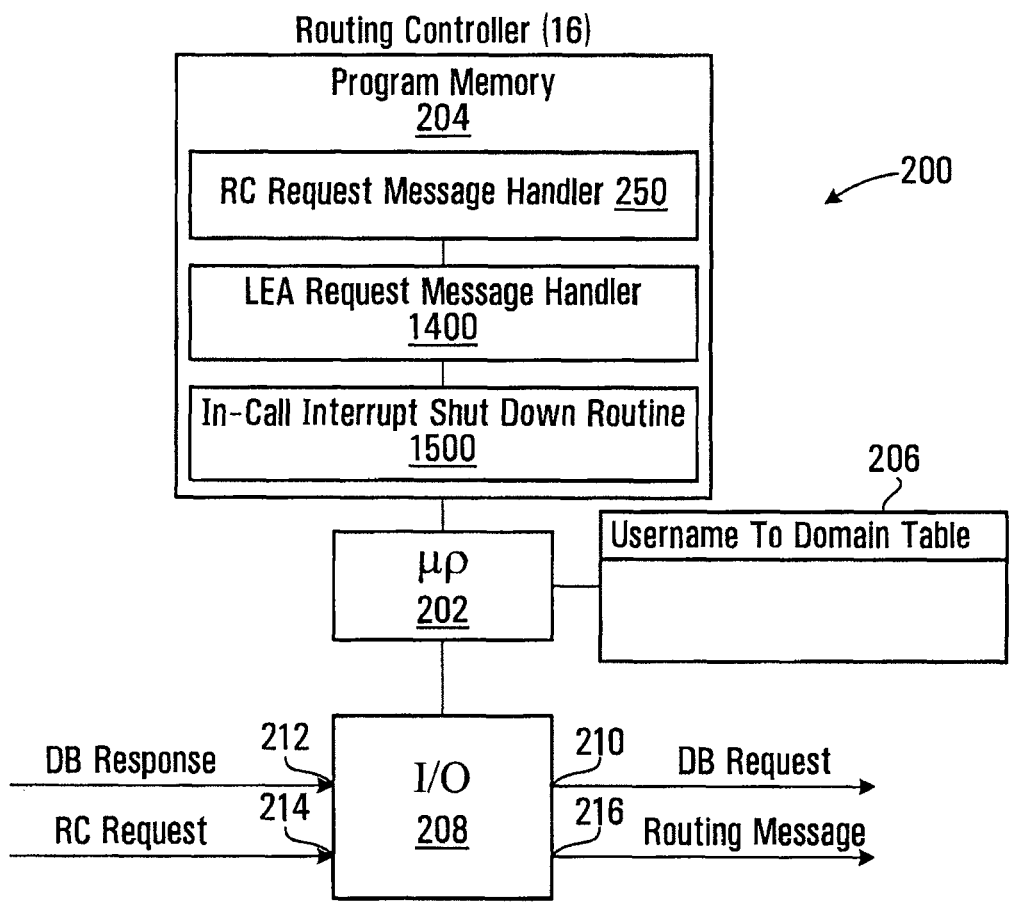
FIG. 6 is a schematic representation of a routing controller (RC) request message produced by the call controller shown in FIG. 1.
FIG. 7 is a block diagram of a routing controller (RC) processor circuit of the system shown in FIG. 1.

Referring to FIG. 6, an RC Request message is shown generally at 150 and includes a caller identifier field 152, a callee identifier field 154, a digest field 156, a call ID field 158 and a type field 160. The caller, callee, digest, and call identifier fields 152, 154, 156 and 158 contain copies of the caller, callee, digest parameters and call ID fields 60, 62, 64 and 65 of the SIP Invite message 59 shown in FIG. 3. The type field 160 contains the type code established at block 133 or 135 of FIG. 5 to indicate whether the call is from a third party or system subscriber, respectively. The callee identifier field 154 may include a PSTN number or a system subscriber username as shown, for example.

Routing Controller

Referring to FIG. 7, the routing controller 16 is shown in greater detail and includes a routing controller processor circuit shown generally at 200. The RC processor circuit 200 includes a microprocessor 202, program memory 204, a table memory 206 and an I/O interface 208, all in communication with the processor. There may be a plurality of processor circuits (202), memories (204), etc.

The I/O interface 208 includes a database output port 210 through which a request to the database 18 (FIG. 1) can be made and includes a database response port 212 for receiving a reply from the database. The I/O interface 208 further includes an RC Request message input 214 for receiving the RC Request message from the call controller 14 and includes a routing message output 216 for sending a routing message back to the call controller 14.

The program memory 204 includes blocks of codes for directing the RC processor circuit 200 to carry out various functions of the routing controller 16. One of these blocks implements an RC Request message handler process 250 which directs the RC to produce a routing message in response to a received RC Request message of the type shown at 150 in FIG. 6. Referring back to FIG. 7, the program memory 204 further includes a Law Enforcement Authority (LEA) request message handler 1400 and an in-call intercept shut down routine 1500.

The RC Request message handler process 250 is shown in greater detail in FIGS. 8A through 8D.

RC Request Message Handler

Figure 8A:
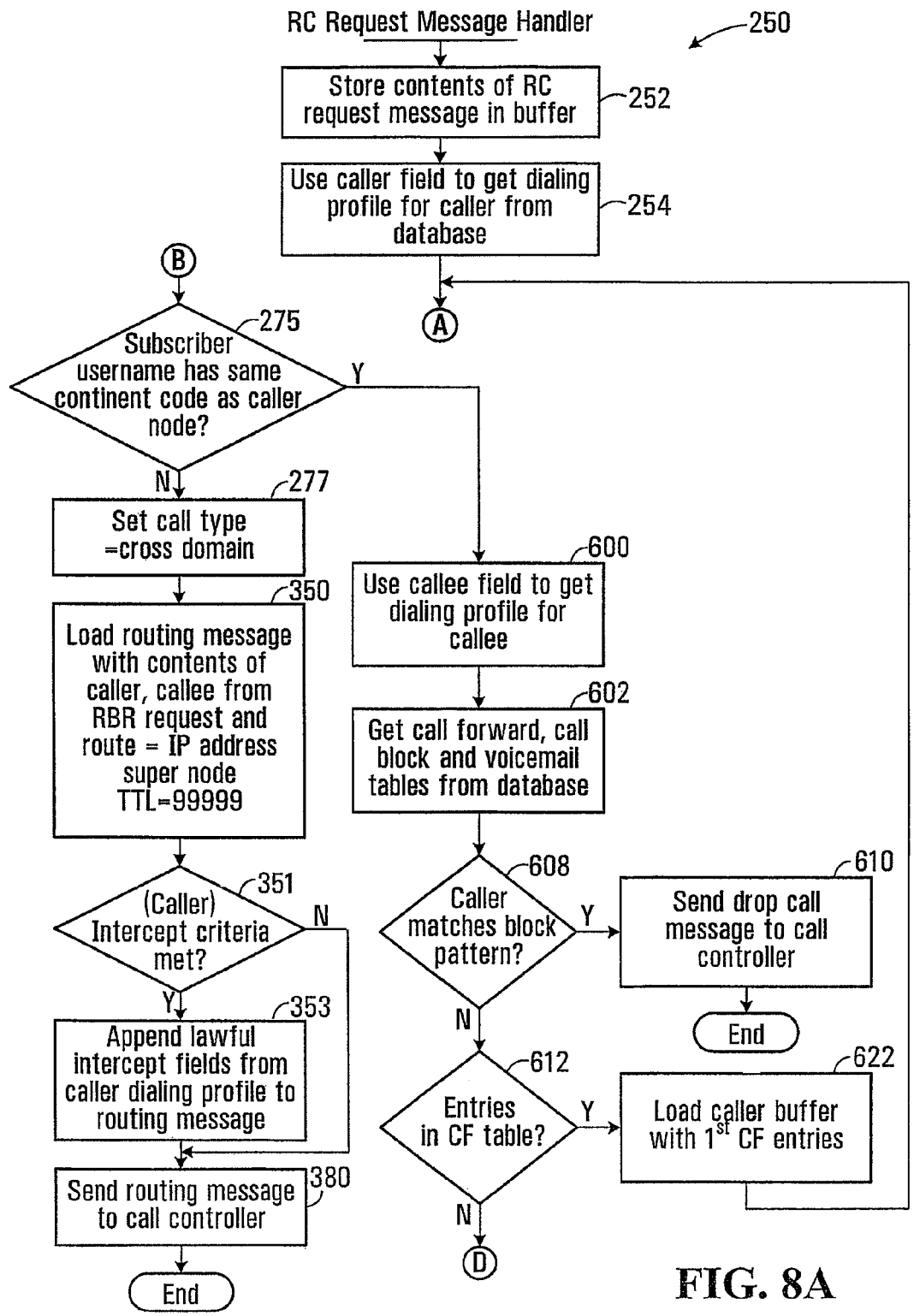
FIGS. 8A-8D are flowcharts of a RC Request message handler executed by the RC processor circuit shown in FIG. 7.

Referring to FIG. 8A, the RC Request message handler process 250 begins with a first block 252 that directs the RC processor circuit 200 (FIG. 7) to store the contents of the RC Request message 150 (FIG. 6) in buffers. Block 254 then directs the RC processor circuit 200 to use the contents of the caller identifier field 152 in the RC Request message shown in FIG. 6, to locate and retrieve a dialing profile for the caller from the database 18.

The routing controller maintains, in the database, a dialing profile for each subscriber to the system. Referring to FIG. 9, an exemplary dialing profile is shown generally at 256 and includes system fields including a username field 258, a domain field 260, a national dialing digits (NDD) field 262, an IDDs (IDD) field 264, a country code field 266, a local area codes field 267, a caller minimum local length field 268, a caller maximum local length field 270 and a reseller field 273.

The exemplary dialing profile further includes lawful intercept related fields including a lawful intercept (LI) flag field 702, at least one mediation device field 704, at least one warrant ID field 706, and intercept period start and stop date/time fields 708 and 710. The LI flag field 702, the warrant ID filed 706 and the LI start/stop fields 708 and 710 may be regarded as determination information fields for determining whether to intercept a communication involving the subscriber and the MD1 address field 704 may be regarded as a destination information field for identifying a device to which intercepted communications involving the subscriber are to be sent.

The system fields (258, 260, 262, 264, 266, 267, 268, 270, 273) are assigned values by a system operator or are assigned automatically according to pre-defined algorithms (not shown) when a user registers with the system to become a subscriber. The lawful intercept fields (702, 704, 706, 708, 710) are assigned values in response to communications with one or more authorized devices and may be populated at any time regardless of whether or not communications involving the subscriber are in progress.

For example, referring back to FIG. 1 the mediation device 31 may be regarded as an authorized device operated by a law enforcement authority 293. A communications channel between the call controller 14 and the mediation device 31 may be established to permit the mediation device to communicate with the call controller to cause the call controller to communicate with the routing controller 16 to find a subscriber record in the database 18 which is associated with a subscriber for which a warrant for lawful intercept has been obtained. For example, once a warrant identifying a user and permitting lawful intercept of that user's communications has been received by the law enforcement authority 293, that authority can use its own computers to communicate with the mediation device 31 to cause the mediation device to communicate with the call controller 14 to cause the call controller to interact with the routing controller 16 to access a dialing profile (FIG. 9) for the user specified in the warrant and load the lawful intercept fields (702, 704, 706, 708, 710) with data that sets the lawful intercept flag field 702 to "on", stores an IP address of the mediation device 31 in the MD1 address field 704, loads the warrant ID field 706 with an identifier of the warrant and loads the start and stop fields 708 and 710 with start and stop dates and times to specify a period during which lawful intercept of communications of the identified user may occur according to the warrant. Thus, intercept information is associated with the dialing profile by the routing controller, in response to information it receives from the call controller.

A plurality of groups of lawful intercept fields of the type shown may be added, each group being added by a different authorized device, for example, if several different law enforcement agencies operating the same or different mediation devices have warrants to monitor communications of a user. Alternatively the authorized device may include a handover interface operable to communicate with the call controller or routing controller to access the database to load the lawful intercept fields associated with a subscriber of interest.

An exemplary dialing profile for the Vancouver subscriber is shown generally at 276 in FIG. 10 and indicates that the username field includes the username 2001 1050 8667 which is the same as the contents of the username field 50 in the Vancouver telephone 12 shown in FIG. 2.

Referring back to FIG. 10, the domain field 260 includes a domain name as shown at 282, including a supernode type identifier 284, a location code identifier 286, a system provider identifier 288 and a top level domain identifier 290, identifying a domain or supernode associated with the user identified by the contents of the username field 258.

In this embodiment, the supernode type identifier 284 includes the code "sp" identifying a supernode and the location code identifier 286 identifies the supernode as being in Vancouver (YVR). The system provider identifier 288 identifies the company supplying the service and the top level domain identifier 290 identifies the "com" domain.

The national dialing digit (NDD) field 262 in this embodiment includes the digit "1" and, in general, includes a digit specified by the International Telecommunications Union-Telecommunications Standardization Sector (ITU-T) E.164 Recommendation which assigns national dialing digits to certain countries. Herein numbering sequences compliant with this standard will be regarded as "E.164" numbers.

The International Dialing Digit (IDD) field 264 includes the code 011 and in general includes a code assigned by the ITU-T according to the country or geographical location of the user.

The country code field 266 includes the digit "1" and in general includes a number assigned by the ITU-T to represent the country in which the user is located.

The local area codes field 267 includes the numbers 604 and 778 and generally includes a list of area codes that have been assigned by the ITU-T to the geographical area in which the subscriber is located. The caller minimum and maximum local number length fields 268 and 270 hold the number 10 representing minimum and maximum local number lengths permitted in the area code(s) specified by the contents of the local area codes field 267. The reseller field 273 holds a code identifying a retailer of the telephone services, and in the embodiment shown, the retailer is "Klondike".

Initially, the lawful intercept fields shown in FIG. 9 might not be included in the dialing profile and may be added as described above, by the mediation device 31, in the event a warrant is obtained to intercept the user's calls. Alternatively, the lawful intercept fields may be included, but populated with null values until modified by a mediation device 31.

A dialing profile of the type shown at 256 in FIG. 9 is produced whenever a user registers with the system or agrees to become a subscriber to the system. Thus, for example, a user wishing to subscribe to the system may contact an office maintained by a system operator and personnel in the office may ask the user certain questions about his location and service preferences, whereupon tables can be used to provide office personnel with appropriate information to be entered into the username, domain, NDD, IDD, country code, local area codes and caller minimum and maximum local length fields 258, 260, 262, 264, 266, 267, 268, 270 to establish a dialing profile for the user.

Referring to FIGS. 11 and 12, dialing profiles for subscribers in Calgary and London, respectively for example, are shown.

In addition to creating dialing profiles, optionally when a user registers with the system, a direct inward dialing (DID) record of the type shown at 268 in FIG. 13 is added to a direct inward dialing table in the database 18 to associate the username with a host name of the supernode with which the user is associated and with an E.164 number on the PSTN network.

In this embodiment, the DID bank table records include a username field 281, a user domain field 272 and a DID field 274, for holding the username, hostname of the supernode, and an E.164 number respectively.

A DID bank table record for the London subscriber is shown generally at 291 in FIG. 14.

In addition to creating dialing profiles and DID records when a user registers with the system, call blocking records of the type shown in FIG. 26, call forwarding records of the type shown in FIG. 28 and voicemail records of the type shown in FIG. 30 may be stored in the database 18 when a new subscriber is added to the system.

Referring back to FIG. 8A, after being directed at block 254 to retrieve a dialing profile for the caller, a dialing profile such as shown at 276 in FIG. 10 is retrieved and the RC processor circuit 200 is directed to perform certain checks on the callee identifier provided by the contents of the callee identifier field 154 of the RC Request message shown in FIG. 6. These checks are shown in greater detail in FIG. 8B.

Figure 8B:
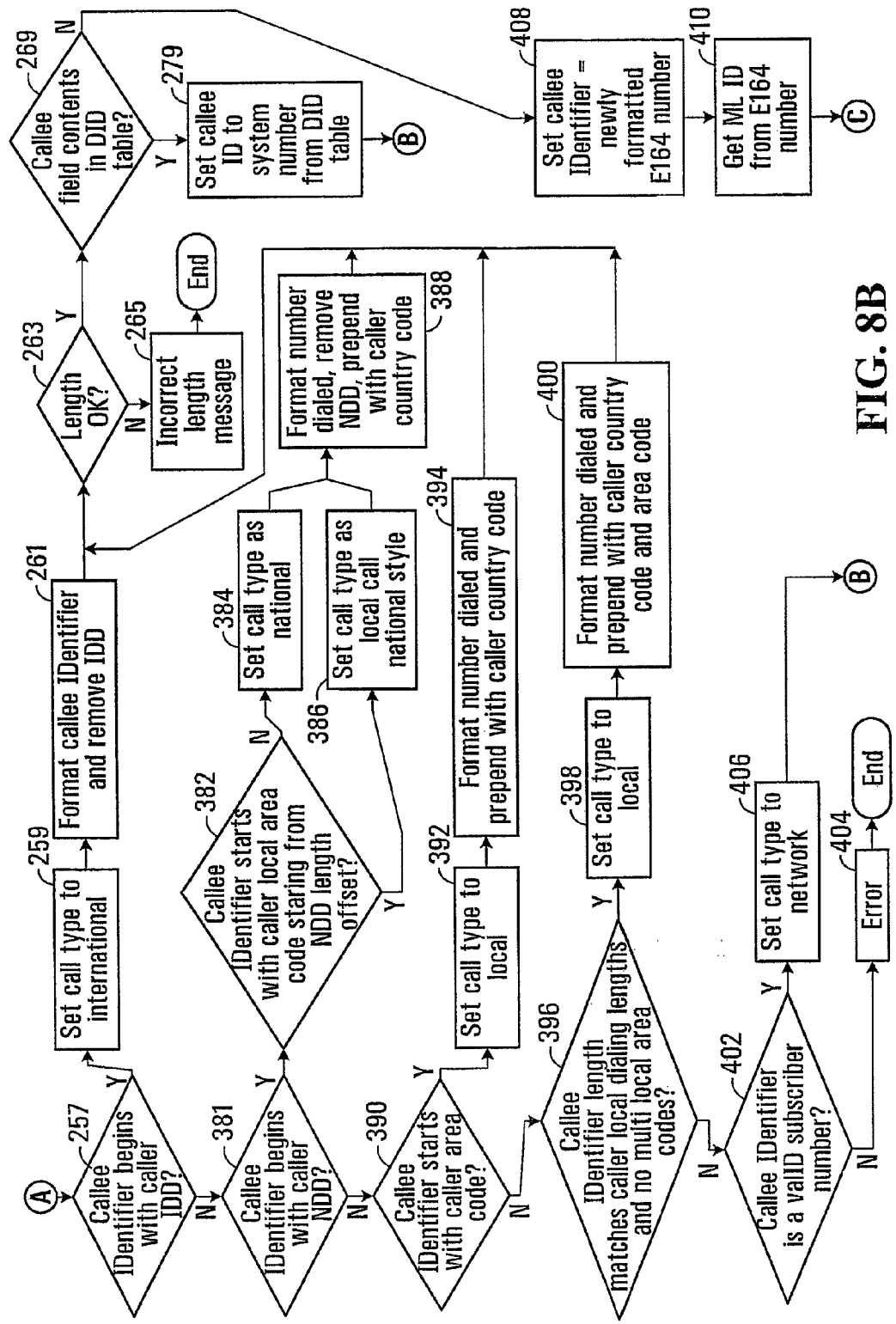

Referring to FIG. 8B, the RC processor circuit 200 is directed to a first block 257 that causes it to determine whether a digit pattern of the callee identifier 154 provided in the RC Request message includes a pattern that matches the contents of the IDD field 264 in the caller dialing profile 276 shown in FIG. 10. If so, then block 259 directs the RC processor circuit 200 to set a call type code identifier (not shown) to indicate that the call is a long distance call, e.g., from the Vancouver subscriber to the London subscriber, and block 261 directs the RC processor circuit 200 to produce a reformatted callee identifier by reformatting the callee identifier into a predetermined target format. In this embodiment, this is done by removing the pattern of digits matching the IDD field contents 264 of the caller dialing profile 276 to effectively shorten the number. Then, block 263 directs the RC processor circuit 200 to determine whether or not the reformatted callee identifier meets criteria establishing it as a number compliant with the E.164 Recommendation set by the ITU-T and if the length does not meet this criteria, block 265 directs the RC processor circuit 200 to send back to the call controller 14 a message indicating that the length of the call identifier is not correct. The process 250 is then ended. At the call controller 14, routines may respond to the incorrect length message by transmitting a message back to the telephone 12 to indicate that an invalid number has been dialed.

Still referring to FIG. 8B, if the length of the reformatted callee identifier meets the criteria set forth at block 263, block 269 directs the RC processor circuit 200 to determine whether or not the reformatted callee identifier is associated with a direct inward dialing (DID) bank table record such as shown at 268 in FIG. 13.

An exemplary DID bank table record entry for the London callee is shown generally at 291 in FIG. 14. The username field 281 and user domain field 272 are as specified in the username and user domain fields 258 and 260 of the dialing profile 276 shown in FIG. 12. The contents of the DID field 274 include an E.164 telephone number including a country code 283, an area code 285, an exchange code 287 and a number 289. If the user has multiple telephone numbers, then multiple records of the type shown at 291 would be included in the DID bank table in the database 18, each having the same username and user domain, but different DID field 274 contents reflecting the different telephone numbers associated with that user.

Referring back to FIG. 8B, at block 269, if the RC processor circuit 200 finds that the reformatted callee identifier produced at block 261 is found in a record in the DID bank table, then the callee is a subscriber to the system and block 279 directs the RC processor circuit 200 to copy the contents of the corresponding username field 270 into a callee ID buffer (not shown). Thus, the RC processor circuit 200 locates a subscriber username associated with the reformatted callee identifier. The processor is then directed to block 275 at point B in FIG. 8A.

Subscriber to Subscriber Calls Between Different Nodes

Referring back to FIG. 8A, block 275 then directs the RC processor circuit 200 to determine whether or not the subscriber username is associated with the same supernode as the caller. To do this, the RC processor circuit 200 determines whether or not the continent code (61) of the username stored in the callee ID buffer is the same as the continent code (61) of the username of the caller specified by the caller identifier field 152 of the RC Request message shown in FIG. 6. If they are not the same, block 277 directs the RC processor circuit 200 to set a call type flag (not shown) to indicate that the call is a cross-domain call. Then, block 350 directs the RC processor circuit 200 to produce a routing message identifying the supernode in the system with which the callee is associated and to set a TTL for the call to the maximum value of 99999. The supernode in the system, with which the callee is associated, is determined by using the callee username stored in the callee ID buffer to address a supernode table having records of the type as shown at 370 in FIG. 17.

Referring to FIG. 17, each prefix to supernode table record 370 has a prefix field 372 and a supernode address field 374. The prefix field 372 includes the first n digits of the callee identifier. In this case n=1. The supernode address field 374 holds a code representing the IP address or a fully qualified domain name of the supernode associated with the code stored in the prefix field 372. Referring to FIG. 18, for example, if the prefix is 4, the supernode address associated with that prefix is sp.1 hr.digifonica.com, identifying the London supernode 21, for example.

Referring to FIG. 15, a generic routing message is shown generally at 352 and includes a supplier prefix field 354, a delimiter field 356, a callee field 358, at least one route field 360, a time-to-live (TTL) field 362 and other fields 364. The supplier prefix field 354 holds a code for identifying supplier traffic. The delimiter field holds a symbol that delimits the supplier prefix code from the callee field 358 and in this embodiment, the symbol is a number sign (#). The route field 360 holds a domain name or an IP address of a gateway or supernode that is to carry the call and the TTL field 362 holds a value representing the number of seconds the call is permitted to be active, based on subscriber available minutes and other billing parameters, for example.

Referring to FIG. 8A and FIG. 16, in this example the routing message produced by the RC processor circuit 200 at block 350 is shown generally at 366 and includes only a callee field 358, a route field 360 and a TTL field 362.

The callee field 358 holds the full username of the callee and the route field 360, shown in FIG. 15, contains the identification of the domain with which the callee is associated, i.e., sp.1 hr.digifonica.com.

Having produced the routing message 366 as shown in FIG. 16A, referring back to FIG. 8A, block 351 then directs the RC processor circuit 200 to check the caller dialing profile (see FIG. 9) to determine whether or not it contains lawful intercept fields (702, 704, 706, 708, 710) and if so, to determine whether or not the determination information contained therein meets intercept criteria. The intercept criteria may be that the lawful intercept flag field 702 (FIG. 9) contains a flag indicating lawful intercept is enabled and whether the current date and time is within the period specified by the LI start date/time field contents 708 and the LI stop date/time field contents 710, for example. If the intercept criteria are met, block 353 directs the RC processor circuit 200 to append the contents of the lawful intercept fields 702, 704, 706, 708, 710 to the routing message produced at block 350 to produce a routing message as shown in FIG. 16A. Generally, the determination of whether or not the destination information meets intercept criteria is done prior to producing the routing message so that when the intercept criteria are met, at least some of the intercept information, in this embodiment all of it, can be included in the routing message.

If at block 351 in FIG. 8A, it is determined there are no lawful intercept fields associated with the caller dialing profile or that the intercept criteria are not met, the processor does not append any lawful intercept fields to the routing message produced at block 350 in FIG. 8A and the routing message shown in FIG. 16 is sent to the call controller 14 as shown at block 380. If the lawful intercept fields have been appended, block 380 directs the RC processor circuit 200 to send the routing message shown in FIG. 16A to the call controller 14 (FIG. 1).

Referring back to FIG. 8B, if at block 257, the callee identifier specified by the contents of the callee field 154 of the RC Request message shown in FIG. 6 does not begin with an IDD, block 381 directs the RC processor circuit 200 to determine whether or not the callee identifier begins with the same national dial digit code as assigned to the caller. To do this, the processor is directed to refer to the caller dialing profile shown in FIG. 10. In the embodiment shown, the NDD code 262 is the digit 1. Thus, if the callee identifier begins with the digit 1, the RC processor circuit 200 is directed to block 382 in FIG. 8B.

Block 382 directs the RC processor circuit 200 to examine the callee identifier to determine whether or not digits following the NDD code identify an area code that is the same as any of the area codes identified in the local area codes field 267 of the caller dialing profile 276 shown in FIG. 10. If not, block 384 directs the RC processor circuit 200 to set a call type variable (not shown) to a code indicating the call is a national code. If the digits identify an area code that is the same as a local area code associated with the caller, block 386 directs the RC processor circuit 200 to set the call type variable to indicate that the call type is a local call, national style. After executing blocks 384 or 386, block 388 directs the RC processor circuit 200 to format the number dialed by removing the national dial digit (NDD) and prepending a caller country code identified by the country code field 266 of the caller dialing profile shown in FIG. 10. The RC processor circuit 200 is then directed to block 263 to perform the processes described above beginning at block 263.

If at block 381, the callee identifier does not begin with an NDD code, block 390 directs the RC processor circuit 200 to determine whether the callee identifier begins with digits that identify the same area code as the caller. Again, the reference for this is the caller profile shown in FIG. 10 and the RC processor circuit 200 determines whether or not the first few digits in the callee identifier identify an area code identified by the local area code field 267 of the caller profile. If so, then block 392 directs the RC processor circuit 200 to set the call type to a code indicating the call is a local call and block 394 directs the RC processor circuit 200 to prepend the caller country code to the callee identifier, the caller country code being determined from the country code field 266 in the caller profile shown in FIG. 10. The RC processor circuit 200 is then directed to block 263 for processing as described above beginning at block 263.

If at block 390, the callee identifier does not have the same area code as the caller, block 396 directs the RC processor circuit 200 to determine whether the callee identifier has the same number of digits as the number of digits indicated in either the caller minimum local number length field 268 or the caller maximum local number length field 270 of the caller profile shown in FIG. 10. If so, then block 398 directs the RC processor circuit 200 to set the call type to local and block 400 directs the processor to prepend to the callee identifier the caller country code as indicated by the country code field 266 of the caller profile shown in FIG. 10 followed by the caller area code as indicated by the local area code field 267 of the caller profile shown in FIG. 10. The RC processor circuit 200 is then directed to block 263 for further processing as described above beginning at block 263.

If at block 396, the callee identifier has a length that does not match the length specified by the contents of the caller minimum local number length field 268 or the caller maximum local number length field 270, block 402 directs the RC processor circuit 200 to determine whether or not the callee identifier identifies a valid username. To do this, the RC processor circuit 200 searches through the database of dialing profiles to find a dialing profile having username field contents 258 that match the callee identifier. If no match is found, block 404 directs the RC processor circuit 200 to send an error message back to the call controller (14). If at block 402, a dialing profile having a username field 258 that matches the callee identifier is found, block 406 directs the RC processor circuit 200 to set the call type to a code indicating the call is a network call and the processor is directed to block 275 of FIG. 8A, to continue processing the RC message handler process 250.

From FIG. 8B, it will be appreciated that there are certain groups of blocks of codes that direct the RC processor circuit 200 to determine whether the callee identifier has certain features such as an IDD code, a NDD code, an area code and a length that meet certain criteria and to reformat the callee identifier as necessary into a predetermined target format including only a country code, area code, and a normal telephone number, for example, to cause the callee identifier to be compatible with the E.164 number plan standard, in this embodiment. This enables the RC processor circuit 200 directed by block 279 to have a consistent format of callee identifiers for use in searching through the DID bank table records of the type shown in FIG. 13 to determine how to route calls for subscriber to subscriber calls on the same system.

Subscriber to Non-Subscriber Calls

Not all calls will be subscriber-to-subscriber calls and this will be detected by the RC processor circuit 200 when it executes block 269 of FIG. 8B, and does not find a record that is associated with the callee in the DID bank table. When this occurs, the RC processor circuit 200 is directed to block 408 which causes it to set the callee identifier equal to the reformatted callee identifier, i.e., the number compatible with the E.164 standard. Then, block 410 directs the RC processor circuit 200 to address a master list having records of the type shown in FIG. 19.

Each master list record includes a master list ID field 500, a dialing code field 502, a country code field 504, a national sign number field 506, a minimum length field 508, a maximum length field 510, a NDD field 512, an IDD field 514 and a buffer rate field 516.

The master list ID field 500 holds a unique code such as 1019, for example, identifying a route identification (route ID). The dialing code field 502 holds a predetermined number pattern which the RC processor circuit 200 uses at block 410 in FIG. 8B to find the master list record having a dialing code matching the first few digits of the reformatted callee identifier. The country code field 504 holds a number representing the country code associated with the record and the national sign number field 506 holds a number representing the area code associated with the record. (It will be observed that the dialing code is a combination of the contents of the country code field 504 and the national sign number field 506). The minimum length field 508 holds a number representing the minimum number of digits that can be associated with the record and the maximum length field 51 holds a number representing the maximum number of digits in a number with which the record may be compared. The NDD field 512 holds a number representing an access code used to make a call within the country specified by the contents of the country code field 504 and the IDD field 514 holds a number representing the international prefix needed to dial a call from the country indicated by the country code.

Thus, for example, a master list record may have a format as shown in FIG. 20 with exemplary field contents as shown.

Referring back to FIG. 8B, using the country code and area code portions of the reformatted callee identifier that has been formatted for compatibility with the E.164 standard, block 410 directs the RC processor circuit 200 to find a master list record such as the one shown in FIG. 20 having a dialing code that matches the country code and area code of the callee identifier. Thus, in this example, the RC processor circuit 200 would find a master list record having an ID field with the number 1019. This number may be also referred to as a route ID. Thus, a route ID number is found in the master list record associated with a predetermined number pattern in the reformatted callee identifier.

Figure 8C:
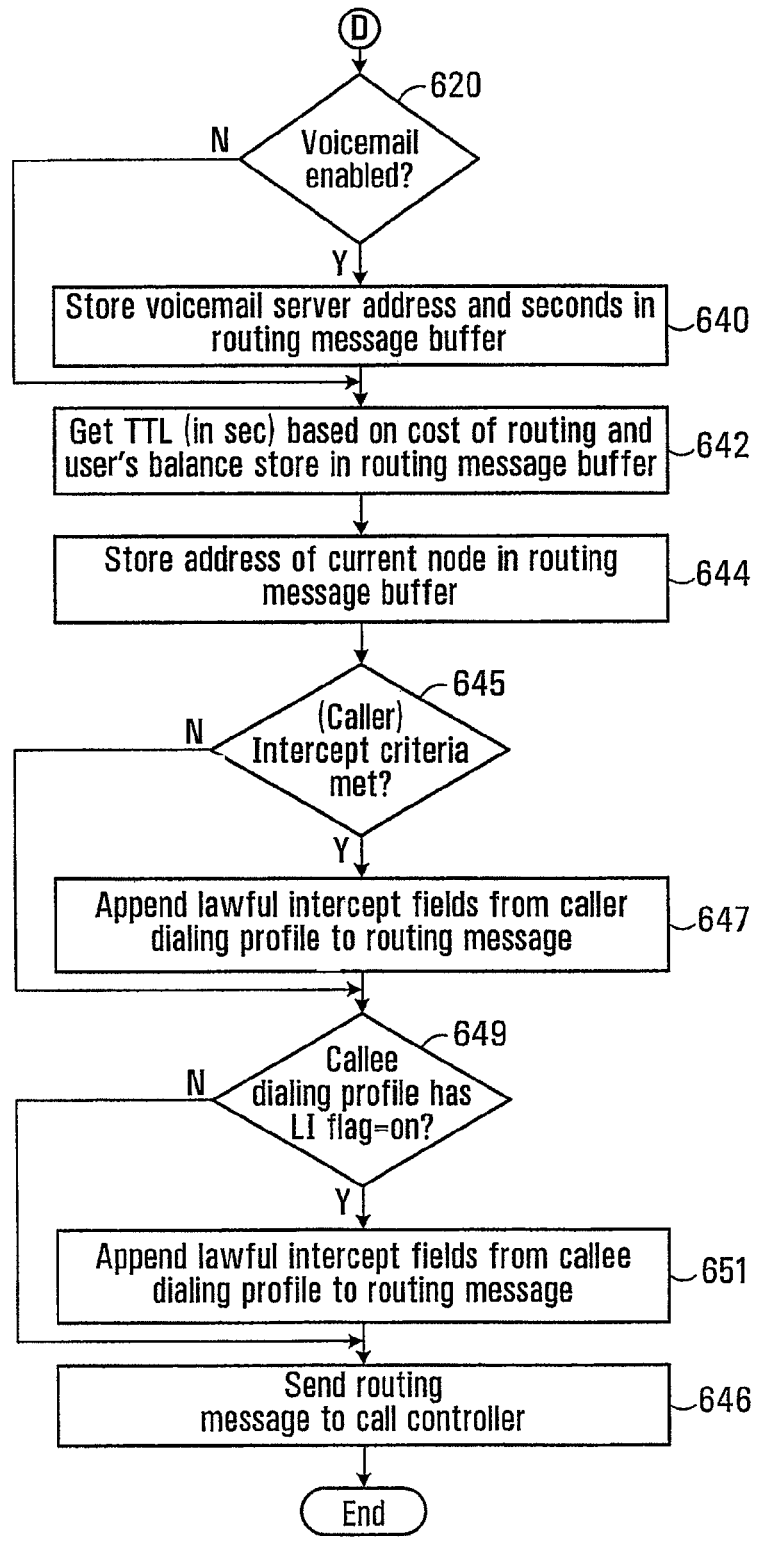
Figure 8D:
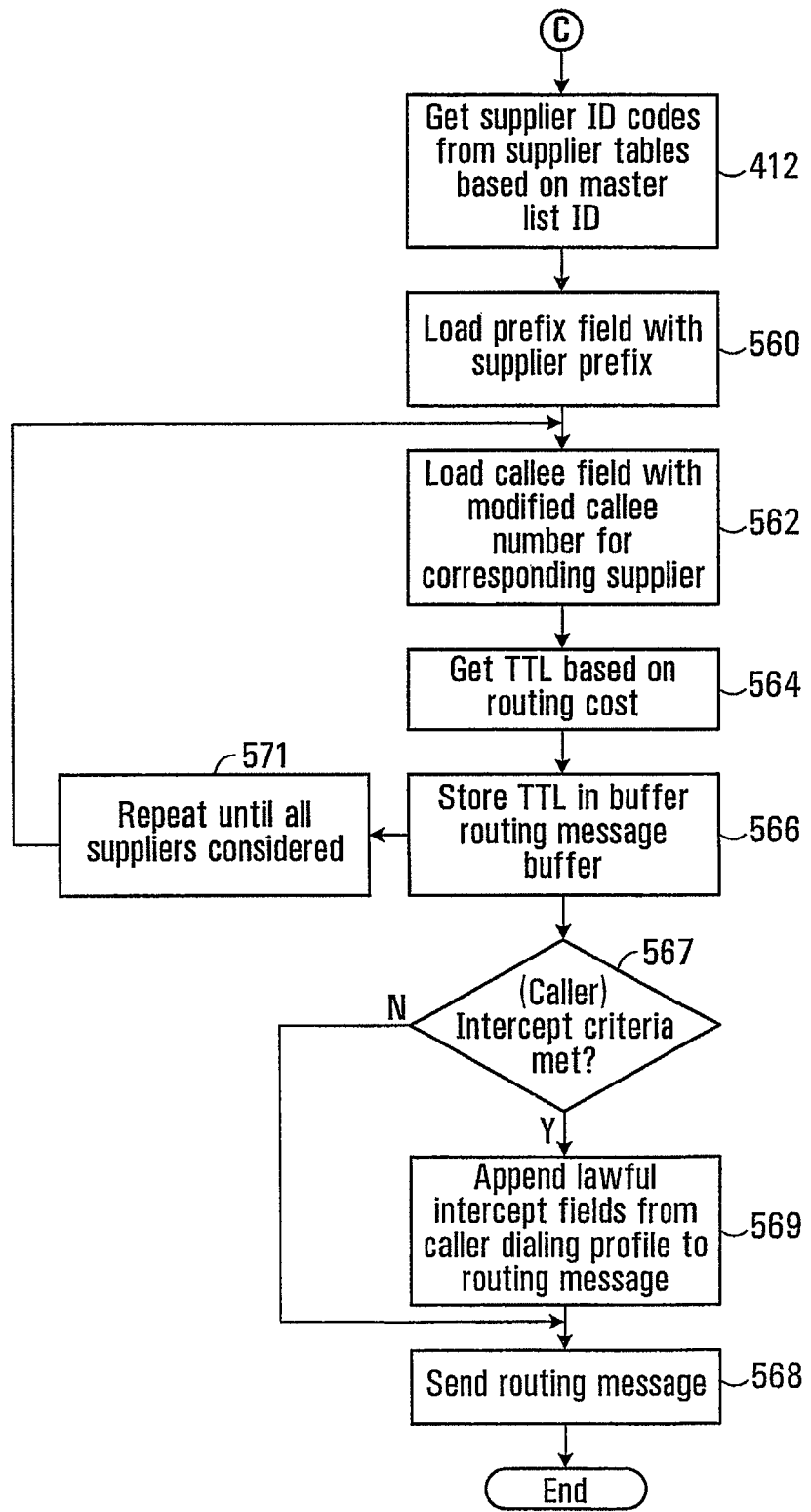

After execution of block 410 in FIG. 8B, the process 250 continues as shown in FIG. 8D. Referring to FIG. 8D, block 412 directs the RC processor circuit 200 to use the route ID number to locate at least one supplier record identifying a supplier operable to supply a communications link for this route. To do this, block 412 directs the RC processor circuit 200 to search a supplier ID table having records of the type shown in FIG. 21.

Referring to FIG. 21, the supplier list records include a supplier ID field 540, a route ID field 542, an optional prefix field 544, a route identifier field 546, a NDD/IDD rewrite field 548 and a rate field 550. The supplier ID field 540 holds a code identifying the name of the supplier and the route ID field 542 holds a code for associating the supplier record with a route, and hence with a master list record. The prefix field 544 holds a string used to identify the supplier traffic and the route identifier field 546 holds an IP address of a gateway operated by the supplier indicated by the supplier ID field 540. The NDD/IDD rewrite field 548 holds a code and the rate field 550 holds a code indicating the cost per second to the system operator to use the route provided by the gateway specified by the contents of the route identifier field 546. Exemplary supplier records are shown in FIGS. 22, 23 and 24 for the suppliers shown in FIG. 1 which may include Telus, Shaw and Sprint, respectively, for example.

Referring back to FIG. 8D, at block 412 the RC processor circuit 200 finds all supplier records that identify the route ID found at block 410 of FIG. 8B.

Referring back to FIG. 8D, block 560 directs the RC processor circuit 200 to begin to produce routing messages of the type shown in FIG. 16. To do this, the RC processor circuit 200 loads a routing message buffer as shown in FIG. 25 with a supplier prefix of the least costly supplier where the least costly supplier is determined from the rate fields 550 of the records associated with respective suppliers.

Referring to FIGS. 22-24, in the embodiment shown, the supplier "Telus" has the lowest number in the rate field 550 and therefore the prefix 4973 associated with that supplier is loaded into the routing message buffer shown in FIG. 25 first. The prefix 4973 is then delimited by the number sign and the reformatted callee identifier is next loaded into the routing message buffer. Then, the contents of the route identifier field 546 of the record associated with the supplier Telus are added to the message after an @ sign delimiter and then block 564 in FIG. 8D directs the RC processor circuit 200 to get a TTL value, which in this embodiment may be 3600 seconds, for example. Block 566 then directs the RC processor circuit 200 to load this TTL value in the routing message buffer shown in FIG. 25. Accordingly, the first part of the routing message is shown generally at 570 in FIG. 25.

Referring back to FIG. 8D, block 568 directs the RC processor circuit 200 back to block 560 and causes it to repeat blocks 560, 562, 564 and 566 for each successive supplier until the routing message buffer is loaded with information pertaining to each supplier. Thus, the second portion of the routing message is shown at 572 in FIG. 25 and this second portion relates to the second supplier identified by the record shown in FIG. 23 and referring back to FIG. 25, the third portion of the routing message is shown at 574 which is associated with a third supplier as indicated by the supplier record shown in FIG. 24. Consequently, referring to FIG. 25, the routing message buffer holds a routing message identifying a plurality of different suppliers able to provide gateways to establish a communication link to permit the caller to contact the callee. Each of the suppliers is identified, in ascending order according the rates contained in the rate fields 550 of the supplier list records shown in FIGS. 22-24, in this embodiment. Other criteria for determining the order in which suppliers are listed in the routing message may include preferred supplier priorities which may be established based on service agreements, for example. In this case additional fields may be provided in respective supplier records to hold values representing supplier priority.

After the routing message buffer has been loaded as shown in FIG. 25, block 567 directs the RC processor circuit 200 to check the caller dialing profile shown in FIG. 10 to determine whether or not it contains lawful intercept fields as shown in FIG. 9, and if so, to determine whether or not the intercept criteria are met by checking whether the lawful intercept flag field 702 contains a flag indicating that lawful intercept is enabled and checking whether the current date and time are within the period specified by the LI start date/time field contents 708 and the LI stop date/time field contents 710. If the intercept criteria are met, block 569 directs the RC processor circuit 200 to append the contents of the lawful intercept fields 702, 704, 706, 708, 710 to the routing message stored in the routing message buffer, as shown in FIG. 25A. Again, the determination of whether or not the destination information meets intercept criteria is done prior to producing the routing message so that when the intercept criteria are met, at least some of the intercept information, in this embodiment all of it, can be included in the routing message.

If at block 567, it is determined there are no lawful intercept fields associated with the caller dialing profile shown in FIG. 10 or that the intercept criteria are not met, the RC processor circuit 200 does not append any lawful intercept fields to the routing message stored in the routing message buffer shown in FIG. 25.

Block 568 then directs the RC processor circuit 200 to send the contents of the routing message buffer, i.e. the routing message shown in FIG. 25 or 25A, to the call controller 14 in FIG. 1.

Subscriber to Subscriber Calls within the Same Node

Referring back to FIG. 8A, if at block 275, the callee identifier stored in the callee ID buffer has a prefix that identifies the same supernode as that associated with the caller, block 600 directs the RC processor circuit 200 to use the callee identifier to locate and retrieve a dialing profile for the callee identified by the callee identifier. The dialing profile is of the type shown in FIG. 9, and may contain data as shown in FIG. 11, for example. Block 602 of FIG. 8A directs the RC processor circuit 200 to get call block, call forward and voicemail tables from the database 18 based on the username identified in the callee profile retrieved by the RC processor circuit at block 600. Call block, call forward and voicemail tables have records as shown in FIGS. 26, 28 and 30 for example.

Referring to FIG. 26, the call block records include a username field 604 and a block pattern field 606. The username field holds a username matching the username in the username field 258 of the dialing profile associated with the callee and the block pattern field 606 holds one or more E.164-compatible numbers or usernames identifying PSTN numbers or system subscribers from whom the subscriber identified by the contents of the username field 604 does not wish to receive calls.

Referring back to FIG. 8A and referring to FIG. 27, block 608 directs the RC processor circuit 200 to determine whether or not the caller identifier matches a block pattern stored in the block pattern field 606 of the call block record associated with the callee identified by the contents of the username field 604 in FIG. 26. If the caller identifier matches a block pattern stored in the block pattern field 606, block 610 directs the RC processor circuit 200 to send a drop call or non-completion message to the call controller (14) and the process is ended. If the caller identifier does not match a block pattern associated with the callee, block 612 directs the RC processor circuit 200 to determine whether or not call forwarding is required.

Referring to FIG. 28, records in the call forwarding table include a username field 614, a destination number field 616, a destination number field 616 and a sequence number field 618. The username field 614 stores a code representing a subscriber with which the record is associated. The destination number field 616 holds a username or number representing a number to which the current call should be forwarded and the sequence number field 618 holds an integer number indicating the order in which the username associated with the corresponding destination number field 616 should be attempted for call forwarding. The call forwarding table may have a plurality of records for a given user. The RC processor circuit 200 uses the contents of the sequence number field 618 to consider the records for a given subscriber in order. As will be appreciated below, this enables the call forwarding numbers to be tried in an ordered sequence.

Referring back to FIG. 8A and referring to FIG. 28, if at block 612 in FIG. 8A, the call forwarding record for the callee identified by the callee identifier contains no contents in the destination number field 616 and accordingly no contents in the sequence number field 618, there are no call forwarding entries and the RC processor circuit 200 is directed to load the routing message buffer shown in FIG. 32 with the callee username and domain, as shown at 650 in FIG. 32. The processor is then directed to block 620 in FIG. 8C.

If there are contents in the destination number field of the call forwarding record as shown in FIG. 29, block 622 shown in FIG. 8A directs the RC processor circuit 200 to search the dialing profile table to find a dialing profile record of the type shown in FIG. 9, for the user identified in the destination number field 616 in the call forwarding table record of FIG. 29 and to store the contents of the destination number field in the routing message buffer shown in FIG. 32. The RC processor circuit 200 is then directed to load the contents of the domain field 260 shown in FIG. 9 associated with the username specified by the contents of the destination number field 616 of FIG. 29 into the routing message buffer as shown at 652 in FIG. 32. This process is repeated for each call forwarding record associated with the callee identified by the callee identifier to add to the routing message buffer all call forwarding usernames and domains associated with the callee.

Referring to FIG. 8C, at block 620 the processor is directed to determine whether or not the user identified by the callee identifier has paid for voicemail service and this is done by checking to see whether or not a flag is set in a voicemail record of the type shown in FIG. 30 in a voicemail table stored in the database 18 in FIG. 1.

Referring to FIG. 30, voicemail table records include a username field 624, a voicemail server field 626, a seconds-to-voicemail field 628 and an enable field 630. The username field 624 stores the username of the subscriber who purchased the service. The voicemail server field 626 holds a code identifying an IP address or a fully qualified domain name (FQDN) of a voicemail server associated with the subscriber identified by the username field 624. The seconds-to-voicemail field 628 holds a code identifying the time to wait before engaging voicemail and the enable field 630 holds a code representing whether or not voicemail is enabled for the user identified by the contents of the username field 624.

Therefore, referring back to FIG. 8C, at block 620 the processor searches for a voicemail record as shown in FIG. 31 having username field 624 contents matching the callee identifier and looks at the contents of the enabled field 630 to determine whether or not voicemail is enabled. If voicemail is enabled, then block 640 in FIG. 8C directs the processor to store the contents of the voicemail server field 626 of FIG. 31 and the contents of the seconds to voicemail field 628 of FIG. 31 in the routing message buffer as shown at 654 in FIG. 32. Referring back to FIG. 8C, block 642 then directs the processor to get time to live (TTL) values for each route specified by the routing message according to any of a plurality of criteria such as, for example, the cost of routing and the user's account balance. These TTL values are then appended to corresponding routes already stored in the routing message buffer.

Block 644 of FIG. 8C then directs the RC processor circuit 200 to store the IP address of the current supernode in the routing message buffer as shown at 656 in FIG. 32. An exemplary routing message is shown in the routing message buffer shown in FIG. 32.

Block 645 of FIG. 8C then directs the processor to check the caller dialing profile shown in FIG. 10 to determine whether or not it contains lawful intercept fields of the type shown in FIG. 9 and if so, to determine whether or not the intercept criteria are met. In this embodiment, this includes determining whether the lawful intercept flag field 702 contains a flag indicating that lawful intercept is enabled and checking whether the current date and time is within the period specified by the LI start date/time field contents 708 and the LI stop date/time field contents 710. If the intercept criteria are met, block 647 directs the RC processor circuit 200 to append the contents of the lawful intercept fields 702, 704, 706, 708, 710 to the routing message shown in FIG. 32A to produce a routing message with lawful intercept field contents, as shown in FIG. 32A. Again, the determination of whether or not the destination information meets intercept criteria is done prior to producing the routing message so that when the intercept criteria are met, at least some of the intercept information, in this embodiment all of it, can be included in the routing message.

Referring back to FIG. 8C, if at block 645, it is determined there are no lawful intercept fields associated with the caller dialing profile of FIG. 10 or that the intercept criteria are not met after producing the routing message shown in FIG. 32A the processor is directed to block 649 which causes the processor to check the callee dialing profile shown in FIG. 11 to determine whether or not it contains lawful intercept fields of the type shown in FIG. 9 and if so, to determine whether or not the intercept criteria are met by checking whether the current date and time is within the period specified by the LI start date/time field contents 708 and the LI stop date/time field contents 710 of the callee dialing profile. If the intercept criteria are met, block 651 directs the RC processor circuit 200 to append the contents of the lawful intercept fields 702, 704, 706, 708, 710 associated with the callee dialing profile to the routing message shown in FIG. 32A to produce a routing message. If at block 649 of FIG. 8C, it is determined there are no lawful intercept fields associated with the callee dialing profile or that the intercept criteria are not met, no lawful intercept fields associated with the callee are appended to the routing message shown in FIG. 32 or 32A. Referring back to FIG. 8C, block 646 then directs the RC processor circuit 200 to send the routing message to the call controller 14.

Response to Routing Message

Figure 33:
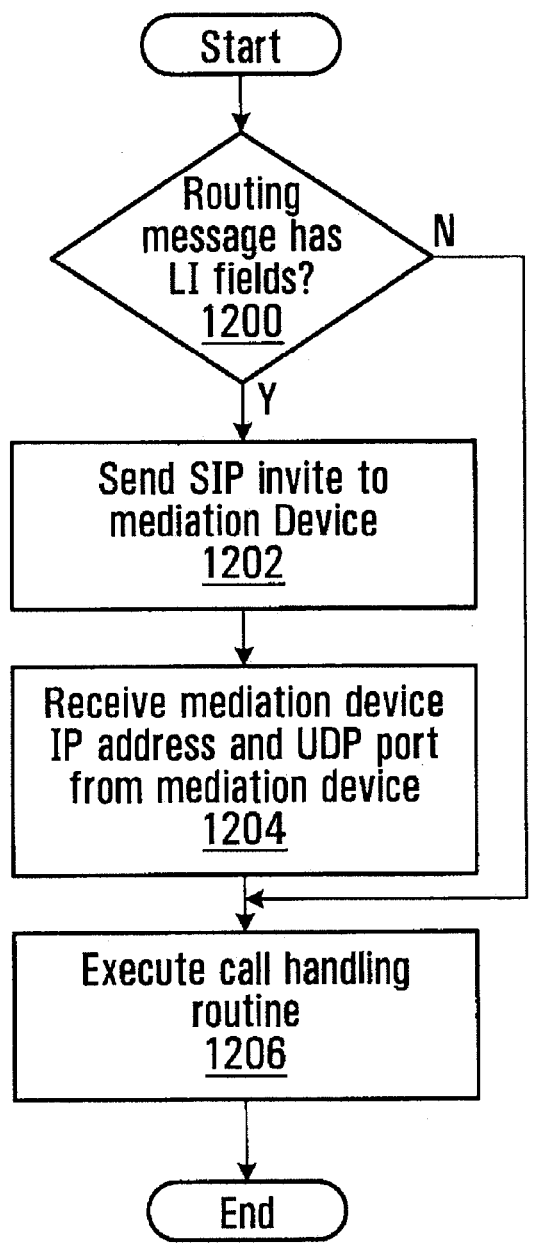
FIG. 33 is a flowchart of a routing message handler process executed by the call controller.

Referring back to FIG. 1, the routing message, whether of the type shown in FIG. 16, 16A, 25, 25A, 32, 32A or 32B, is received at the call controller 14. Referring to FIG. 33, when a routing message is received at the call controller, the routing message handler 122 is invoked at the call controller. The routing message handler is shown in detail in FIG. 33.

Figure 34:
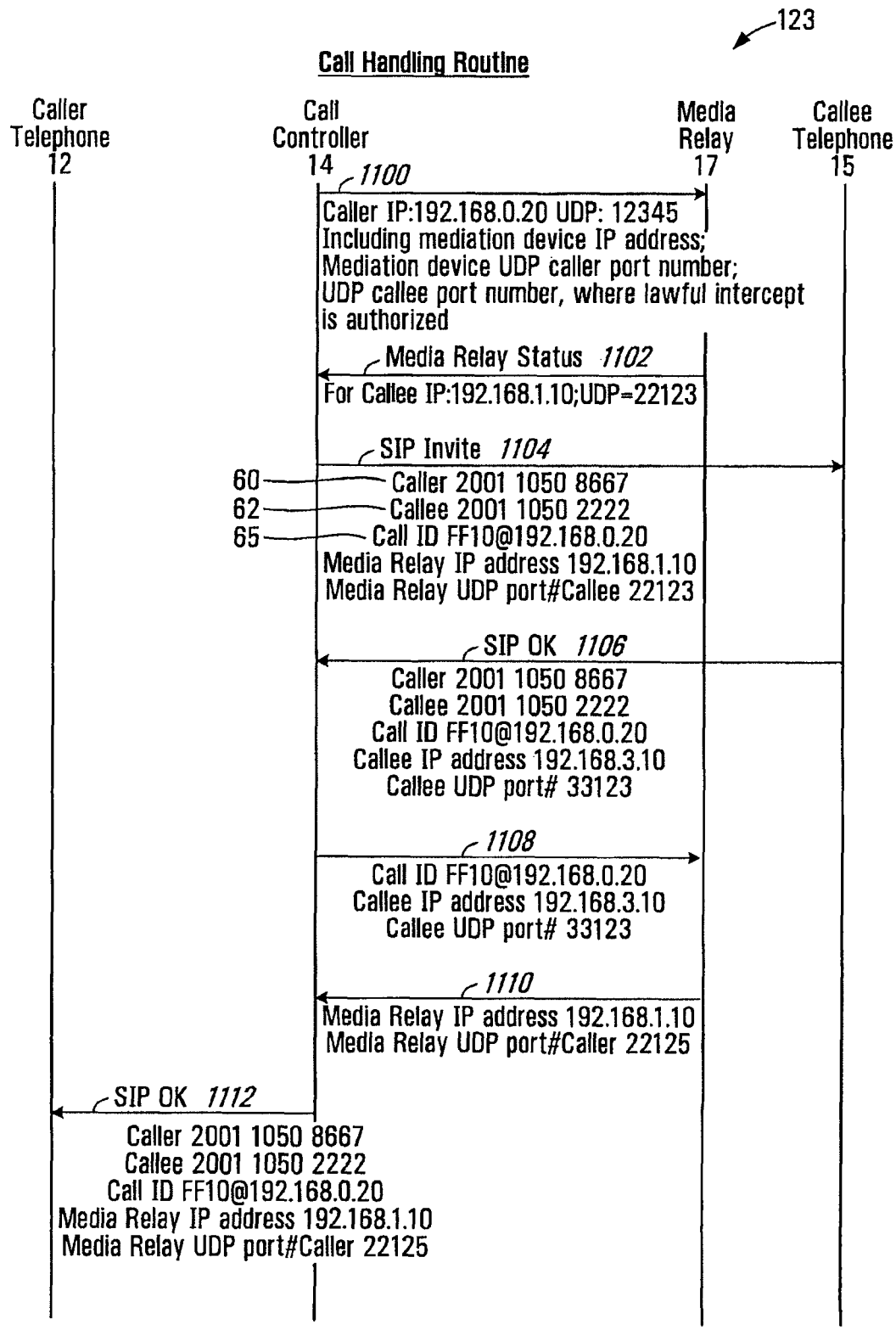
FIG. 34 is a schematic representation of messages exchanged during execution of process for establishing audio paths between telephones and a media relay.

Referring to FIG. 33, the routing message handler begins with a first block 1200 that directs the processor circuit to determine whether the routing message includes lawful intercept fields. If not, the processor is directed to block 1206 which causes it to invoke a call handling routine shown in FIG. 34. Referring to FIG. 34, as a first step in the call handling routine, a message 1100 is sent from the call controller 14 to the media relay 17, the message including the caller telephone IP address and UDP port as determined from the caller IP address field 67 and caller UDP port field 69 in the SIP Invite message shown in FIG. 3.

The specific media relay 17 to which the message 1100 is sent may be selected from a pool of available media relays and such media relays may be at any geographical location. The purpose of the message 1100 is to advise the media relay that a call is desired to be set up to communicate with the IP address and UDP number of the caller telephone.

A media relay selected from media relays located at a geographical location that facilitates communication at a desired quality of service between the media relay 17 and the caller telephone 12 and callee telephone 15 may provide the best service. Alternatively, media relays may be pre-assigned or pre-associated with users by including and populating media relay fields of the dialing profiles of users, such as shown at 1150 in FIG. 9, identifying one or more media relays through which calls associated with the associated user are to be directed. In this case, the identifications of possible media relays obtained from the media relay fields 1150 may be sent to the call controller in additional fields in the routing message. These media relay fields are shown at 1152 in FIGS. 16, 16A, 25, 25A, 32, 32A and 32B. In essence, the media relay through which communications involving the communications involving the subscriber will be conducted is identified in response to the routing message.

Referring back to FIG. 34, in this case, the message 1100 may be sent in a polling fashion to all media relays identified by the media relay fields 1150, until one responds. Alternatively, the message 1100 may be sent simultaneously to all of the media relays.

In response, in the case where the media relay is known or is involved in polling as described above, the media relay 17 to which the message 1100 is sent sends a media relay status message 1102 back to the call controller 14, the message including a media relay IP address and UDP port number at which the media relay will establish a UDP connection to the callee telephone 15. Audio data to/from the callee telephone 15 will be transmitted over this connection. In the case where the message 1100 is sent to a plurality of media relays, the first one to respond with a media relay status message is the one through which the call will be carried. Media relay status messages from the remaining media relays can be ignored.

After the media relay status message 1102 is received at the call controller, the call controller 14 then sends a SIP Invite message 1104 of the type shown in FIG. 3 to the callee telephone 15, including the contents of the caller and callee identifier fields (60 and 62), the call identifier field (65) and the media relay IP address and the media relay UDP port number assigned to the audio path connection with the callee telephone 15, to invite the callee telephone to establish a connection with the media relay 17.

The purpose of the SIP Invite message 1104 is to advise the callee telephone of the caller and call ID and of the IP address and UDP port number of the media relay through which the callee telephone should send and receive audio data.

The callee telephone 15 stores the media relay IP address and assigned UDP port number in the audio path IP address buffer 47 shown in FIG. 2 and configures itself to create a socket between the media relay IP/UDP address and the callee telephone IP address and a UDP port number that the callee telephone 15 desires to use as an audio path to the caller telephone. Instead of being sent or received directly to or from the caller telephone, the callee telephone 15 will send and receive audio data from the media relay. To indicate this, the callee telephone 15 sends a SIP OK message 1106 back to the call controller 14, the message including the callee IP address and UDP port number from its IP address field (53 in FIG. 3) at which the callee telephone 15 will establish an audio path connection with the media relay 17. The purpose of this SIP OK message 1106 is to advise the call controller of the IP address and UDP port number through which the media relay should send and receive audio data to and from the callee telephone.

The call controller 14 then sends a message 1108 to the media relay 17 including the IP address and UDP port number that the callee telephone 15 will use for the audio path connection with the media relay. The purpose of the message 1108 is to advise the media relay of the IP address and UDP port number through which it should send and receive audio data to and from the callee telephone.

The media relay 17 then determines a UDP port through which it will carry audio data to and from the caller telephone 12 and sends a message 1110 to the call controller (14), the message including the media relay IP address and the media relay UDP port number the media relay will use to carry audio to and from the caller telephone 12. The purpose of this message 1110 is to advise the call controller 14 of the IP address and UDP port number through which it expects to transfer audio data to and from the caller telephone.

The call controller 14 then sends a SIP OK message 1112 to the caller telephone 12 to indicate that the call may now proceed. The SIP OK message includes the caller and callee usernames, the call ID and the media relay 17 IP address and the UDP port number assigned to the audio connection with the caller telephone 12. The purpose of this SIP OK message 1112 is to advise the caller telephone 12 of the IP address and UDP port number through which it should exchange audio data with the media relay 17.

If the routing message is of the type shown in FIG. 25 where there are a plurality of suppliers available, the call handling routine proceeds as described above with the exception that instead of communicating with the callee telephone directly, the call controller 14 communicates with a gateway provided by a supplier. If a SIP OK message is not received back from the first gateway, the processor is directed to send the SIP Invite message 1104 to a gateway of the next indicated supplier. For example, the call controller 14 sends the SIP Invite message 1104 to the first supplier, in this case Telus, to determine whether or not Telus is able to handle the call. If Telus does not send back a SIP OK message 1106 within a specified time or sends a message indicating that it is not able to handle the call, the call controller proceeds to send a SIP Invite message 1104 to the next supplier, in this case Shaw. The process is repeated until one of the suppliers responds with a SIP OK message 1'06 indicating that it is available to carry the call and the process proceeds as shown in connection with messages 1108, 1110 and 1112. For example, the supplier "Telus" sends back a SIP OK message and thus provides a gateway to the PSTN at IP address 72.64.39.58 as provided by the routing message from the contents of the route identifier field 546 of the corresponding supplier record shown in FIG. 22.

Referring back to FIG. 1, if the call controller 14 receives a message of the type shown in FIG. 32, i.e., a type that has one call forwarding number and/or a voicemail number, the call controller attempts to establish a call (using SIP Invite message 1104) to the callee telephone 15 and if no call is established (i.e., message 1106 is not received) within a predetermined time, the call controller 14 attempts to establish a call with the next user identified in the call routing message, by sending a SIP invite message like message 1104 to the next user. This process is repeated until all call forwarding possibilities have been exhausted, in which case an audio path is established with the voicemail server 19 identified in the routing message. The voicemail server 19 sends the SIP OK message 1106 in response to receipt of the SIP invite message 1104 and functions as described above in connection with the callee telephone 15 to permit an outgoing audio message provided by the voicemail server to be heard by the caller and to permit the caller to record an audio message on the voicemail server.

When audio paths are established, a call timer (not shown) maintained by the call controller logs the start date and time of the call and logs the call ID and adds an active call record of the type shown in FIG. 35 to an active call list, maintained by the call controller.

In this embodiment, the call controller active call record shown in FIG. 35 includes a call ID field 1300, a caller IP address field 1302, a caller port field 1304, a callee IP address field 1306, a callee port field 1308, a media relay ID field 1310, a media relay caller port field 1312 and a media relay callee port field 1314. The contents of the call ID field 1300 are established at block 136 in FIG. 5. The contents of the caller IP address field 1302 are established from the contents of the caller IP address field 67 of the SIP invite message shown in FIG. 3. The contents of the caller port field 1304 are established from the caller UDP port field 69 of the SIP invite message shown in FIG. 3. The contents of the callee IP address field 1306 and callee port field 1308 are established from the SIP OK message 1106 shown in FIG. 34.

The media relay ID field 1310 is populated with an identification of the media relay handling the call. In the example shown, the media relay is number 42. The contents of the media relay caller port field are obtained from the message 1110 shown in FIG. 34 and the contents in the media relay callee port field 1314 are obtained from the media relay status message 1102 shown in FIG. 34. Each time a call is established, an active call record of the type shown in FIG. 35 is added to an active call log maintained by the call controller.

The routing controller also maintains an active call log containing active call records however the active call records maintained by the routing controller are different from the active call records held by the call controller. For example, referring to FIG. 36, an active call record held by the routing controller includes a call ID field 1316, a caller field 1318, a callee field 1320 and a call controller ID field 1322. Information for populating these fields may be received in a message (not shown) transmitted from the call controller to the routing controller after an active call record has been entered into the active call log of the call controller.

The message from the call controller 14 to the routing controller 16, indicating that an active call has been established may include the contents of the call ID field 1300 shown in FIG. 35 and a call controller unique ID number held by the call controller. The routing controller 16 matches the call ID with the caller and callee user names contained in the original call routing message (FIG. 16, 16A, 25, 25A, 32, 32A, 32B) that caused the call controller 14 to route the call, to populate the caller and callee fields 1318 and 1320 shown in FIG. 36, respectively. It will be appreciated that a plurality of call controllers may be associated with a single routing controller, in which case the call controller ID allows the routing controller to uniquely identify the call controller associated with the call ID indicated by the contents of the call ID field 1316. In the example shown, the call controller is number 61.

The active call records facilitate intercepting a call already in progress, as will be described below.

Referring back to FIG. 33, if at block 1200 it is determined that the routing message has lawful intercept fields, block 1202 directs the call controller circuit 100 (FIG. 4) to send a SIP Invite message as shown in FIG. 37 to a mediation device identified by the mediation device IP address in the routing message as obtained from the user dialing profile MD1 address field 704 as shown at 256 in FIG. 9. Referring to FIG. 37, the SIP Invite message includes caller and callee identifier fields 1020, 1022, a call ID field 1024, a warrant ID field 1026 and other intercept related information fields 1028, if desired. The caller, callee and call ID field contents 1020, 1022, and 1024 are obtained from the original SIP Invite message shown in FIG. 6. The contents of the warrant ID field 1026 and intercept related info fields 1028 are obtained from the routing message which would be of the type shown in FIG. 16A, 25A, 32A or 32B.

Referring back to FIG. 33, block 1204 then directs the call controller 14 to receive a reply message, as shown in FIG. 38, from the mediation device 31. The reply message is a SIP OK message that includes caller, callee, and call ID fields 1040, 1042, 1044 as described above and further includes a mediation device IP address field 1046 and a mediation device UDP caller port number field 1048 and a UDP callee port number field 1050 identifying UDP ports at the mediation device IP address to which the media relay is to send copies of audio data streams received from the caller and callee telephones respectively. Block 1206 then directs the call controller to execute the call handling routine shown in FIG. 34 with the exception that the message 1100 additionally includes the contents of the mediation device IP address field 1046, the mediation device UDP caller port number field 1048 and the UDP callee port number field 1050 of the SIP OK message shown in FIG. 38.

All other messages are the same as described above in connection with the call handling routine as shown in FIG. 34, but in response to receiving the additional information in the message 1100, the media relay automatically configures itself to provide for copying the audio data received from both the caller telephone and the callee telephone to the mediation device IP address and the UDP caller port number and the UDP callee port number respectively.

Referring back to FIG. 1, as audio data originating at the caller telephone 12 and callee telephone 15 passes through the media relay 17, this data is copied to the mediation device UDP port for the caller and the mediation device UDP port for the callee, as indicated by the SIP invite message 1100. This enables law enforcement agencies to monitor audio communications between the caller and callee and/or to record such communications at the mediation device.

Thus, when the determination information in the dialing profile meets intercept criteria, the call controller communicates with the media relay through which communications involving the subscriber whose communications are to be monitored will be handled to cause the media relay to send a copy of such communications to a mediation device specified by the destination information included in the intercept information associated with the dialing profile associated with the subscriber whose communications are to be monitored.

Terminating the Call

In the event that either the caller or the callee terminates a call, the telephone of the terminating party sends a SIP Bye message to the call controller 14. An exemplary SIP Bye message is shown at 900 in FIG. 39 and includes a caller field 902, a callee field 904 and a call ID field 906. The caller field 902 holds the caller username, the callee field 904 holds a PSTN compatible number or username, and the call ID field 906 holds a unique call identifier field of the type shown in the call identifier field 65 of the SIP Invite message shown in FIG. 3.

Thus, for example, referring to FIG. 40, a SIP Bye message for the Calgary callee is shown generally at 908 and the caller field 902 holds a username identifying the Vancouver caller, in this case 2001 1050 8667, the callee field 904 holds a username identifying the Calgary callee, in this case 2001 1050 2222, and the call ID field 906 holds the code FA10@192.168.0.20, which is the call ID for the call.

Figure 41:
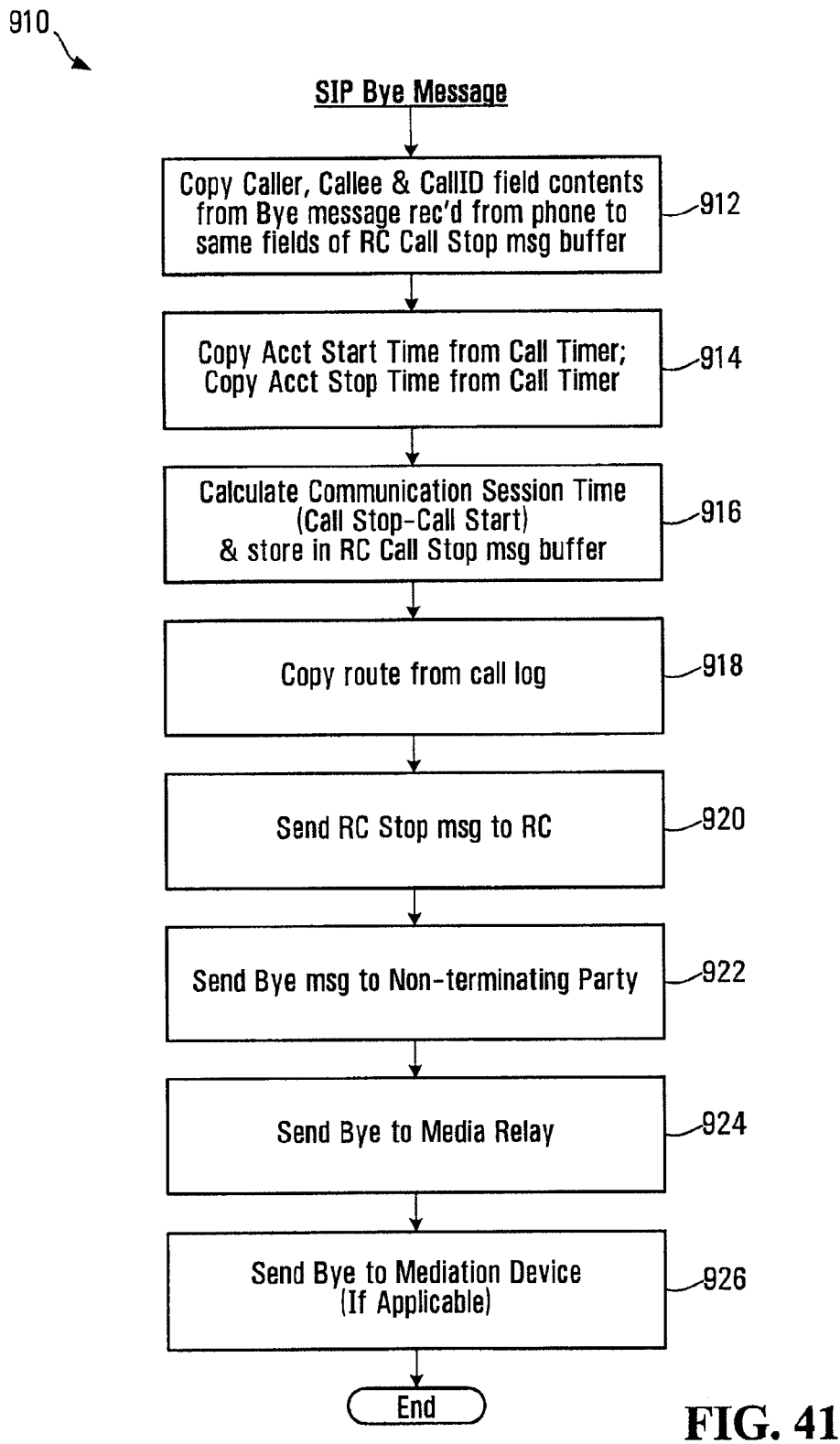
FIG. 41 is a flowchart of a process executed by the call controller for producing a RC stop message in response to receipt of a SIP Bye message.

The SIP Bye message shown in FIG. 40 is received at the call controller 14 and the call controller executes a process as shown generally at 910 in FIG. 41. The process includes a first block 912 that directs the call controller circuit (100) to copy the caller, callee and call ID field contents from the SIP Bye message 900 shown in FIG. 39 received from the terminating party to corresponding fields of an RC stop message buffer (not shown). Block 914 then directs the call controller circuit 100 to copy the call start time from the call timer and to obtain a Call Stop time from the call timer. Block 916 then directs the call controller to calculate a communication session time by determining the difference in time between the call start time and the Call Stop time. This communication session time is then stored in a corresponding field of the RC Call Stop message buffer. Block 918 then directs the call controller circuit 100 to populate the route field with the IP address of the gateway supplier, if any. An RC Call Stop message produced as described above is shown generally at 1000 in FIG. 42. An RC Call Stop message specifically associated with the call made to the Calgary callee is shown generally at 1021 in FIG. 43.

Referring to FIG. 42, the RC call stop message 1000 includes a caller field 1002, callee field 1004, a call ID field 1006, an account start time field 1008, an account stop time field 1010, a communication session time field 1012 and a route field 1014. The caller field 1002 holds a username, the callee field 1004 holds a PSTN-compatible number or system number, the call ID field 1006 holds the unique call identifier received from the SIP Invite message shown in FIG. 3, the account start time field 1008 holds the date and start time of the call, the account stop time field 1010 holds the date and time the call ended, the communication session time field 1012 holds a value representing the difference between the start time and the stop time, in seconds, and the route field 1014 holds the IP address for a gateway, if a gateway is used to establish the call.

Referring to FIG. 43, an exemplary RC call stop message for the Calgary callee is shown generally at 1021. In this example the caller field 1002 holds the username 2001 1050 8667 identifying the Vancouver caller and the callee field 1004 holds the username 2001 1050 2222 identifying the Calgary callee. The contents of the call ID field 1006 are FA10@192.168.0.20. The contents of the account start time field 1008 are 2006-12-30 12:12:12 and the contents of the account stop time field 1010 are 2006-12-30 12:12:14. The contents of the communication session time field 1012 are 2 to indicate 2 seconds call duration and the contents of the route field are blank but would be 72.64.39.58 if the "Telus" gateway were used, for example.

Referring back to FIG. 41, after having produced an RC Call Stop message, block 920 directs the call controller circuit 100 to send the RC stop message contained in the RC Call Stop message buffer to the routing controller (16).

The RC (16) receives the Call Stop message and a routing controller Call Stop message process (not shown) is invoked at the routing controller to deal with charges and billing for the call.

Block 922 directs the call controller circuit 100 to send a Bye message to the party that did not terminate the call i.e. to the non-terminating party.

Block 924 then directs the call controller circuit 100 to send a SIP Bye message of the type shown in FIG. 39 to the media relay 17 to cause the media relay to disconnect the audio path sockets associated with the caller telephone IP/UDP address and the callee telephone IP/UDP address. In disconnecting these communication sockets, the media relay 17 deletes associations between the caller telephone IP/UDP address media relay caller IP/UDP address and between the caller telephone IP/UDP address and media relay callee IP/UDP address.

If the media relay (17) was configured for lawful intercept, block 926 of FIG. 41 then directs the call controller circuit 100 to send a SIP Bye message of the type shown in FIG. 39 to the mediation device 31 to inform the mediation device that the call has ended and to disconnect communication sockets between the media relay caller and callee IP/UDP port addresses and the IP/UDP port address to which the audio data received at the caller and callee IP/UDP port addresses were being copied.

It will be appreciated that in the foregoing description, the components described cooperate to detect a requirement for intercept at the time a call is set up. In the following description an explanation is provided to describe how to intercept a call while the call is in progress.

Intercepting a Call in Progress

Referring back to FIG. 1, to intercept a call while the call is in progress, the law enforcement authority 293 may communicate with a mediation device, or may communicate with the call controller or may communicate with the routing controller or may communicate with a handover interface that communicates with any of the foregoing components to cause the routing controller to receive a law enforcement authority (LEA) intercept request message including intercept information, such as that which would be associated with fields 702-710 in FIG. 9, for example.

Figure 44:
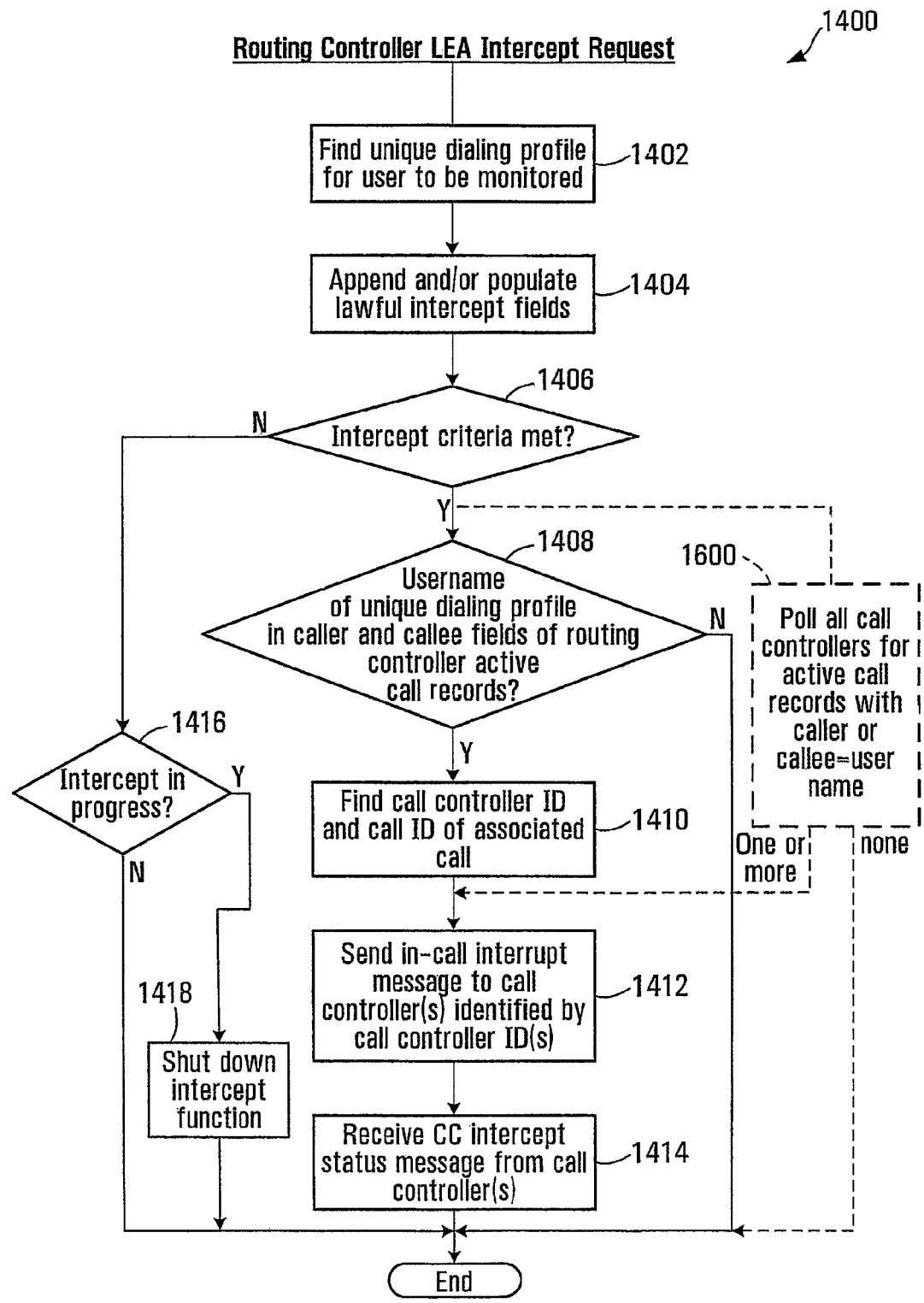
FIG. 44 is a flowchart of a routing controller Law Enforcement Authority request message handler executed by the routing controller shown in FIG. 1.

In response to receipt of a LEA intercept request message, the routing controller LEA request message handler shown at 1400 in FIG. 44 is invoked.

The LEA request message handler 1400 begins with a first block 1402 that directs the routing controller processor circuit to communicate with the database 18 in which dialing profile records of the type shown in FIG. 9 are stored to find a dialing profile associated with the user whose calls are to be monitored.

If the username is not known, but a DID number (i.e. a PSTN number) is known, the routing controller may cause a search through the DID bank table records of the type shown in FIG. 13, for example to find a username associated with a DID number. If the username is not known but a name and address is known, other records such as billing records (not shown) associating names and addresses with usernames may be searched to find a username associated with a given name and/or address of a person whose calls are to be intercepted. Regardless of the information available, to facilitate call interception any way of finding the unique dialing profile associated with the user whose calls are to be intercepted is a first step to facilitating call interception, in this embodiment.

Once the dialing profile is located, block 1404 directs the routing controller processor circuit to associate the intercept information with the dialing profile by appending and/or populating the lawful intercept fields of the dialing profile with such information as provided in the LEA intercept request message.

Block 1406 then directs the routing controller processor circuit to determine whether the intercept criteria are met by the intercept information now included in the dialing profile. This is done by determining whether the LI flag (702) is on, and the current date and time is within the LI start stop date/time ranges. If the intercept criteria are not met, the process is ended. Otherwise the processor is directed to block 1408.

Block 1408 directs the routing controller processor circuit to use the username of the dialing profile found at block 1402 to search caller and callee fields of routing controller active call records shown in FIG. 36 that have contents matching the username associated with the dialing profile. If no such record is found, the user is not currently engaged in a call and the process is ended. If the user is engaged in a call, the routing controller active call record will be found. Block 1410 then directs the routing controller processor circuit to find the call controller id and call id of the associated call, from the routing controller active call record shown in FIG. 36.

Block 1412 then directs the routing controller processor circuit to transmit an in-call intercept message to the call controller identified by the contents of the call controller id field 1322 of the routing controller active call record. The in-call intercept message includes the call id as determined from the routing controller active call record and the IP address of the mediation device associated with the law enforcement authority interested in intercepting the call. The IP address of the mediation device may be obtained from the law enforcement authority request message, or the dialing profile, for example.

Block 1414 then directs the routing controller processor circuit to wait a specified time to receive a call controller intercept status message back from the call controller indicating whether or not the intercept function has been activated.

Figure 45:
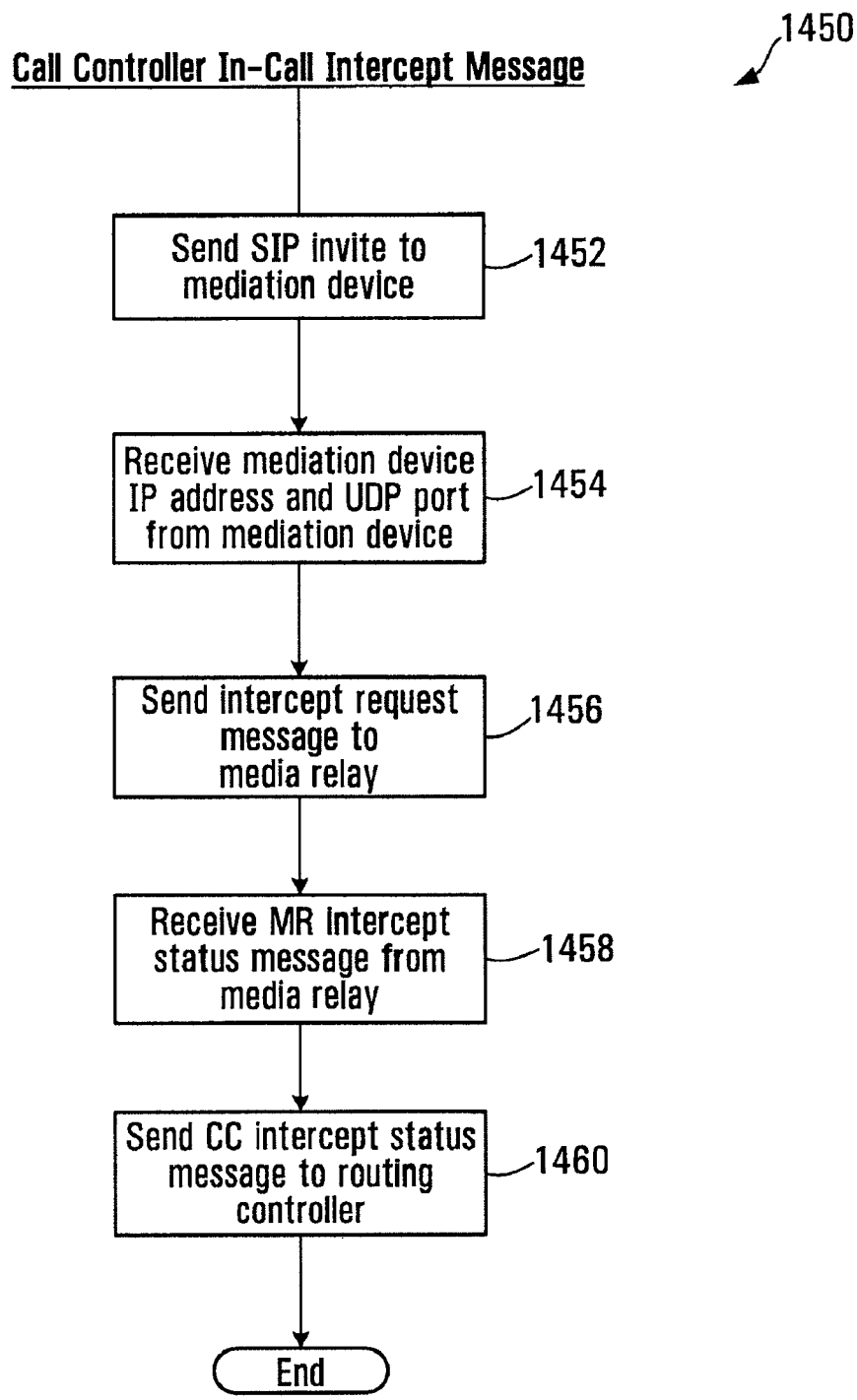
FIG. 45 is a flowchart of a call controller in-call intercept message handler executed by the call controller shown in FIG. 1.

Referring to FIG. 45, upon receipt of an in-call intercept message at the call controller (14) the call controller executes an in-call intercept message handler shown generally at 1450. The in-call intercept message handler 1450 begins with a first block 1452 that directs the call controller processor circuit to send a SIP invite message to the mediation device associated with the IP address of the mediation device, received in the in-call intercept message.

Block 1454 then directs the call controller processor circuit to receive an IP address and callee and caller UDP port numbers from the mediation device, where this IP address and UDP port numbers are network locations at which the mediation device will expect to receive audio data streams from the media relay through which the call is carried.

Block 1456 then directs the call controller processor circuit to identify a media relay through which communications to be monitored are being conducted by using the username of the subscriber whose communications are to be monitored to locate an active call record in the call controller active call list to locate a media relay identifier such as the IP address of the media relay indicated by the contents of the media relay ID field 1310 of the call controller active call record shown in FIG. 35. The call controller processor circuit is then directed to send an intercept request message to the media relay (17) that is handling the call. The intercept request message includes the mediation device IP address and caller and callee UDP port numbers to identify to the media relay (17) the mediation device IP address and UDP port number(s) at which it expects to receive a copy of the audio data stream from the caller and callee respectively.

In response, the media relay establishes internal connections between the caller and callee IP addresses and UDP ports and callee IP address and UDP port of the mediation device. Then, the media relay sends a media relay status message back to the call controller indicating whether or not internal connections have been established and that call intercept has been initiated.

As seen at block 1458, the call controller processor circuit is directed to receive the media relay status message and block 1460 directs the call controller processor circuit to send a call controller intercept status message back to the routing controller to indicate that the call intercept function has been established. The routing controller may communicate this status back to the law enforcement authority that issued the law enforcement authority request message. In the meantime, communications involving the caller or callee whose communications are to be monitored, which travel through the media relay, are copied and sent to the mediation device.

Thus, after associating intercept information with the dialing profile of the subscriber whose communications are to be monitored, when the determination information included in the intercept information meets intercept criteria, the call controller communicates with the media relay through which the communications of the subscriber whose communications are to be monitored to cause such media relay to send a copy of such communications to a mediation device specified by the destination information included in the intercept information.

When the call is ended, the call is shut down in the same way as described above.

Should the law enforcement authority desire to cease interception of the call during the call, an LEA request message requesting that the intercept function be stopped is sent to the routing controller from the law enforcement authority through any of the paths described above. This invokes the LEA request message handler such as shown in FIG. 44 which causes the routing controller processor circuit to execute blocks 1402, 1404. At block 1404, the routing controller processor circuit is directed to change the contents of the lawful intercept fields to at least set the lawful intercept flag (702 in FIG. 9) inactive.

Then, at block 1406, the intercept criteria are not met and the processor is directed to block 1416, which causes the routing controller processor circuit to determine whether or not an interception function is in progress. This can be determined, for example, by maintaining evidence of the receipt of the confirmation message from the call controller, received at block 1414 of the LEA request message handler 1400.

If an intercept is not in progress, the LEA request message handler 1400 is ended.

Figure 46:
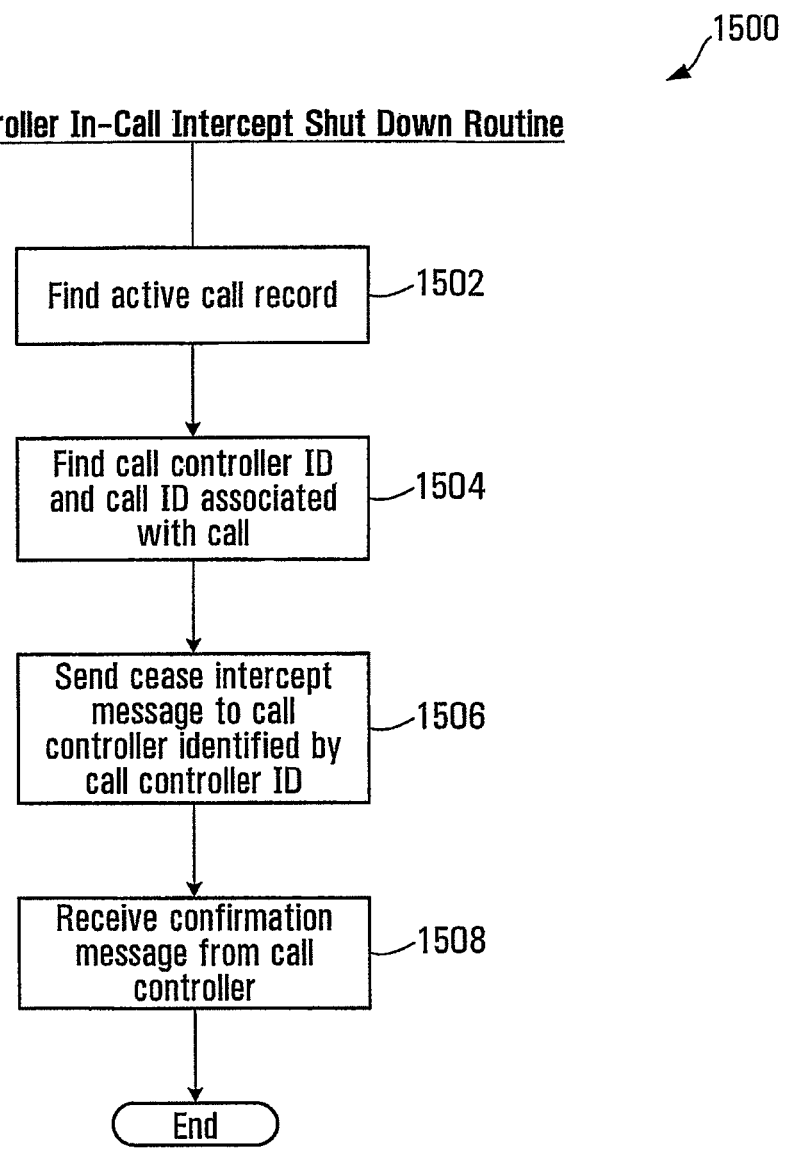
FIG. 46 is a flowchart of a routing controller in-call intercept shut down routine executed by the routing controller shown in FIG. 1.

If an intercept if in progress, block 1418 directs the routing controller processor circuit to execute an in-call intercept shut down routine as shown at 1500 in FIG. 46. The in-call intercept shut down routine begins with a first block 1502 which directs the routing controller processor circuit to locate the routing controller active call record having caller or callee field contents equal to the username indicated in the dialing profile found at bock 1402 of the LEA request message handler 1400 shown in FIG. 44. Having found the active call record, block 1504 directs the routing controller processor circuit to find, in the routing controller active call record shown in FIG. 36, the call controller id (1322) and the call id (1316) associated with the call. Block 1506 then directs the routing controller processor circuit to send a cease intercept message (not shown) to the call controller identified by the call controller id determined at block 1504. This cease intercept message includes the call id determined at block 1504 and an identification of the mediation device, the identification being obtained from the MD1 address field (704 in FIG. 9) of the dialing profile for the user whose calls are currently being intercepted. Block 1508 then directs the routing controller processor circuit to wait a specified time to receive a confirmation message from the call controller to indicate that the intercept function has been shut down.

Figure 47:
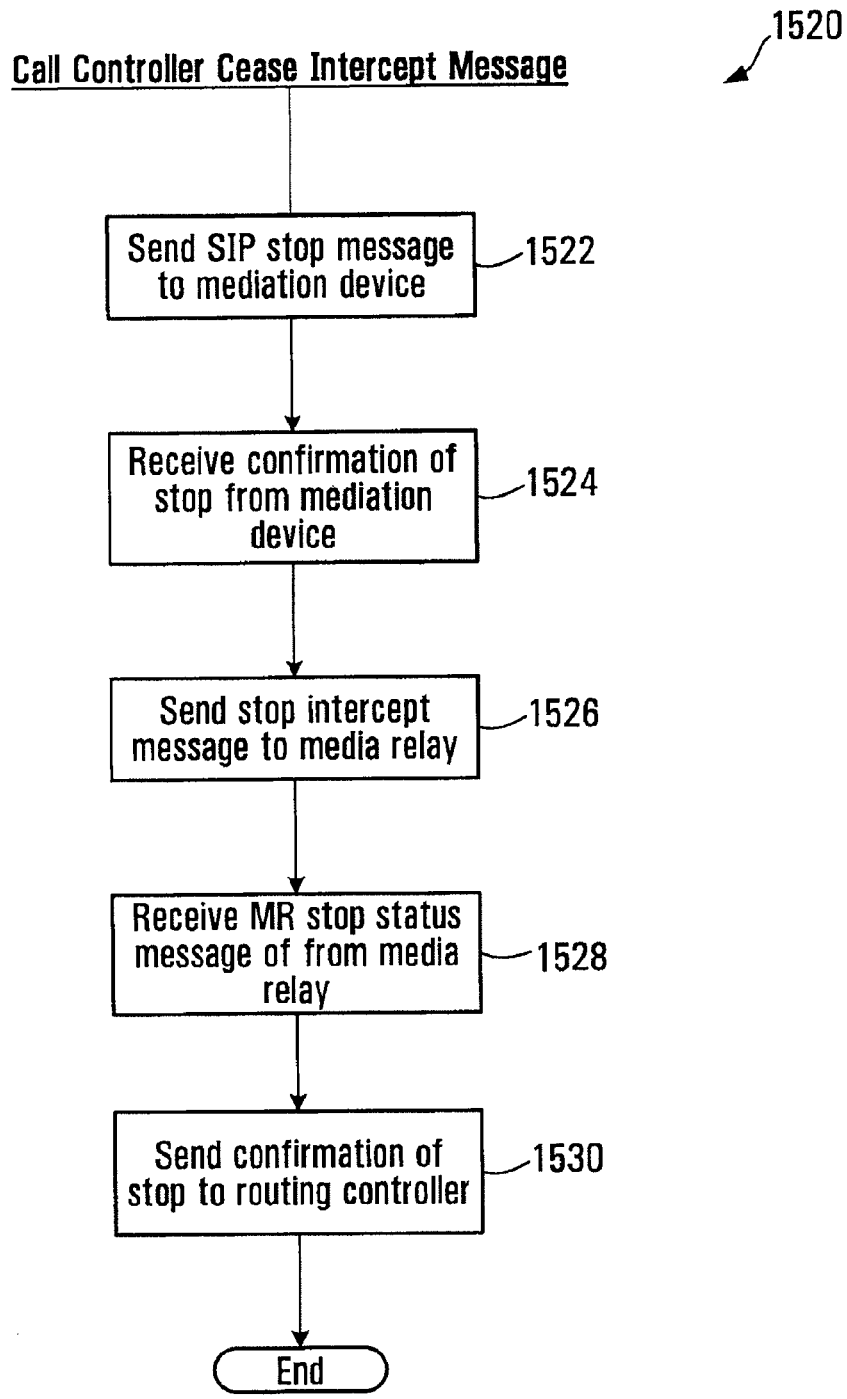
FIG. 47 is a flowchart of a call controller cease intercept message handler routing executed by the call controller shown in FIG. 1.

Referring to FIG. 47, upon receipt of the cease intercept message at the call controller (14), a cease intercept message handler 1520 is invoked at the call controller. The cease intercept message handler 1520 begins with a first block 1522 that directs the call controller processor circuit to send a SIP stop message to the mediation device identified in the cease intercept message received from the routing controller. In response to the SIP stop message, the mediation device stops receiving audio data and sends a confirmation message back to the call controller.

Block 1524 directs the call controller processor circuit to receive the confirmation message back from the mediation device.

Block 1526 then directs the call controller processor circuit to send a stop intercept message to the media relay 17 identified by the contents of the media relay ID field 1310 of the active call record shown in FIG. 35. The stop intercept message includes the contents of the media relay caller port ID field 1312 and media relay callee port field 1314 included in the active call record and identifies to the media relay which ports to shut down. In response to the stop intercept message, the media relay 17 disconnects the connections between the media relay caller port and the mediation device port that was receiving the audio data from the caller and the connection between the media relay callee port and the mediation device port that was receiving audio data from the callee. The media relay then sends an MR stop status message to the call controller.

Block 1528 directs the call controller processor circuit to receive the MR stop status message and block 1530 directs the call controller to send a stop status message to the routing controller 16.

In an alternative embodiment, the routing controller does not maintain active call records but each call controller does. In such an embodiment, blocks 1408 and 1410 of FIG. 44 are replaced with a single block 1600 that directs the routing controller processor circuit to poll each call controller to determine whether or not its active call list contains an entry having caller or callee field contents equal to the username determined from the dialing profile located at block 1402.

If any of the polled call controllers has such a record, that call controller transmits a response message back to the routing controller, the response message including a call controller ID identifying that call controller. More than one call controller may have an active call record having caller or callee field contents equal to the username determined from the user profile. Such would be the case in a conference call, for example.

The routing controller processor circuit then executes blocks 1412 and 1414 as described above or the process is ended if none of the polled call controllers contains a call record with caller and callee field contents matching the username determined from the dialing profile located at block 1402.

In effect therefore, block 1600 provides an alternate way of finding call controllers that are currently carrying a call associated with the user of interest.

In another embodiment, an interface to the routing controller and/or the call controller may be provided to enable law enforcement authorities to have direct access or a copy of the active call list maintained by the call controller and/or routing controller.

From the foregoing, it will be appreciated that indications of whether or not communications of a subscriber to the system are to be monitored are provided by law enforcement agencies directly into a subscriber dialing profile shown in FIG. 9. This dialing profile is used to route a call involving the subscriber and is checked for lawful intercept requirements to determine whether or not the media relay should copy audio data associated with the call to a mediation device for lawful monitoring and/or recording purposes.

While the system has been described in connection with the monitoring of audio streams, it may similarly be used for monitoring any other data streams such as pure data and/or video or multimedia data, for example, between subscribers to the system or between a subscriber and a non-subscriber to the system.

While specific embodiments of the invention have been described and illustrated, such embodiments should be considered illustrative of the invention only and not as limiting the invention as construed in accordance with the accompanying claims.

What is claimed is:

1. A method for causing Internet Protocol (IP) communications to be intercepted in an IP network system in which IP communications between a subscriber of the system and another party occur through a media relay to which the subscriber and the another party address their IP communications destined for each other and which relays the IP communications between the subscriber and the another party, the method comprising:
   causing a call controller to receive a request from the subscriber seeking to initiate communications between the subscriber and the another party and to produce a request to establish an IP communications channel between the subscriber and the another party; and
   causing a call routing controller to:
      receive from the call controller said request to establish said IP communications channel;
      access a database in response to receiving said request from said call controller, to locate a dialing profile associated with the subscriber, said dialing profile comprising intercept determination information and destination information, said intercept determination information indicating whether an IP communication from the subscriber should be monitored and said destination information indicating where to send monitored communications; and
      produce a routing message for receipt by the call controller and separate from any IP communication sent between the subscriber and the another party, for providing routing information for routing the IP communications through the media relay to enable the call controller to establish said IP communications channel through the media relay in response to the routing message; and
      when said determination information meets intercept criteria, cause said routing message to include at least some of said intercept determination information and said destination information.

2. The method of claim 1 wherein said IP communications include at least one of audio data, pure data, video data, multimedia data, text messaging data and instant messaging data.

3. The method of claim 2 further comprising causing said call controller to communicate with the media relay to cause the media relay to:
   establish a communication path for relaying IP communications between the subscriber and the another party; and
   when said intercept determination information and said destination information are included in said routing message, produce a copy of said IP communications between the subscriber and the another party, while the media relay relays communications between the subscriber and the another party; and send said copy to a mediation device identified by said destination information in said routing message.

4. The method of claim 2 further comprising associating said determination information and said destination information with said dialing profile when communications involving said subscriber are not in progress.

5. The method of claim 2 further comprising associating said determination information and said destination information with said dialing profile when communications involving said subscriber are in progress.

6. The method of claim 4 wherein associating said determination information and said destination information comprises populating intercept information fields in said dialing profile of a subscriber whose communications are to be monitored.

7. The method of claim 5 wherein associating said determination information and said destination information comprises populating intercept information fields in said dialing profile of a subscriber whose communications are to be monitored.

8. The method of claim 7 wherein determining whether said determination information meets said intercept criteria comprises determining whether a current date and time is within a range specified by said determination information.

9. The method of claim 8 wherein producing said routing message comprises identifying a media relay through which communications involving said subscriber will be conducted and including an identification of said media relay in said routing message.

10. The method of claim 9 further comprising pre-associating at least one media relay with said dialing profile associated with the subscriber whose communications are to be monitored and wherein identifying said media relay comprises identifying said at least one media relay pre-associated with said subscriber whose communications are to be monitored.

11. The method of claim 10 wherein pre-associating comprises populating media relay fields in said dialing profile with an identification of said at least one media relay.

12. The method of claim 5 wherein associating said determination information and said destination information comprises associating said determination information and said destination information with said dialing profile of the subscriber whose communications are to be monitored, in response to receipt of an intercept request message, wherein said intercept request message comprises said determination information and said destination information.

13. The method of claim 12 further comprising invoking an intercept request message handler to:

a) find a dialing profile associated with the subscriber whose communications are to be monitored;

b) associate said determination information and said destination information with said dialing profile; and c) identify a media relay through which said communications are being conducted.

14. The method of claim 13 wherein said dialing profile includes a username identifier and further comprising maintaining active call records for communications in progress, said active call records comprising a username identifier and a media relay identifier identifying the media relay through which said communications are being conducted and wherein identifying a media relay through which said communications are being conducted comprises locating an active call record associated with a channel used by the subscriber whose communications are to be monitored to identify the media relay associated with said channel.

15. The method of claim 14 further comprising maintaining direct-inward-dial (DID) records associating Public Switched Telephone Network (PSTN) telephone numbers with usernames of users subscribing to said IP network, and wherein finding a dialing profile associated with the subscriber whose communications are to be monitored comprises finding a username in a DID record bearing a PSTN number associated with the subscriber whose communications are to be monitored and using said username to locate a dialing profile associated with said username.

16. The method of claim 3 further comprising causing the call controller to receive communications from the mediation device to cause the call controller to interact with the call routing controller to access a dialing profile of a subscriber whose communications are to be monitored and to enter said intercept determination information and destination information into said dialing profile.

17. A system for causing Internet Protocol (IP) communications to be intercepted in an IP network in which IP communications between a subscriber of said system and another party occur through a media relay to which the subscriber and the another party address their IP communications destined for each other and which relays said IP communications between the subscriber and the another party, the system comprising:

a call controller and a call routing controller in communication with the call controller;

said call controller being operably configured to receive a request from the subscriber seeking to initiate communications between the subscriber and the another party and to produce a request to establish an IP communications channel between the subscriber and the another party and for establishing said IP communications channel through the media relay in response to a routing message produced by said call routing controller;

said call routing controller operably configured to:

receive from the call controller said request to establish said IP communications channel between the subscriber and the another party, access a database in response to receiving said request from said call controller to locate a dialing profile associated with the subscriber, said dialing profile comprising intercept determination information and destination information, said intercept determination information indicating whether an IP communication from the subscriber should be monitored and said destination information indicating where to send monitored communications; and produce a routing message for receipt by the call controller and separate from any IP communication sent between the subscriber and the another party, for providing routing information for routing the IP communications through the media relay; and when said determination information meets intercept criteria, cause said routing message to include at least some of said intercept determination information and said destination information.

18. The system of claim 17 wherein said IP communications include at least one of audio data, pure data, video data, multimedia data, text messaging data and instant messaging data.

19. The system of claim 18 wherein said call routing controller is operably configured to respond to said routing message by communicating with the media relay to cause the media relay to:

establish a communication path to relay said IP communications between the subscriber and the another party; and when said intercept determination information and said destination information are included in said routing message, produce a copy of said IP communications between the subscriber and the another party, while said media relay relays communications between the subscriber and the another party; and send said copy to a mediation device identified by said destination information in said routing message.

20. The system of claim 19 wherein at least one of said call controller and said call routing controller is operably configured to associate said intercept information with said dialing profile when communications involving said subscriber are not in progress.

21. The system of claim 19 wherein at least one of said call controller and said call routing controller is operably configured to associate said intercept determination information with said dialing profile when communications involving said subscriber are in progress.

22. The system of claim 20 wherein at least one of said call controller and said call routing controller is operably configured to populate intercept information fields in said dialing profile of the subscriber whose communications are to be monitored.

23. The system of claim 21 wherein at least one of said call controller and said call routing controller is operably configured to populate intercept information fields in said dialing profile of the subscriber whose communications are to be monitored.

24. The system of claim 23 wherein at least one of said call controller and said call routing controller is operably configured to determine whether a current date and time is within a range specified by said determination information.

25. The system of claim 24 wherein at least one of said call controller and said call routing controller is operably configured to identify a media relay through which communications involving said subscriber will be conducted and to include an identification of said media relay in said routing message.

26. The system of claim 25 wherein at least one of said call controller and said call routing controller is operably configured to pre-associate at least one media relay with said dialing profile of the subscriber whose communications are to be monitored and wherein at least one of said call controller and said call routing controller is operably configured to identify from said dialing profile said at least one media relay pre-associated with said subscriber whose communications are to be monitored.

27. The system of claim 26 wherein at least one of said call controller and said call routing controller is operably configured to populate media relay fields in said dialing profile with an identification of at said least one media relay.

28. The system of claim 21 wherein at least one of said call controller and said call routing controller is operably configured to associate said intercept information associated with said dialing profile of the subscriber whose communications are to be monitored, in response to receipt of an intercept request message, wherein said intercept request message comprises said intercept information.

29. The system of claim 28 wherein at least one of said call controller and said call routing controller is operably configured to:
a) find a dialing profile associated with the subscriber whose communications are to be monitored,
b) cause said intercept information to be associated with said dialing profile; and
c) identify a media relay through which said communications are being conducted.

30. The system of claim 29 wherein said dialing profile includes a username identifier and wherein at least one of said call controller and said call routing controller is operably configured to maintain active call records for communications in progress, said active call records comprising a username identifier and a media relay identifier identifying a media relay through which said communications are being conducted and wherein said means for identifying a media relay is operably configured to locate an active call record associated with a channel used by the subscriber whose communications are to be monitored to identify the media relay associated with said channel.

31. The system of claim 30 wherein at least one of said call controller and said call routing controller is operably configured to access direct-inward-dial (DID) records associating Public Switched Telephone Network (PSTN) telephone numbers with usernames of users subscribing to said IP network, and wherein at least one of said call controller and said call routing controller is operably configured to find a username in a DID record bearing a PSTN number associated with the subscriber whose communications are to be monitored and use said username to locate a dialing profile associated with said username.

32. The system of claim 19 wherein the call controller is operably configured to receive communications from the mediation device to cause the call controller to interact with the call routing controller to access a dialing profile of a subscriber whose communications are to be monitored and to enter said intercept determination information and destination information into said dialing profile.

33. A method for causing Internet Protocol (IP) communications to be intercepted in an IP network system in which IP communications between a subscriber of said system and another party occur through a media relay to which the subscriber and the another party address their IP communications destined for each other and which relays said IP communications between the subscriber and the another party, the method comprising:
in response to a request to establish an IP communications channel between the subscriber and the another party:
locating a dialing profile associated with the subscriber, said dialing profile comprising intercept determination information and destination information, said intercept determination information indicating whether an IP communication from the subscriber should be monitored and said destination information indicating where to send monitored communications;
producing a routing message for receipt by a call controller and separate from any IP communication sent between the subscriber and the another party, for routing the IP communications through the media relay and when said determination information meets intercept criteria, causing said routing message to include at least some of said intercept determination information and said destination information.

34. The method of claim 33 wherein said IP communications include at least one of audio data, pure data, video data, multimedia data, text messaging data and instant messaging data.

35. The method of claim 34 further comprising responding to said routing message by communicating with the media relay to cause the media relay to:
establish a communication path for relaying IP communications between the subscriber and the another party; and when said intercept determination information and said destination information are included in said routing message, produce a copy of said IP communications between the subscriber and the another party, while the media relay relays communications between the subscriber and the another party; and send said copy to a mediation device identified by said destination information in said routing message.

36. The method of claim 34 further comprising associating said determination information and said destination information with said dialing profile when communications involving said subscriber are not in progress.

37. The method of claim 34 further comprising associating said determination information and said destination information with said subscriber dialing profile when communications involving said subscriber are in progress.

38. The method of claim 36 wherein associating said determination information and said destination information comprises populating intercept information fields in said dialing profile of a subscriber whose communications are to be monitored.

39. The method of claim 37 wherein associating said determination information and said destination information comprises populating intercept information fields in said dialing profile of a subscriber whose communications are to be monitored.

40. The method of claim 39 wherein determining whether said determination information meets said intercept criteria comprises determining whether a current date and time is within a range specified by said determination information.

41. The method of claim 40 wherein producing said routing message comprises identifying a media relay through which communications involving said subscriber will be conducted and including an identification of said media relay in said routing message.

42. The method of claim 41 further comprising pre-associating at least one media relay with said dialing profile associated with the subscriber whose communications are to be monitored and wherein identifying said media relay comprises identifying said at least one media relay pre-associated with said subscriber whose communications are to be monitored.

43. The method of claim 42 wherein pre-associating comprises populating media relay fields in said dialing profile with an identification of said at least one media relay.

44. The method of claim 37 wherein associating said determination information and said destination information comprises associating said determination information and said destination information with said dialing profile of the subscriber whose communications are to be monitored, in response to receipt of an intercept request message, wherein said intercept request message comprises said determination information and said destination information.

45. The method of claim 44 further comprising invoking an intercept request message handler to:
  a) find a dialing profile associated with the subscriber whose communications are to be monitored;
  b) associate said determination information and said destination information with said dialing profile; and
  c) identify a media relay through which said communications are being conducted.

46. The method of claim 45 wherein said dialing profile includes a username identifier and further comprising maintaining active call records for communications in progress, said active call records comprising a username identifier and a media relay identifier identifying the media relay through which said communications are being conducted and wherein identifying a media relay through which said communications are being conducted comprises locating an active call record associated with a channel used by the subscriber whose communications are to be monitored to identify the media relay associated with said channel.

47. The method of claim 46 further comprising maintaining direct-inward-dial (DID) records associating Public Switched Telephone Network (PSTN) telephone numbers with usernames of users subscribing to said IP network, and wherein finding a dialing profile associated with the subscriber whose communications are to be monitored comprises finding a username in a DID record bearing a PSTN number associated with the subscriber whose communications are to be monitored and using said username to locate a dialing profile associated with said username.

48. The method of claim 35 further comprising causing the call controller to receive communications from the mediation device to cause the dialing profile of a subscriber whose communications are to be monitored and to receive said intercept determination information and destination information.

* * * * *